(12) United States Patent
Levanon et al.

(10) Patent No.: US 10,410,224 B1
(45) Date of Patent: Sep. 10, 2019

(54) DETERMINING ITEM FEATURE INFORMATION FROM USER CONTENT

(71) Applicant: Amazon Technologies, Inc., Reno, NV (US)

(72) Inventors: Guy Levanon, Seattle, WA (US); Waqas Syed Ahmed, Bellevue, WA (US); Leo Parker Dirac, Seattle, WA (US); Aditya Rekha Dharanipragada, Issaquah, WA (US); Simon Hachey, Seattle, WA (US); Amber Kathleen Joehnk, Seattle, WA (US); Hannes Scheidler, Mercer Island, WA (US); Kevin Michael Small, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1028 days.

(21) Appl. No.: 14/303,547

(22) Filed: Jun. 12, 2014

Related U.S. Application Data

(60) Provisional application No. 61/971,509, filed on Mar. 27, 2014.

(51) Int. Cl.
*G06Q 30/02* (2012.01)
(52) U.S. Cl.
CPC .................................... *G06Q 30/02* (2013.01)
(58) Field of Classification Search
None
See application file for complete search history.

(56) References Cited

U.S. PATENT DOCUMENTS

| | | | | |
|---|---|---|---|---|
| 6,112,186 A | * | 8/2000 | Bergh | G06Q 30/02 705/7.32 |
| 6,651,058 B1 | * | 11/2003 | Sundaresan | G06F 17/30734 |
| 8,554,701 B1 | * | 10/2013 | Dillard | G06N 99/005 706/12 |

(Continued)

OTHER PUBLICATIONS

Huang, Jeff, et al. "Revminer: An extractive interface for navigating reviews on a smartphone." Proceedings of the 25th annual ACM symposium on User interface software and technology. ACM, 2012, pp. 1-10.

(Continued)

*Primary Examiner* — Susanna M. Diaz
(74) *Attorney, Agent, or Firm* — Robert C. Kowert; Meyertons, Hood, Kivlin, Kowert & Goetzel, P.C.

(57) ABSTRACT

Technologies for determining, displaying, and leveraging reasons to buy for categories of items. Aspects (reasons to buy) may be predetermined for categories of items from a corpus of item information. For each item in a category, community-sourced content (e.g., customer reviews) may be identified for (aligned to) each aspect, and relevant comments may be extracted from the content. The comments may be analyzed, for example according to sentiment, to provide scoring and summary statistics for the aspects. Items may be ranked according to the summary statistics. The aspects for an item may be displayed, with extracted comments and/or summary statistics provided for each aspect. Items in a category or across categories may be compared according to the aspects. Aspects may be used in searches for items within categories to filter the items according to one or more of the aspects.

26 Claims, 29 Drawing Sheets

(56) References Cited

U.S. PATENT DOCUMENTS

| | | | | |
|---|---|---|---|---|
| 2008/0215571 | A1* | 9/2008 | Huang | G06F 17/30719 |
| 2009/0063247 | A1* | 3/2009 | Burgess | G06Q 30/02 |
| | | | | 705/7.34 |
| 2009/0083096 | A1* | 3/2009 | Cao | G06Q 10/00 |
| | | | | 705/7.32 |
| 2012/0047146 | A1* | 2/2012 | Balakrishnan | G06Q 30/0218 |
| | | | | 707/748 |
| 2012/0278065 | A1* | 11/2012 | Cai | G06Q 30/0278 |
| | | | | 704/9 |
| 2013/0013608 | A1* | 1/2013 | Bird | G06F 16/374 |
| | | | | 707/737 |
| 2014/0067973 | A1* | 3/2014 | Eden | G06Q 10/10 |
| | | | | 709/206 |
| 2014/0157145 | A1* | 6/2014 | Bush | G06Q 50/01 |
| | | | | 715/745 |
| 2015/0088593 | A1* | 3/2015 | Raghunathan | G06Q 10/0633 |
| | | | | 705/7.27 |

OTHER PUBLICATIONS

Pang, B., and Lee, L. Opinion mining and sentiment analysis. Found. Trends Inf. Retr. 2, (Jan. 1-2, 2008), pp. 1-135.

Popescu, A.-M., and Etzioni, O. Extracting product features and opinions from reviews. In Proceedings of HLT (2005), pp. 339-346.

Chang, Chia Hui, et al. "A survey of web information extraction systems." Knowledge and Data Engineering, IEEE Transactions on Oct. 18, 2006, pp. 1-18.

Yatani, Koji, et al. "Review spotlight: a user interface for summarizing user-generated reviews using adjective-noun word pairs." Proceedings of the SIGCHI Conference on Human Factors in Computing Systems. ACM, 2011, pp. 1541-1550.

Paul, Michael J., and Mark Dredze. "Factorial LDA: Sparse Multi-Dimensional Text Models." NIPS. 2012, pp. 1-9.

* cited by examiner

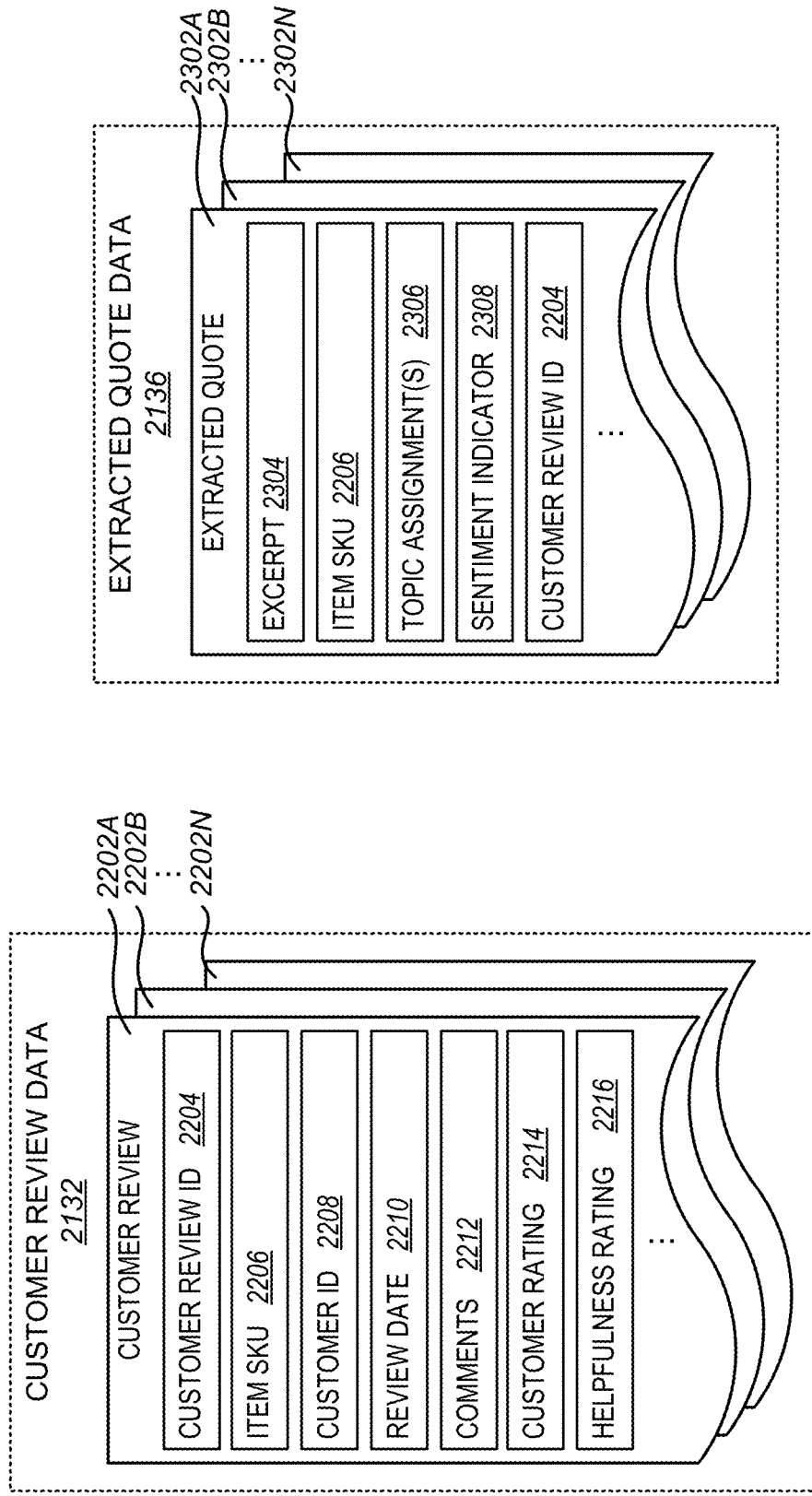

DETERMINING ITEM FEATURE INFORMATION FROM USER CONTENT

This application claims benefit of priority of U.S. Provisional Application Ser. No. 61/971,509 entitled "EXTRACTING REASONS TO BUY FROM CUSTOMER REVIEWS" filed Mar. 27, 2014, the content of which is incorporated by reference herein in its entirety.

BACKGROUND

An online merchant may provide a number of items for sale to customers over the Internet. These items may include, but are not limited to, goods, services, digital media, downloadable music, streaming movies, and the like. Customers may access information regarding the available items through a website or other information service provided by the online merchant. The information regarding the items may include that information needed by the customer to identify and purchase a particular item, such as the name and description of the item, the price and availability of the item, and the like. In order to enhance the online shopping experience and allow the customer to fully research a particular item, the online merchant may provide additional item information along with the purchase information. The additional item information may include details or technical specifications for the item, a list of features, and customer reviews of the item.

The customer reviews may allow a potential purchaser to evaluate what other customers think about the item. The customer reviews may, for example, include a quantitative rating of the item as well as free-form comments provided by the customers regarding their impression of the item and its features, their experience with the item, their overall satisfaction with the item, and the like. For many popular items available from the online merchant, there may exist hundreds or thousands of customer reviews, covering many varied aspects of the item. However, this large number of reviews may present too much information for some customers to digest, even if provided with tools to sort the reviews by rating, helpfulness, and other qualifiers of the reviews. Accordingly, much helpful information contained in the customer reviews for an item may go untapped by potential purchasers.

BRIEF DESCRIPTION OF THE DRAWINGS

FIG. 13 illustrates data structures and elements that may be maintained in customer review data, according to at least some embodiments.

FIG. 14 illustrates data structures and elements that may be maintained in extracted quote data, according to at least some embodiments.

Figure 1:
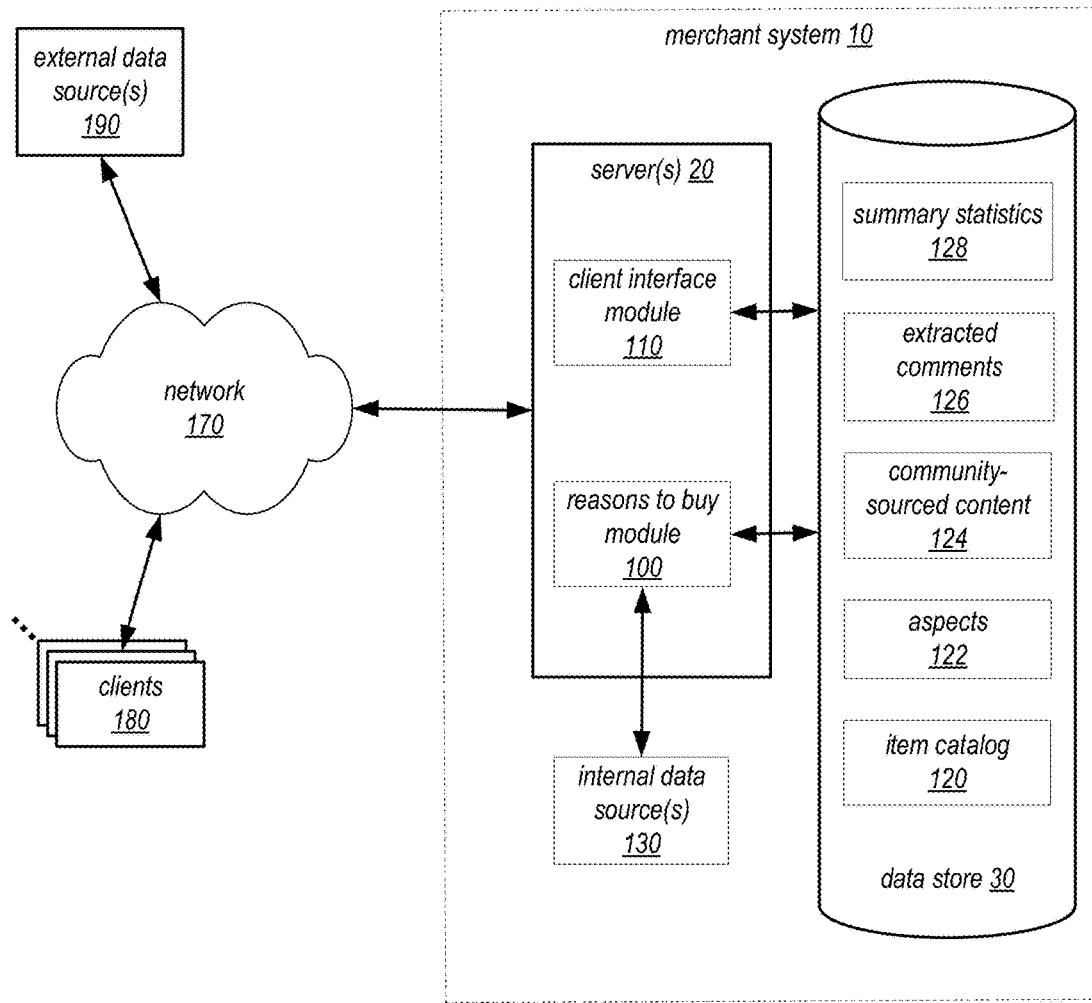
FIG. 1 illustrates an example network environment in which a merchant system may implement a reasons to buy module, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of methods and apparatus for determining reasons to buy for items offered via an online merchant's website from item information including but not limited to community-sourced content such as customer reviews, and for presenting those reasons to buy to customers of the online merchant, are described. These methods and apparatus may be referred to herein as a reasons to buy system.

Products (also referred to as items), for example products offered for sale via an online merchant's website, may have dozens, hundreds, or even thousands of customer reviews on a website. The volume of review material poses a daunting task for customers to search through to find relevant information about particular items. Customers may value the authentic insights of product owners or other product reviewers, but generally do not have time to wade through dozens, or even thousands, of reviews that may be made available to them via the website. Customers searching for specific information, like the age-appropriateness of a movie or the quality of a particular camera feature such as autofocus, or comparing similar products such as cameras or wireless printers, may have to read dozens or more of reviews before finding one that helps them. Customers unsure of which product features they should care about must read even more reviews before learning what features of the products are or were most important to product purchasers or owners. For example if a customer read all 300+ reviews of a particular wireless printer, they might learn that customers sometimes experience unreliable wireless connections with the printer, but also that those customers who print high resolution photographs using the printer rave about the quality of the photo print function. The wireless problems might be a deal breaker for some customers, while the photo quality might seal the deal for other customers. However, a conventional overall average customer rating for the printer cannot provide these nuanced details about particular features, and few customers have the time to distill these types of features from the many customer reviews for products.

Conventionally, an online merchant's website may extract and display some information about particular products from customer reviews of the products. For example, a website may summarize one or more common topics that appear in the reviews of a particular product or item. However, there is much more information about products than just customer product reviews that may be leveraged to provide more meaningful and useful evaluations of products according to various aspects of the products within a category that may be used to evaluate particular products and compare the products to similar products, as well as to provide information on products that may be used to search for products according to meaningful aspects of the products. Embodiments of the reasons to buy system as recited herein may collect a corpus of information about items and/or categories of items and leverage this information to determine meaningful aspects for categories of items, extract relevant and useful information (e.g., relevant comments and statistics) regarding the aspects for particular items in the categories, and provide the information to customers of the online merchant to help the customers when searching for, comparing, and making decisions about products that the customers may be interested in buying.

The corpus of information that may be collected and leveraged by embodiments may include information obtained from one or more sources internal to or external to the online merchant. Internal data sources may include repositories (e.g., an item catalog maintained by the online merchant) that include product data provided by or uploaded from third parties such as product manufacturers, distributors, or suppliers. This product data may generally include objective data about the products, for example product descriptions, specifications, and claimed features, components, or capabilities of the products. Internal data sources may also include community-sourced data or content. In this context, "community" refers to users of the online merchant's website, including but not limited to customers who make purchases of items from the website. Community-sourced content may include, but is not limited to, customer review data, website usage data (e.g., customer search information such as search terms and search phrases farmed from a search engine of the website), customer service data (e.g., customer service emails from customers of the website), and content from Q&A or other forums related to the website's items that the website's customers may participate in. The community-sourced content may generally include subjective information about the website's offered products, for example customers' opinions of or ratings for various features, components, or capabilities of the products. The community-sourced content may include unstructured information (e.g., free-form text from customer reviews), and in some embodiments may also include structured information (e.g., numerical ratings of products based on customer input to a structured interface such as a poll, prompt, or rating scale.)

External data sources may include one or more of, but are not limited to, websites of the product manufacturers or distributors that may include technical, marketing, or other product descriptions, websites of third-party product reviewers that may describe, compare, and/or rate similar items based on one or more features or other metrics, other third-party sites that may provide information or descriptions of items, social media, or in general any source for information about products that is external to the online merchant's website and that can be farmed for information or data regarding specific products or categories of products offered by the online merchant's website.

Using embodiments of a reasons to buy system as described herein, category and item information can be extracted, compiled, analyzed, and presented to customers, for example via item detail, search, or comparison pages of the website, and may be used by customers to more easily identify other customers' opinions of key aspects of items that may be relevant to the customers' particular needs. In addition, one or more aspects may be common across a type or category of items (e.g., across all cameras, or across all DSLR cameras), and thus the community-sourced content for items that is aligned to the one or more aspects of categories of items may be used to compare two or more items within a category.

Embodiments of a reasons to buy system as described herein may employ one or more machine learning techniques such as automated semantic analysis techniques, for example when predetermining aspects for a category of items from a corpus of textual information about the items and/or when aligning community-sourced content (e.g., customer reviews of items) for items to the predetermined aspects of categories. An automated semantic analysis technique refers to an automated process for producing semantically related lists of terms (for example through context-sensitive synonymy). Methods for doing this that may be used in embodiments may include, but are not limited to crafting regular expressions to match string segments associated with a topic (either manually or automatically) to probabilistic topic modeling techniques such as latent semantic analysis (LSA), probabilistic LSA (pLSA), latent Dirichlet allocation (LDA), other Bayesian generative models for topic modeling (e.g., multidimensional topic models, multi-grain topic models, topic-aspect models, syntactic topic models, supervised topic models, etc.), related nonparametric Bayesian extensions (e.g., hierarchical Dirichlet processes, etc.) to methods which exploit review structure such as dependency/syntactic parse paths, semantic role labeling, etc., or any combination thereof. See the section titled Determining aspects from sources and aligning aspects to community-sourced content—additional details for further discussion of machine learning techniques such as automated semantic analysis techniques that may be used in embodiments.

Note that, as generally used herein, "topics" are latent features of items that are typically determined according to one or more machine learning techniques such as automated semantic analysis techniques applied to a corpus of information about the item. A "topic" may for example be a feature of an item that is detected for the item from a corpus of textual information about the item using a machine learning technique, and thus a "topic" may be viewed as something that that a machine learning technique finds interesting about an item. "Aspects", on the other hand, have semantic meaning to humans, may represent various features, groups of features, capabilities, etc. of items that people are generally interested in, may extend across items in a category, and may be used to meaningfully compare items and to facilitate making decisions for purchases. Hence, the reference to the aspects as "reasons to buy", and to methods described herein as "reasons to buy" methods.

At least some embodiments of the reasons to buy method may generate topics for categories of items according to one or more machine learning techniques such as automated semantic analysis techniques, take the machine-learned topics and generate, from the topics, sets of aspects for the categories that humans can more easily relate to, and then align community-sourced content including but not limited to customer reviews of items in the categories to the aspects to generate "reasons to buy" information for the items. The "reasons to buy" information may include, but is not limited to, comments extracted from the community-sourced content (e.g., customer reviews) related to particular aspects of the items. In some embodiments, the generated "reasons to buy" information may, instead or in addition to the extracted comments, include summary statistics for the items, for example ratings or scorings of aspects for particular items based on one or more metrics of the respective comments. For example, summary statistics for items may include counts of "hits" for one or more aspects in the community-sourced content for the items. As another example, summary statistics may include data indicating positive vs. negative sentiment for one or more aspects of the items.

Using embodiments of a reasons to buy system, customers may be presented with at least a summary of aspects of products on at least some product or item pages that may provide reasons to buy (or in some cases reasons not to buy) particular products to particular customers. In at least some embodiments, the aspects may be automatically determined from item information including but not limited to community-sourced content such as customer reviews of the respective products or categories of products. Using embodiments, customers can find out much faster if a product is right for them, and may find it much easier to compare similar products in a category (e.g., cameras) or even products across similar but not identical categories (e.g., point-and-shoot cameras vs. DSLR cameras).

Using an online merchant site that implements embodiments as described herein, customers may no longer need to sift through piles of customer reviews to understand what aspects of a product or category of product other product owners or reviewers care about. At least some embodiments of the reasons to buy system may automatically comb through thousands or millions of customer reviews or other community-sourced content, as well as other item information from internal or external sources, to automatically identify important features and unique strengths of at least some of the items in an online merchant's catalog. Shoppers can use these summaries to quickly decide which products they want, and in some cases which products they may want to avoid.

Using embodiments of the reasons to buy system, instead of forcing customers to read individual reviews until they understand enough about a given product, summarized and unique reasons to buy can be displayed for items based on all reviews from product owners as well as other community-sourced content such as Q&A or other forums related to the website's items. For example, for a network router with 800+ reviews, the online merchant's website may state directly on the item detail page what product owners said about key topics for or aspects of network routers such as signal strength ('I live on a ¼ acre of hillside and this router covers nearly every inch of it'), and ease of setup ('It took me just 1 minute to set this up and another to get it connected'), and how one network router differs from other network routers that are similarly ranked or rated ('3G/4G device integration for backup connectivity if your ISP is down!'). In at least some embodiments, confidence in summarization statements may be strengthened by providing product owners a simple (e.g., one tap) way to agree or disagree with any of the provided reasons to buy.

At least some embodiments of the reasons to buy system may provide automated review summarization. An online website may, for example, use the system to extract and summarize the most relevant information that a customer may need when viewing a product or item page. With the advent of mobile devices such as smartphones and tablet or pad devices that are increasingly used for browsing and purchasing items from online websites, and the online merchants potentially adding mobile versions of their websites, embodiments may provide useful summarizations of review information for products, and thus may provide a meaningful way to make good use of the limited screen real estate available on such devices.

The section titled Determining reasons to buy from item information and FIGS. 1 through 11L describe embodiments of methods and apparatus for determining reasons to buy from customer reviews and other information for items, and for presenting those reasons to buy to customers of an online merchant. The methods and apparatus for determining and presenting reasons to buy may collectively be referred to as a reasons to buy system.

Figure 12:
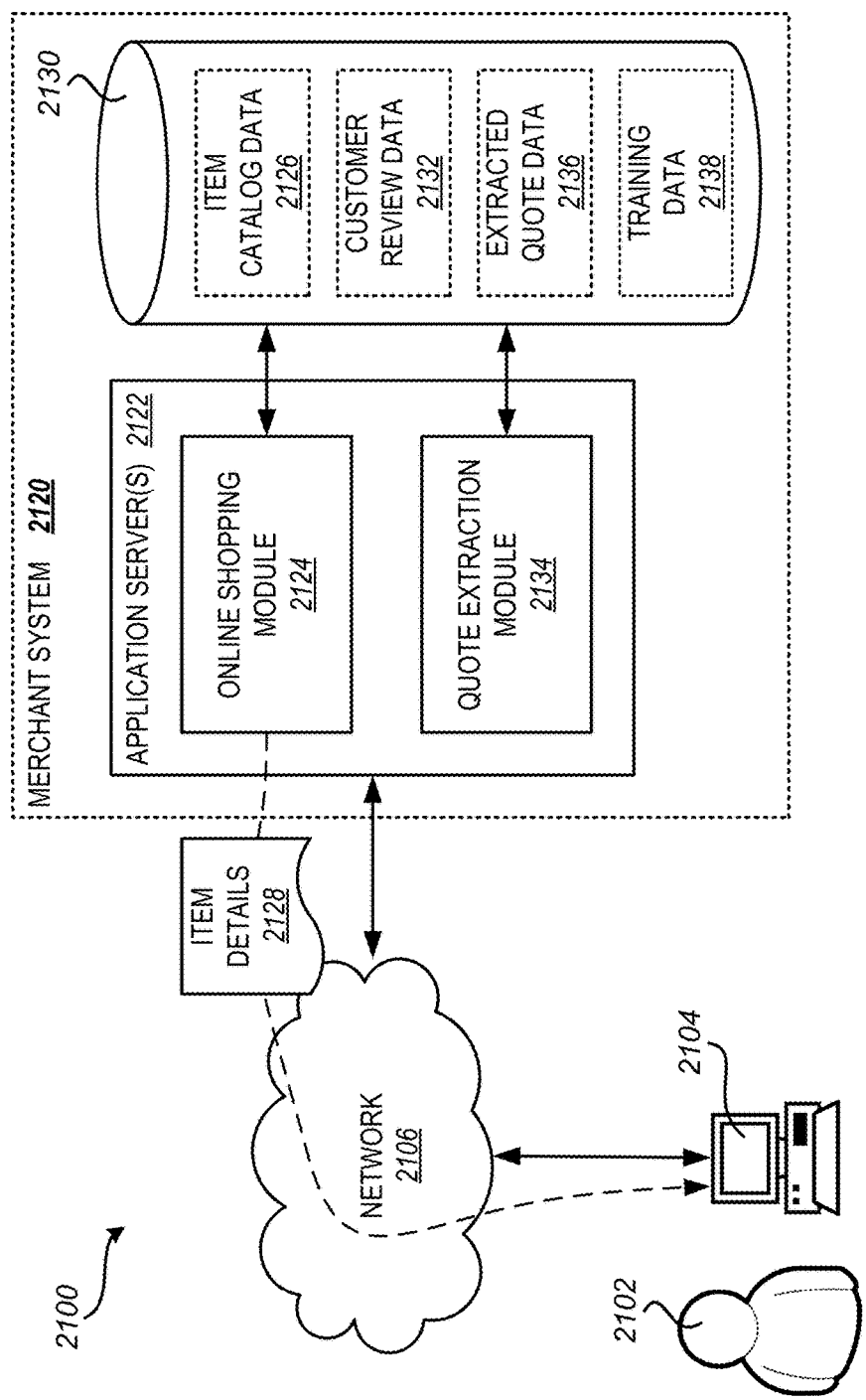
FIG. 12 shows an example environment for extracting quotes from customer reviews, according to at least some embodiments.

Later in this document, a section titled Extracting Quotes from Customer Reviews describes example methods for extracting quotes from customer reviews with respect to FIGS. 12 through 16. Embodiments of the reasons to buy system as illustrated in FIGS. 1 through 11L may leverage at least some of the technologies and methods as described in the section titled Extracting Quotes from Customer Reviews and FIGS. 12 through 16. For example, the reasons to buy system may be implemented in a computing environment similar to that shown in FIG. 12, either instead of or in addition to the methods for extracting quotes from customer reviews as described in Extracting Quotes from Customer Reviews and FIGS. 12 through 16. As another example, embodiments of the reasons to buy system may leverage one or more of the data structures and elements as illustrated in FIGS. 12, 13 and 14. As another example, embodiments of the reasons to buy system may leverage one or more of the machine learning or other techniques as described in Extracting Quotes from Customer Reviews and FIGS. 12 through 16 to compile, extract, analyze, and display information when determining reasons to buy for products or product categories and extracting information regarding reasons to buy from community-sourced content such as customer reviews for the products.

However, the methods employed in embodiments of the reasons to buy system differ from the methods described in Extracting Quotes from Customer Reviews. In particular, methods used in the reasons to buy system to determine aspects for items or categories of items and to determine and extract relevant information for those aspects from the community-sourced content differ from the method illustrated in and described for FIG. 15 for extracting quotes from customer reviews. In addition, the user interface and user experience for the reasons to buy system differs from the user interface and user experience for the methods for extracting quotes from customer reviews as described in Extracting Quotes from Customer Reviews and FIGS. 12 through 16. Other differences and distinctions may be pointed out as well in the discussion below.

While embodiments are generally directed to determining positive reasons to buy for items within categories, some embodiments may instead or in addition determine reasons not to buy particular items within a category. In these embodiments, instead of or in addition to identifying comments within community-sourced content such as customer reviews that express positive opinions towards particular aspects of items within a category, comments may be identified that express negative (or neutral) opinions towards particular aspects. Note that, in some embodiments, both positive and negative opinions about aspects of items may be provided to the customers via a user interface, either as a default or by request.

While embodiments are generally described in the context of providing reasons to buy for products or categories of products offered for sale by an online merchant via a website, embodiments may be applied in other contexts or applications. For example, a website that rates or compares products in one or more categories, but that does not offer the products for sale itself, may implement an embodiment of the reasons to buy system as described herein to provide information regarding products or categories of products to users via one or more web pages. As another example, a manufacturer or merchant that offers one or more particular products for sale may implement an embodiment of the reasons to buy system as described herein to provide comparisons of its products to those offered by other manufacturers or merchants.

While embodiments are generally described as determining aspects for categories of products (e.g., "cameras") and then aligning community-sourced content such as customer reviews of particular items within the category with the aspects, note that embodiments may be directly applied to a particular item determine to provide a set of "reasons to buy" aspects for the particular item. In other words, a category may include multiple items, or only one item.

While embodiments are generally described in the context of providing reasons to buy to customers of an online merchant, in at least some embodiments, information generated by the reasons to buy system may be provided to other entities either as a service or for a fee. For example, aspects generated for categories of items and data that may be used to compare items within a category according to the aspects may be provided by an online merchant to one or more other entities such as other online merchants, product manufacturers or distributors, product review sites, and so on.

Note that products or items to which embodiments of a "reasons to buy" system may be applied are not limited to physical goods. Products or items as used herein may include but are not limited to physical goods or products such as cameras and automobiles, works such as books, movies, and music, digital media products such as CDs and DVDs, services including but not limited to online services, commercial services such as restaurants, repair shops, contractors, and retail stores, and in general anything for which there may be customer reviews and/or other information that can be leveraged by a "reasons to buy" system as described herein to determine reasons to buy aspects for items or categories of items and that may, for example, be used to compare aspects within or across categories of the goods or services.

Determining Reasons to Buy from Item Information

Various embodiments of methods and apparatus for determining reasons to buy for items offered via an online merchant's website from item information including but not limited to community-sourced content such as customer reviews, and for presenting those reasons to buy to customers of the online merchant, are described. The reasons to buy methods described in this section may leverage a large corpus of item information which may include, but is not limited to, community-sourced content such as customer review information to determine aspects for products or categories of products up front, and then analyze the community-sourced content, aligning the information from the community-sourced content (e.g., customer reviews) with the predetermined aspects. At least some embodiments of the reasons to buy method may predetermine aspects for categories of items, extract topics from the community-sourced content (e.g., customer reviews), and align the community-sourced content (e.g., customer reviews) to the aspects according to the topics. Embodiments of the reasons to buy method may also provide understandable names for the predetermined aspects (see, e.g., the example aspects for cameras as shown in FIGS. 9A-9F and FIGS. 11A-11L). Embodiments of the reasons to buy method may take topics for one product and align the topics with another, similar product according to the aspects. In addition, embodiments may generate topics across multiple products, and align the topics across the multiple products according to the aspects. Unlike previous methods for determining topics for and extracting quotes from customer reviews, embodiments of the reasons to buy methods are not item-centric, but are instead centered on families or categories of items.

FIG. 1 illustrates an example network environment in which a merchant system may implement a reasons to buy module, according to at least some embodiments. The environment includes one or more clients 180 that may access a merchant system 10 across a network 170. The network 170 may be a local-area network ("LAN"), a wide-area network ("WAN"), the Internet, or any other networking topology known in the art that may connect client(s) 180 to the merchant system 10. A client 180 may, for example, represent an individual or entity (also referred to herein as a "customer") that desires to browse, research, review, and/or purchase items, for example items offered for sale by an online merchant. Items may include one or more of, but are not limited to, physical goods or products, digital media products, event tickets, media or service subscriptions, works such as books, movies, and albums, or in general any goods or services which can be purchased or otherwise obtained by a client 180 and/or reviewed by customers or other users of the merchant system 10. The merchant system 10 may include one or more servers 20 that provide various online services to the clients 180 over the network 170. A client 180 may use one or more client applications to access and utilize the online services provided by servers 20. A client application may, for example, be a web browser application.

Servers 20 may execute a number of modules in order to provide the online services to the clients 180. The modules may execute on a single server 20 or across multiple servers 20 in the merchant system 10. In addition, each module may consist of a number of subcomponents executing on different application servers 20 or other computing devices in the merchant system 10. The modules may be implemented as software, hardware, or any combination of the two.

Figure 8A:
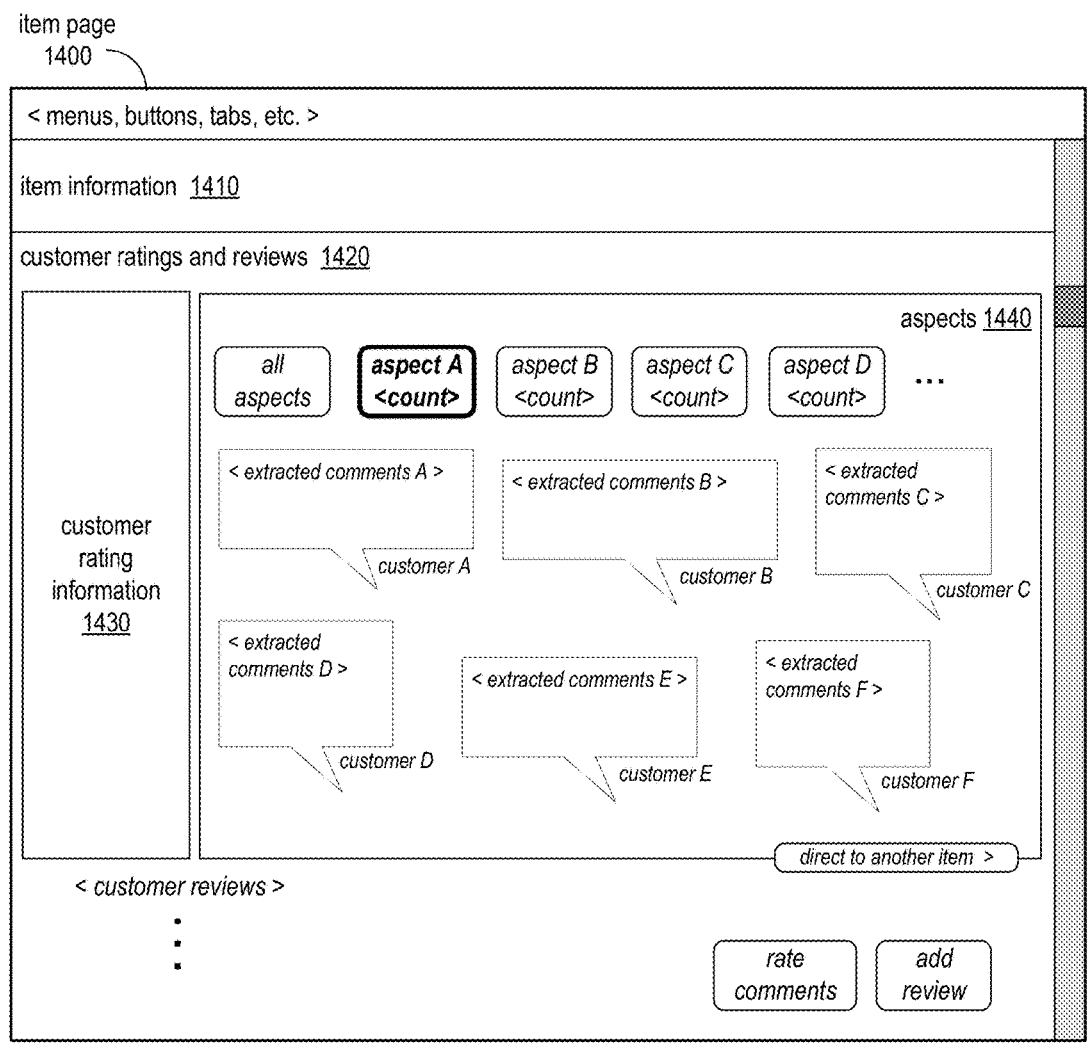
FIG. 8A illustrates an example item page that may provide reasons to buy information for an item according to predetermined aspects for the item, according to at least some embodiments.

In at least some embodiments, a client interface module 110 may retrieve information regarding a particular item offered for sale by the online merchant from item catalog 120, generate item details containing the item information, and transmit the item details over the network 170 to a client 180. The item details may, for example, be presented or displayed by client 180 as an item page, for example as illustrated in FIG. 8A. Any of various methods and technologies may be utilized that allow the client interface module 110 to send the item details to the clients 180 for display on or as an item page. The item catalog 120 may, for example, be stored in a data store 30, such as a database or other storage mechanism available to servers 20 in the merchant system 10. The item catalog 120 may contain information regarding each item offered for sale by the merchant. The item catalog 120 may further contain information utilized to organize the items and facilitate searching, browsing, and purchasing of the items by a client 180. For example, the item catalog 120 may include item type and category information that allows the items in the catalog to be grouped by type or category. According to at least some embodiments, the item catalog 120 defines category hierarchies that facilitate the grouping of the items into categories in a hierarchical fashion, for example into a broad category such as cameras and subcategories such as point-and shoot cameras and DSLR cameras.

In at least some embodiments, customer review data for individual items or collection of items from the item catalog 120 may be collected and provided to clients 180. The customer review data may, for example, include quantitative and/or qualitative ratings for the item, text-based comments regarding the item, information regarding reviewers, as well as other information. A non-limiting example of customer review data is provided in FIG. 13. The customer review data may, for example, be stored in the data store 30 or other storage mechanism in the merchant system 10 as community-sourced content 124. The client interface module 110 may receive or retrieve customer review information from community-sourced content 124 to include in the item details for presentation to a client 180 on an item page or on some other page.

In this context, "community" refers to users of the online merchant's website, including but not limited to customers who make purchases of items from the website. Community-sourced content 124 may include, but is not limited to, customer review data, website usage data (e.g., customer search information such as search terms and search phrases farmed from a search engine of the website), customer service data (e.g., customer service emails from customers of the website), and content from Q&A or other forums related to the website's items that the website's customers may participate in. The community-sourced content 124 may generally include subjective information about the website's offered products, for example customers' opinions of or ratings for various features, components, or capabilities of the products. The community-sourced content 124 may include unstructured information (e.g., free-form text from customer reviews). Community-sourced content 124 may include free-from text comments in various formats from customer reviews or other sources regarding items of any type, including physical products, digital media, services, and the like. In some embodiments, community-sourced content 124 may also include structured information (e.g., numerical ratings of products based on customer input to a structured interface such as a poll, prompt, or rating scale.)

In at least some embodiments, a reasons to buy module 100 may execute on one or more servers 20 to determine and present reasons to buy for items from item information, for example according to methods as illustrated in FIGS. 4 through 7. In at least some embodiments, the reasons to buy module 100 may collect information about items or categories of items from one or more data sources using one or more data collection techniques, and may analyze the collected information to determine one or more aspects for each of one or more categories of items using one or more data analysis techniques. The data collection and data analysis techniques used to determine the aspects for the categories may include manual techniques, automated techniques (e.g., one or more computer-implemented machine learning techniques such as automated semantic analysis techniques), or a combination of manual and automated techniques (e.g., a partially automated or human-supervised semantic analysis technique). The data sources may include sources 130 internal to the merchant system 10 (e.g., item catalog 120, community-sourced content 124 such as customer reviews, content from Q&A or other forums, query logs for search engines, etc.) and/or sources 190 external to the merchant system 10 (e.g., product manufacturers' websites, third-party product review websites, etc.). In at least some embodiments, the reasons to buy module 100 may generate topics for categories of items from the collected information, for example using an automated semantic analysis technique, and then generate or otherwise determine, from the machine-learned topics, sets of aspects for the categories that humans can more easily relate to. Generating the aspects from the topics may be performed according to manual techniques, automated techniques, or a combination of manual and automated techniques. Generating the aspects from the topics may involve mapping, consolidating or combining the machine-determined topics for a category under appropriate aspects of the category. In at least some embodiments, generating the aspects may involve naming the aspects with names that are meaningful to humans and that express features or capabilities that are generic to the category, and then grouping topics according to the named aspects. For example, the machine-learned topics for a camera category may include topics corresponding to various different types of lenses, some of which may be specific to particular cameras. A "quality of lenses" aspect may be specified, and the topics related to types of lenses may be grouped under the aspect. In some embodiments, the determined aspects for the categories may be stored as aspects 122 in a data store 30. However, in some embodiments, the aspects for at least some categories may be dynamically determined or determined "on the fly" as needed, and may not be persistently stored to a data store 30.

In at least some embodiments, after determining (and naming) a set of aspects for a category of items, the reasons to buy module 100 may align the information from community-sourced content 124 such as customer reviews of items in the category with the predetermined aspects 122 for the category. In some embodiments, the reasons to buy module 100 may determine one or more topics for each item from the community-sourced content 124 (e.g., customer reviews) related to the item according to a semantic analysis technique, and then align the topics for the item to the predetermined aspects for the category that includes the item. Aligning the item's topics to the predetermined aspects for a category may involve mapping, consolidating, or combining the machine-determined topics under appropriate predetermined aspects of the category. For example, predetermined aspects for a broad "camera" category may include "lenses" or "lens quality" or the like, and the topics determined for particular cameras according to the semantic analysis technique may include various lenses such as 50 mm, 105 mm, 140 mm, 24-105 mm, zoom lens, telephoto lens, macro lens, kit lens, and so on. Two or more of the various lenses determined as topics for a camera may be consolidated or combined under a single aspect for the camera category (e.g., "lenses"). Note that in some embodiments, one or more of the topics may fall under two or more aspects. For example, in a broad "camera" category, a "zoom lens" may appear under both a "zoom quality" and a "lens quality" category. Further note that one unit of community-source content (e.g., one customer review) may be aligned with one, two, or more aspects, as a unit (e.g., a review) may mention one, two or more topics.

In at least some embodiments, the reasons to buy module 100 may extract representative comments or quotes from the community-sourced content 124 (e.g., customer reviews) of an item for the aspects 122 that apply to that item. In some embodiments, the extracted comments 126 may be stored in the data store 30 or other storage mechanism in the merchant system 10. However, in some embodiments, comments for an item may be dynamically extracted or extracted "on the fly" from the community-sourced content as needed, and thus in at least some cases may not be persistently stored to a data store 30. In some embodiments, the client interface module 110 may receive or retrieve one or more comments for particular aspects of particular items from extracted comments 126 and include the comments in the item details sent to a client 180 for display on an item page, for example as described in FIG. 5 and illustrated in FIGS. 8A through 9F.

In at least some embodiments, the reasons to buy module 100 may determine summary statistics 128 for the aspects 122 of an item from the comments 126 extracted from the community-sourced content 124 that applies to that item. Summary statistics 128 may include ratings or scorings of aspects for particular items based on one or more metrics of the respective comments 126. For example, summary statistics 128 for items may include counts of "hits" for one or more aspects in the community-sourced content for the items. As another example, summary statistics may include statistical data indicating positive vs. negative sentiment for one or more aspects of the items. Summary statistics 128 may be, but are not necessarily, persistently stored to a data store 30.

For example, in at least some embodiments, the reasons to buy module 100 may consider or determine sentiment when aligning customer reviews (or other community-sourced content) for an item to the predetermined aspects for a category of items. In at least some embodiments, the reasons to buy module 100 may determine the sentiment regarding the aspects as expressed by phrases, sentences, or collections of sentences contained in the community-sourced content. For example, the reasons to buy module 100 may classify each sentence or phrase in a collection of sentences as expressing a positive sentiment for an aspect, such as "I love this blender," a negative sentiment for an aspect, such as "The blades do not have enough power to grind ice," a mixed sentiment for an aspect, such as "While the blender was reliable, its feature set was too small for my needs," or neutral or no sentiment for an aspect, such as "I received this blender in March for my birthday." In some embodiments, the classification of sentiment in the comments may be performed using a machine learning technique trained on sentences that were manually labeled for sentiment, for example as described in regard to FIG. 16. The manually labeled sentences may be contained in training data stored in the data store 30 or other storage mechanism in the merchant system 10. In addition, the reasons to buy module 100 may store other information required for aligning community-sourced content such as customer reviews to the predetermined aspects in the training data.

Figure 2:
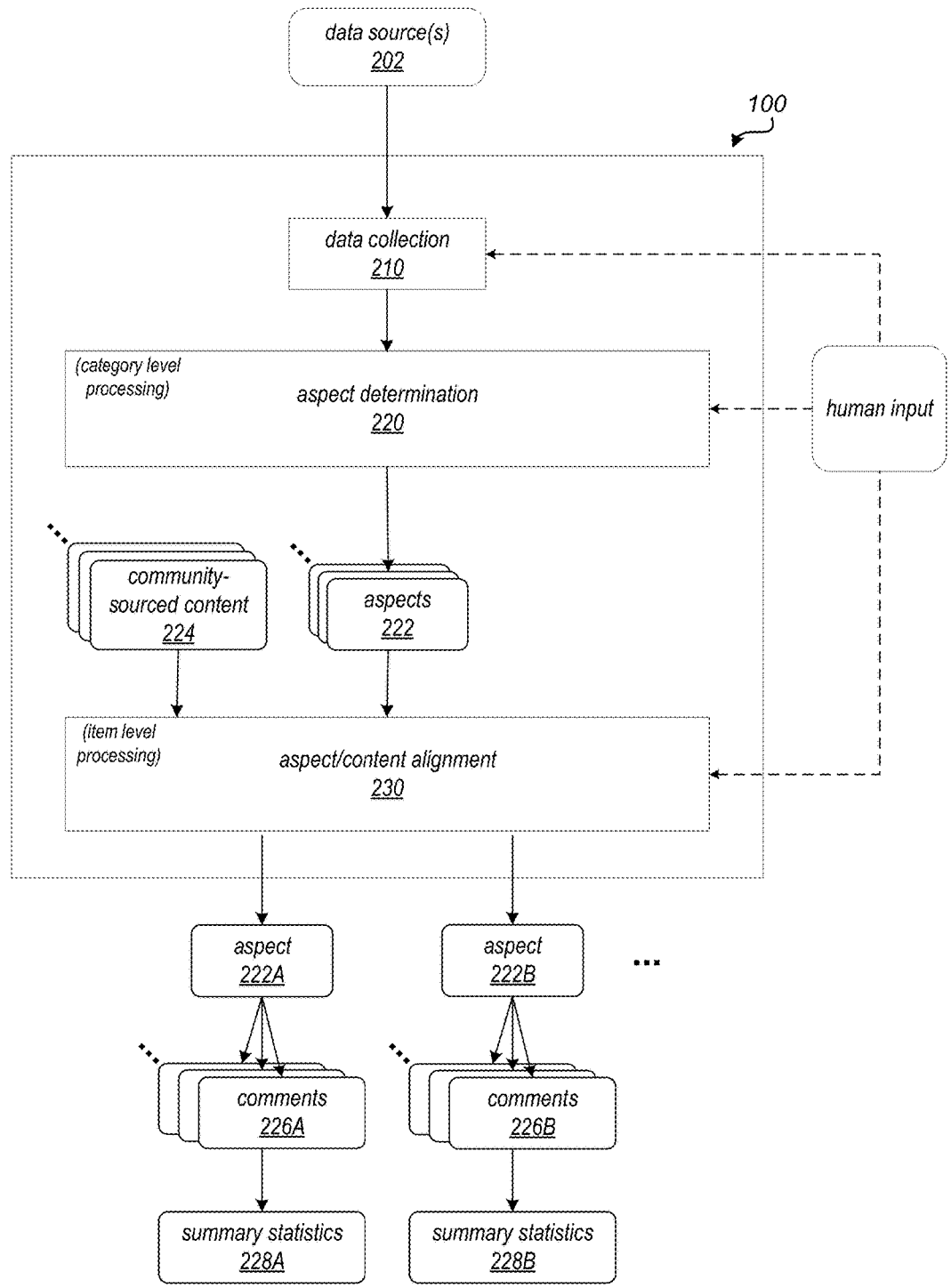
FIG. 2 illustrates an example reasons to buy module, according to at least some embodiments.

FIG. 2 illustrates an example reasons to buy module 100, according to at least some embodiments. In at least some embodiments, reasons to buy module 100 may execute on one or more servers of an online merchant's website to determine and present reasons to buy for items offered by the website, for example according to methods as illustrated in FIGS. 4 through 7.

As shown in FIG. 2, embodiments of a reasons to buy module 100 may include several components, for example a data collection 210 component, an aspect determination 220 component, and an aspect/content alignment 230 component. The aspect determination 220 component may perform category level processing to determine aspects 222 for categories of items, and the aspect/content alignment component may perform item level procession to align determined aspects 222 for a category with community-sourced content 224 of particular items in the category, and to extract comments 226 from the community-sourced content 224 for each aspect 222.

In at least some embodiments, the reasons to buy module 100 may also determine summary statistics 228 for at least some aspects 222 of at least some items. Summary statistics 228 may, for example, include ratings or scorings of respective aspects 222 determined from analysis of the respective comments 226. For example, summary statistics 228A for an aspect 222A may include counts of "hits" for the aspect 222A in the community-sourced content 224 for the respective item. As another example, in at least some embodiments, the extracted comments 226 for an aspect 222 may be analyzed, for example using a machine learning technique, to determine whether the comments 226 express positive, negative, or neutral sentiment regarding the respective aspect 222. In these embodiments, summary statistics 228A may, for example, include data indicating a ratio of positive to negative sentiment for the respective aspect 222A as determined from an analysis of comments 226A.

While one or more of the components of reasons to buy module 100 may be automated, as shown in FIG. 2, in at least some embodiments, human input may be involved at one or more levels or stages of the process. As an example, in some embodiments, human input may be used at data collection 210 to specify or refine which data sources 202 are to be used. As another example, in some embodiments, human input may be used to specify, define, or refine categories of items for which aspects 222 are to be determined at aspect determination 220. As another example, in some embodiments, human input may be used to specify or refine aspects 222 and/or to name aspects 222 at aspect determination 220. As another example, in some embodiments, human input may be used in aligning the community-sourced content 224 to the aspects 222 at aspect/content alignment 230. Note that, in at least some embodiments, one or more automated semantic analysis techniques as described herein may be used at one or both of aspect determination 220 and aspect/content alignment 230, and human input to the topic modeling technique may be used in directing or supervising the automated semantic analysis technique(s) as performed.

In at least some embodiments, the data collection 210 component of the reasons to buy module 100 may collect information about items or categories of items from one or more internal and/or external data sources 202 using one or more data collection techniques. The data sources may include one or more sources internal to the merchant system (e.g., item catalogs, community-sourced content 224 such as customer reviews, query logs for search engines, content from Q&A or other forums, etc.), and/or one or more sources external to the merchant system (e.g., product manufacturers' websites, third-party product review or product testing websites, etc.).

In at least some embodiments, the aspect determination 210 component of the reasons to buy module 100 may analyze the collected information to determine one or more aspects 222 for each of one or more categories of items using one or more data analysis techniques. In at least some embodiments, the aspect determination 210 component may generate topics for categories of items from the collected information, for example using one or more automated semantic analysis techniques, and then generate or otherwise determine, from the machine-learned topics, sets of named aspects 222 for the categories that humans can more easily relate to.

In at least some embodiments, after aspect determination 210 component generates a set of named aspects 222 for a category of items, the aspect/content alignment 230 component of the reasons to buy module 100 may align information from community-sourced content 224 such as customer reviews of items in the category with the predetermined aspects 222 for the category. In some embodiments, the aspect/content alignment 230 component may determine one or more topics for each item from the community-sourced content 224 (e.g., customer reviews) related to the item according to one or more automated semantic analysis techniques, and then align the topics for the item to the predetermined aspects 222 for the category that includes the item. Aligning the item's topics to the predetermined aspects 222 for a category may involve mapping, consolidating or combining the machine-determined topics under appropriate predetermined aspects of the category.

In at least some embodiments, the aspect/content alignment 230 component may extract representative comments 226 from the community-sourced content 224 of an item for the aspects 222 that apply to that item. The comments 226 for aspects 222 of an item may, for example, be displayed to an item page for the item, for example as described in FIG. 5 and illustrated in FIGS. 8 through 9F.

Figure 3A:
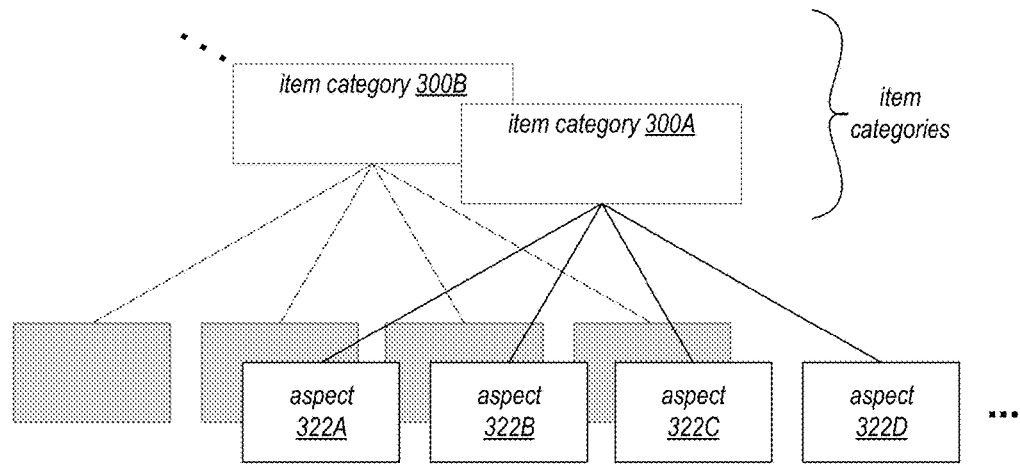
FIG. 3A graphically illustrates aspects for item categories, according to at least some embodiments.

FIG. 3A graphically illustrates aspects for item categories, according to at least some embodiments. In at least some embodiments, one or more item categories 300 may be manually and/or automatically identified. In various embodiments, categories 300 may be automatically determined from an item catalog of the merchant system, or alternatively categories 300 may be determined or refined by human input. Categories may be broad category such as "cameras", or may be subdivided into subcategories such as point-and shoot cameras and DSLR cameras. For each item category 300, one or more aspects 302 may be determined and named; the aspects 302 may correspond to reasons to buy for the category 300. The aspects 302 may be determined, for example, as described in reference to FIG. 2, as described at element 402 of FIG. 4, and as described in FIG. 6. Note that, generally but not necessarily, all aspects 302 for a category 300 apply to all items within the category 300. For example, "image quality" may apply to all cameras in a "cameras" category. Also note that one or more aspects 302 may be common across two or more related categories 300. For example, "image quality" may apply to all cameras in a "point-and shoot cameras" category 300 and to all cameras within a separate "DSLR cameras" category 300. However, related categories 300 may have aspects 302 that are not shared. For example, "standard flash mount" and "lens availability" may be aspects 302 for a "DSLR cameras" category 300, but are not aspects 302 for a "point-and shoot cameras" category 300.

Figure 3B:
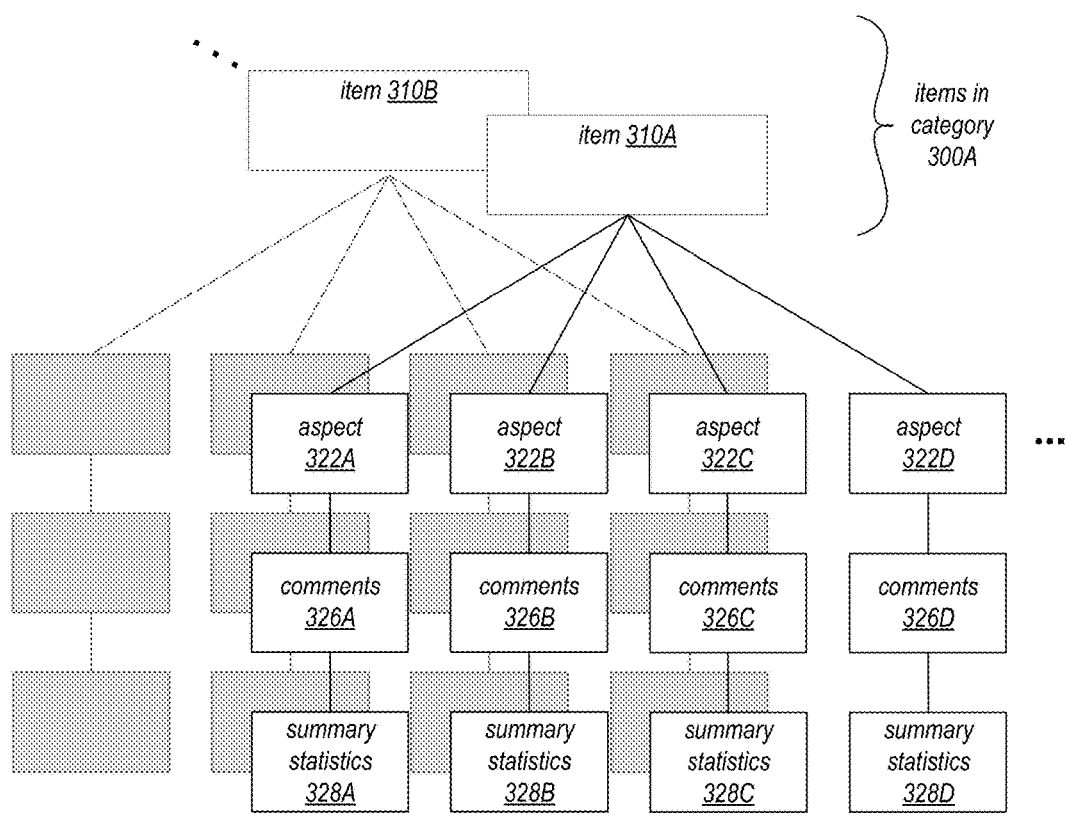
FIG. 3B graphically illustrates comments extracted from community-sourced content for an item that have been aligned with aspects for the category of the item, according to at least some embodiments.
Figure 4:
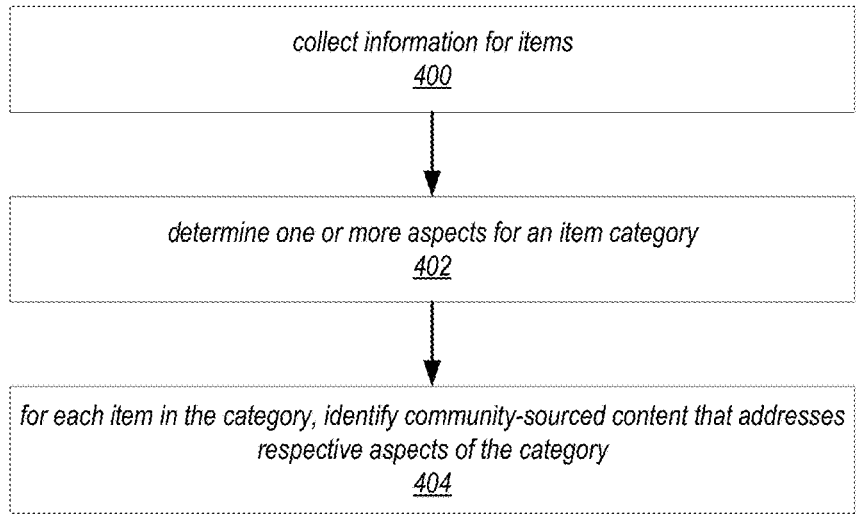
FIG. 4 is a high-level flowchart of a method for determining reasons to buy from item information, according to at least some embodiments.

FIG. 3B graphically illustrates comments 326 extracted from community-sourced content such as customer reviews of an item 310 that have been aligned with aspects 322 for the category 300 of the item 310, according to at least some embodiments. In at least some embodiments, after identifying the aspects 322 for a category 300, as illustrated in FIG. 3A, community-sourced content such as customer reviews for particular items 310 within the category 300 may be aligned with the aspects 322 for the category 300, and comments relevant to the aspects 322 may be extracted from the aligned community-sourced content. In at least some embodiments, for each particular item 310 in a category 300, for example item 310A from category 300A, for each aspect 322 of the category 300, one or more customer reviews (or other community-sourced content) that address the aspect 322 may be identified, and comments 326 relevant to the aspect 322 may be extracted from the community-sourced content, for example using a method as illustrated in FIG. 4 or in FIG. 6. For example, category 300A may be "DSLR cameras", item 310A may be a particular camera "camera X", aspect 322A may be "image quality", and comments 326A may include comments such as "The image quality is superb" and "The camera's images are fantastic" extracted from customer reviews of the camera. While these example comments express positive sentiments towards the respective aspects, note that community-sourced content may include comments that express positive, negative, or neutral sentiment for an aspect, and that in some embodiments the extracted comments may include comments that express positive, negative, or neutral sentiment regarding the respective aspect. FIG. 9A through 9F illustrate an example "aspects" portion of an item page that includes example aspects for a category and that shows extracted comments for each aspect, according to at least some embodiments.

As previously mentioned, in at least some embodiments, summary statistics 328 may be determined for at least some aspects 322 of at least some items 310. Summary statistics 328 may, for example, include ratings or scorings of respective aspects 322 determined from analysis of the respective comments 326. For example, summary statistics 328 for an aspect 322 may include counts of "hits" for the aspect 322 in the community-sourced content, and/or statistics based upon analysis of the sentiment expressed by the extracted comments 326.

Referring to FIGS. 3A and 3B, in at least some embodiments, one or more of the item categories 300, items 310 in each category 300, aspects 322 for the categories 300, and the extracted comments 326 for one or more of the aspects 322 may be periodically or aperiodically evaluated and adjusted according to additional input or information, for example according to the addition or removal of items 310 from a category 300, additional customer reviews or other community-sourced content for items 310, manual or automatic adjustment of aspects 322 of a category 300, and so on.

FIG. 4 is a high-level flowchart of a method for determining reasons to buy from item information, according to at least some embodiments. As indicated at 400, information for items offered for sale via an online merchant's website may be collected from one or more internal and/or external sources. For example, community-sourced content including but not limited to customer reviews may be collected for the items via the online merchant's website. As indicated at 402, one or more aspects for an item or category of items may be identified and named. The aspects may represent various features, groups of features, capabilities, etc. of items that people are generally interested in, and thus may indicate reasons to buy (or in some cases not to buy) to customers. In at least some embodiments, a set of aspects may be identified for categories of items. Note that the aspects for different categories of items may be different. For example, aspects of a camera or category of camera (e.g., DSLR cameras, point-and-shoot cameras, etc.) that a customer may be interested in may generally be different than aspects of a network router. However, there may be some overlap between aspects of different categories of items. For example, inexpensive consumer point-and-shoot digital cameras may be classified in a different category than expensive DSLR cameras, yet some features of cameras that customers may be interested in (e.g., "fast auto focus") may be common across the categories. Note, however, that other features (e.g., "standard flash mount" or "lens availability") may not be common across the categories.

The sets of aspects for the items or categories of items may be manually generated, automatically generated (e.g., using one or more computer-implemented machine learning techniques such as automated semantic analysis techniques), or generated using a combination of manual and automated methods. In at least some embodiments, to generate the aspects for a given type or category of item, data from one or more internal and/or external data sources may be obtained and analyzed using one or more data collection and data analysis techniques. The data collection and data analysis techniques used to determine the aspects for the categories may include manual techniques, automated techniques (e.g., one or more computer-implemented machine learning techniques such as automated semantic analysis techniques), or a combination of manual and automated techniques (e.g., a partially automated or human-supervised semantic analysis technique). The internal data sources may include one or more of, but are not limited to, product detail data (e.g., data from an item catalog 120 maintained by the merchant system 10 as shown in FIG. 1), and community-sourced data or content including but not limited to customer review data, website usage data (e.g., customer search information such as search terms and search phrases farmed from a search engine of the website), customer service data (e.g., customer service emails from customers of the website), and content from Q&A or other forums related to the website's items that the customers may participate in. External data sources may include one or more of, but are not limited to, websites of the product manufacturers or distributors that may include technical, marketing, or other product descriptions, websites of third-party product reviewers that may describe, compare and rate similar items based on one or more features or other metrics, other third-party sites that may provide information or descriptions of items, social media, or in general any source for information about products that is external to the merchant system and that can be farmed for information or data regarding specific products or categories of products.

As indicated at 404 of FIG. 4, for each item in a category, one or more items of community-sourced content (e.g., customer reviews) that address each respective aspect may be identified. After identifying a set of aspects for a type or category of item, the method may analyze community-sourced content including but not limited to customer reviews for one or more items within the category to identify comments or that are relevant to the identified aspects of the category. In at least some embodiments, the method may filter the textual content being analyzed according to determined keywords to help identify words or phrases that imply a category or type. In at least some embodiments, one or more machine learning techniques such as automated semantic analysis techniques may be used in analyzing the community-sourced content to align the content to the aspects, in other words to identify particular content that is relevant to particular aspects of the items.

In at least some embodiments, the method may filter the content being analyzed according to particular customer information to personalize the reasons to buy for particular customers. Examples of customer information that may be used in the filtering include, but are not limited to, demographic information, browsing history, purchasing history, and so on. In addition, user input may be used to filter the reasons to buy information in some embodiments.

Figure 5:
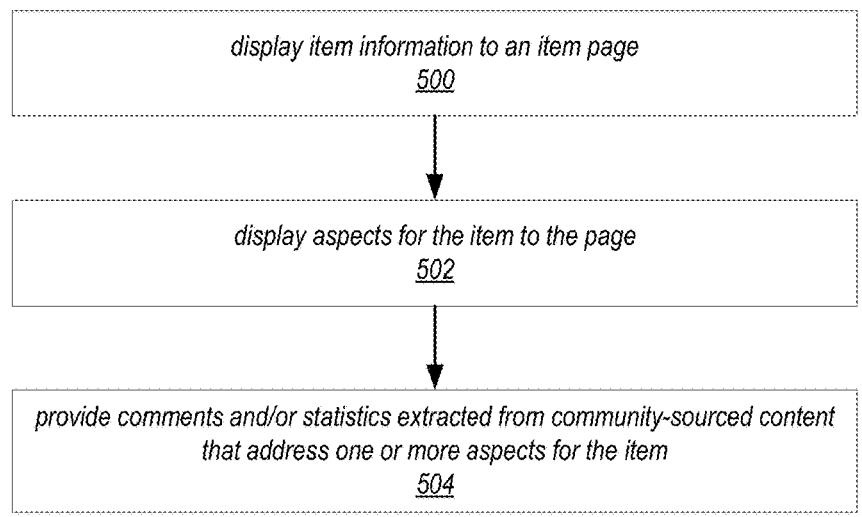
FIG. 5 is a high-level flowchart of a method for displaying reasons to buy, according to at least some embodiments.

In at least some embodiments, when a customer goes to an item page on an online merchant's website, the reasons to buy for the respective item that were extracted from community-sourced content for the item, for example according to the method of FIG. 4, may be displayed. FIG. 5 is a high-level flowchart of a method for displaying reasons to buy extracted from customer reviews, according to at least some embodiments. For reference, FIG. 8A illustrates an example item page that displays reasons to buy for the item, and FIGS. 9A through 9F illustrate an example "aspects" portion of an item page for a particular camera in a camera category. As indicated at 500 of FIG. 5, when a customer navigates to an item page on the website, information for the item may be displayed to the page. In addition, one or more aspects for the item or category of item may be displayed to the page, as indicated at 502. The aspects may represent various features, groups of features, capabilities, etc. of the item that people are generally interested in, and thus may signify reasons to buy (or in some cases not to buy) the item to customers. In at least some embodiments, the aspects may be displayed as selectable user interface (UI) elements, for example as UI buttons or menu item choices. In some embodiments, a <count> may be displayed for or with each aspect that indicates how many customer reviews (or other units of community-sourced content) of this particular item are "hits" for the particular aspect.

As indicated at 504, for each aspect, portions of one or more customer reviews or other community-sourced content (referred to herein as extracted comments) of this item that address or are relevant to the aspect may be displayed. Note that, in some embodiments, extracted comments may only be displayed for a currently selected aspect (see, e.g., FIG. 8A and FIGS. 9A through 9F). In some embodiments, the aspects and/or extracted comments that are displayed may be filtered and personalized according to customer information and/or preferences.

At 504, instead of or in addition to displaying extracted comments for an aspect, in some embodiments summary statistics for the aspect may be displayed. Summary statistics for an aspect may, for example, include ratings or scorings for the aspect determined from analysis of the extracted comments for the aspect. For example, summary statistics for an aspect may include the count of "hits" for the aspect as previously mentioned. Summary statistics may also include, but are not limited to, data related to sentiment (e.g., a ratio of positive to negative sentiment for the aspect) as determined from an analysis of the extracted comments.

In some embodiments, a customer may be redirected to another item in the category (or in some cases in another category) with one or more "better" reasons to buy from the interface of the item page. Note that two similar items may be compared based on the aspects that are common between the two items. For example, the summary statistics for two items in a category may be compared to, for example, determine that a first item is preferred by the customers in regard to an aspect A since the ratio of positive sentiment to negative sentiment for aspect A is much higher for the first item than it is for the second item.

In some embodiments, a customer can agree or disagree with a "reason to buy" via the item page interface. Thus, confidence in summarization statements may be strengthened by providing product owners a simple (e.g., one tap) way to agree or disagree with the provided reasons to buy. For example, summary statistics may be analyzed to determine that customers generally prefer product A over product B in regard to an aspect A, and an indication of that determination may be displayed as a "reason to buy" for product A. Via the interface, customers may agree (or disagree) with this, and the customers' input may be collected and applied in a re-analysis of customer sentiment regarding the products. The "reasons to buy" for product A (and/or for product B) may be adjusted according to this analysis.

Figure 6:
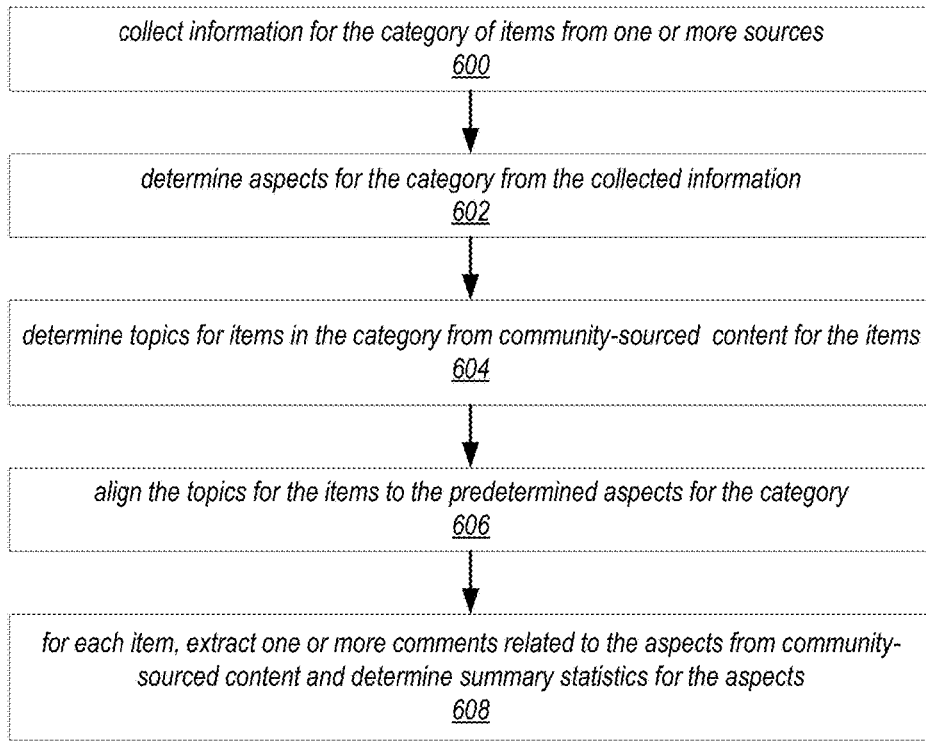
FIG. 6 is a flowchart of a method for determining aspects for a category and aligning community-sourced content to the aspects, according to at least some embodiments.

FIG. 6 is a flowchart of a method for determining aspects for a category and aligning community-sourced content to the aspects, according to at least some embodiments. As indicated at 600, information may be collected for a category of items from one or more sources. The sources may include one or more sources internal to the merchant system (e.g., item catalog, community-sourced content such as customer reviews, content from Q&A or other forums, query logs for search engines, etc.), and/or one or more sources external to the merchant system (e.g., product manufacturers' websites, third-party product review websites, etc.). The collected information may form a corpus of textual data for the category.

As indicated at 602, candidate aspects for the category may be determined from the collected information. In at least some embodiments, the collected information may be analyzed according to one or more data analysis techniques to determine the aspects for the category. The data analysis techniques used to determine the aspects for a category may include manual techniques, automated techniques (e.g., one or more computer-implemented machine learning techniques such as automated semantic analysis techniques), or a combination of manual and automated techniques (e.g., a partially automated or human-supervised semantic analysis technique). In at least some embodiments, topics may be generated for the category from the collected information according to a machine learning technique, for example an automated semantic analysis technique. The aspects for the category may then be generated from the machine-learned topics. In at least some embodiments, generating the aspects from the topics may be performed according to manual techniques, automated techniques, or a combination of manual and automated techniques. In at least some embodiments, generating the aspects from the topics may involve mapping, consolidating or combining the machine-determined topics for the category under appropriate aspects of the category. In at least some embodiments, generating the aspects may involve manually or automatically naming the aspects with names that are meaningful to humans and that express features or capabilities that are generic to the category, and then manually or automatically grouping the machine-learned topics according to the named aspects.

In at least some embodiments, a candidate set of aspects or topics may be generated for a category using one or more machine learning or other automated techniques, and the candidate set may then be further refined by other techniques, including but not limited to manual techniques, automated techniques, or combinations of manual and automated techniques, to generate a set of "reasons to buy" aspects for the category. For example, in some embodiments, a human, an automated process, or a human-supervised process may review a candidate set of topics or aspects for a category, may prune terms deemed less appropriate for the category, combine similar terms under aspect headings, provide or modify names for aspects, and so on, to generate a final set of aspects for the category.

In some embodiments, a semantic analysis technique (e.g., a topic modeling technique) may be used in determining aspects for a category. In at least some semantic analysis techniques, a collection of text documents may be partitioned into categories or partitions. The semantic analysis technique is applied, and the topics that emerge may generally have some relation to the categories of text documents. As an example method for determining aspects for a category, to determine reasons to buy aspects for cameras, source information may be divided into categories, for example reviews of cameras and reviews of other products (e.g., reviews of other electronic products). A semantic analysis technique may be applied to the categorized corpus of textual information. The topics that emerge may have a certain relationship to the categorizations. In particular, topics may emerge that are particularly representative or useful to the product category of interest, e.g. cameras, rather than to the other products.

In some embodiments, an MI/PMI (mutual information/pointwise mutual information) technique may be used in determining aspects for categories. In particular, a PMI technique may be leveraged in distinguishing source information closely related to a category of interest from source information directed at other categories. In an MI/PMI technique, a metric (MI/PMI) may be measured between different words or phrases. The method may look for words/phrases that have high MI/PMI with a category label. Those words/phrases (and therefore documents that include those words/phrases) are likely to be closely related with the category. Thus, an MI/PMI technique may be used to categorize a collection of documents or other data sources into categories, for example reviews of cameras and reviews of other products, or blog posts or websites comparing cameras and blog posts or websites comparing other products.

In at least some embodiments, after determining (and naming) a set of aspects for a category of items, information from the customer reviews of items in the category may be aligned with the predetermined aspects. As indicated at 604, topics for items in the category may be determined from community-sourced content (e.g., customer reviews of the items) according to one or more machine learning techniques, for example automated semantic analysis techniques. In at least some embodiments, topics may be determined from the community-sourced content (e.g., customer reviews) for an item according to a machine learning technique. The topics for the item may then be aligned to the predetermined aspects for the category, as indicated at 606. Aligning the item's topics to the predetermined aspects may involve mapping, consolidating or combining the machine-determined topics under appropriate predetermined aspects of the category.

As indicated at 608, for each item in the category, comments for the aspects may be extracted from the community-sourced content (e.g., customer reviews of the items) for the items. One or more of the comments for one or more of the aspects of an item may, for example, be displayed to an item page for the item, for example as described in FIG. 5 and illustrated in FIGS. 8A through 9F. In addition, in at least some embodiments, summary statistics may be determined for the aspects from the aligned community-sourced content. Summary statistics for items may include counts of "hits" for one or more aspects in the community-sourced content for the items. As another example, summary statistics may include data indicating positive vs. negative sentiment for one or more aspects of the items.

FIGS. 8A through 8F graphically illustrate examples of user interfaces that may be presented by an online merchant's website that may include or leverage the product information generated according to the reasons to buy methods as described herein to assist customers in making decisions when considering products or items in a category for purchase. Note that all of these interfaces are given by way of example, and are not intended to be limiting. The product information generated according to the reasons to buy methods as described herein may be used or displayed in other ways and in other user interface contexts than those shown.

FIG. 8A illustrates an example item page that displays reasons to buy for an item, according to at least some embodiments. When a customer navigates to an item page 1400 on an online merchant's website, information 1410 for the item may be displayed to the page 1410, for example vendor- or manufacturer-supplied descriptions, images, pricing information, availability information, product numbers, ordering information, and so on. The item page 1400 may also include various user interface elements such as menus, buttons, tabs, scroll bars, hot links, and so on, that may be used for navigation (e.g., go to another page), page control (e.g., scroll down), or various other purposes. The customer may interact with the user interface elements of the item page 1400, for example using a cursor control device such as a mouse and a keyboard or, on a touch-enabled device, touch gestures input to a touch screen.

In at least some embodiments, the item page 1400 may include a customer ratings and information 1420 section. In some embodiments, customer ratings and information 1420 section may include customer rating information 1430, for example an overall average customer rating for the item (e.g., based on a number of "stars" or other metric that purchasers may rate items with). Customer ratings and information 1420 section may include an aspects 1440 section in which the reasons to buy information for the item is displayed. Aspects 1440 section may include one or more reasons to buy aspects for the item or category of item. In at least some embodiments, for each aspect, one or more relevant comments extracted from customer reviews of the item that were aligned to the aspects may be displayed. In some embodiments, a <count> may be displayed for each aspect that indicates how many reviews of this item are "hits" for that particular aspect. In some embodiments, the count may be used as an indicator of relevance of the aspects in regard to this item, and may also be used in comparing this item with other items of the same type or category. For example, a first aspect with more hits (a higher count) for this item may be considered more relevant than a second aspect with fewer hits. In some embodiments, the aspects may be sorted, for example according to <count>. In some embodiments, a customer name or identifier may be provided with each comment. For example, "customer A" identifies a customer that provided <extracted comments A>. Note that, in some embodiments, extracted comments may only be displayed for a currently selected aspect (see, e.g., FIGS. 9A through 9F). In FIG. 8A, "aspect A" is selected, and currently displayed comments A-F from customers A-F that are related to aspect A are displayed. Selecting aspect B may display another set of comments related to aspect B, and so on.

In some embodiments, the aspects and/or extracted comments that are displayed in aspects 1440 may be filtered and personalized according to customer information and/or preferences as previously described.

In some embodiments, instead of or in addition to displaying extracted comments for a selected aspect in aspects 1440, summary statistics for the aspect, or summary statistics for multiple aspects, may be displayed. Summary statistics for an aspect may, for example, include ratings or scorings for the aspect determined from analysis of the extracted comments for the aspect. For example, summary statistics for the aspects may include the counts of "hits" for the aspects as shown in aspects 1440 of FIG. 8A.

Figure 8B:
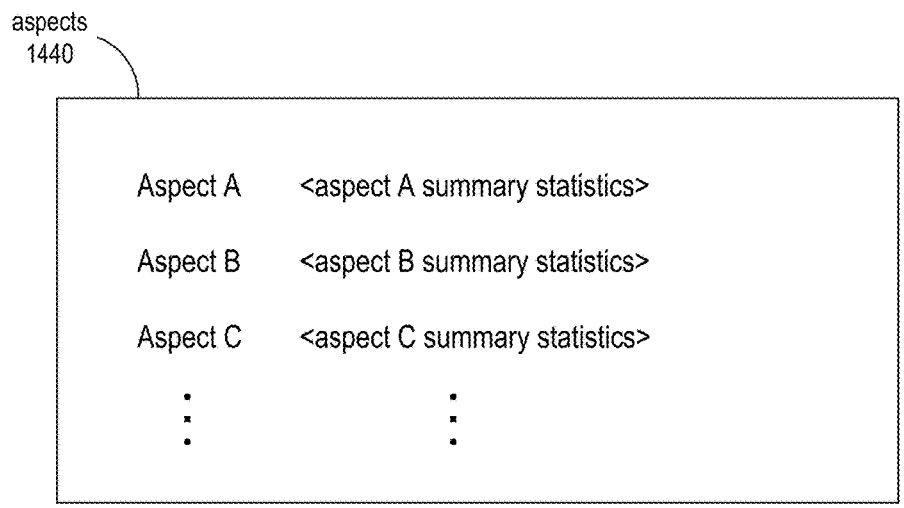
FIG. 8B illustrates displaying summary statistics for two or more aspects of an item, according to at least some embodiments.

FIG. 8B shows an example aspects 1440 portion of an item page 1400 in which summary statistics for two or more aspects of the current item are displayed, according to at least some embodiments. Summary statistics for an aspect may include one or more metrics or statistics determined from analysis of customer sentiment as expressed in the extracted comments, for example a ratio of positive to negative sentiment for the aspect, or other statistics based on sentiment scoring. Summary statistics may be displayed graphically and/or textually. For example, summary statistics may be displayed as charts or graphs of various types. While FIG. 8B shows summary statistics for aspects of a single item displayed in an aspects 1440 interface, in at least some embodiments summary statistics for aspects of two or more items may be displayed on the same interface or page for comparison.

Note that the summary statistics display for multiple aspects 1440 of an item, for example as shown in FIG. 8B, may be more compact than the aspects 1440 display in FIG. 8A that shows several comments for a selected aspect of an item. As such, the more compact display of aspect information for an item as shown in FIG. 8B may be particularly useful for interfaces on consumer devices with small screens such as cellphones, smartphones, and small tablet or pad devices.

Returning to FIG. 8A, in some embodiments, a customer may be redirected to another item in the category or in another category with one or more better or more favorable reasons to buy aspects from the interface of the item page. FIG. 8A shows an example "direct to another item" user interface element that may, for example, indicate or direct the customer to another item for which one or more of the reasons to buy may be more favorable for the customer than are the reasons to buy for the current item. For example, the summary statistics for two items in a category may be compared to, for example, determine that another item than the item displayed on the current item page 1400 is preferred by customers in regard to aspect A since the ratio of positive sentiment to negative sentiment for aspect A is much higher for the other item than it is for the current item. Thus, the interface may direct the customer to the other item as being preferred in regards to at least aspect A.

In some embodiments, a customer can agree or disagree with a "reason to buy" via the item page interface (e.g., via the "rate comments" element of FIG. 8A). Thus, confidence in summarization statements may be strengthened by providing product owners a simple (e.g., one tap) way to agree or disagree with the provided reasons to buy. For example, summary statistics may be analyzed to determine that customers generally prefer the current item over another item in regard to aspect A, and an indication of that determination may be displayed for the current item. Via the interface (e.g., via the "rate comments" element), customers may agree (or disagree) with this determination, and the customers' input may be collected and applied to the analysis of customer sentiment regarding the current item.

In some embodiments, partial or full customer reviews may also be displayed on the page 1400, with user interface elements for showing more or fewer reviews or more or less of a given review provided in some embodiments. In some embodiments, a customer may add their own review via the interface, e.g. via an "add review" element of FIG. 8A.

Figure 8C:
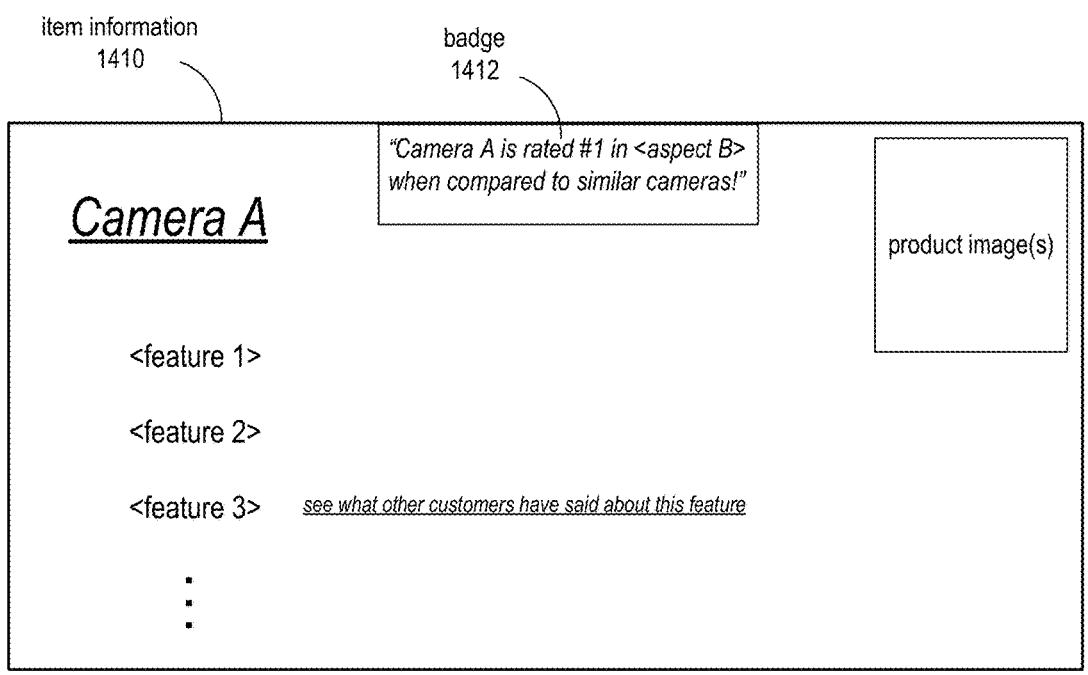
FIG. 8C illustrates displaying reasons to buy tags or badges for an item, according to at least some embodiments.
Figure 9A:
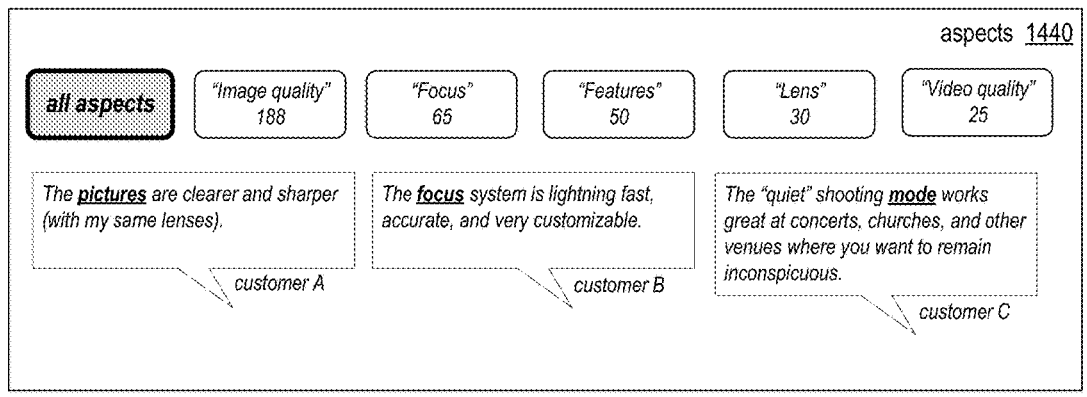
FIG. 9A through 9F illustrate an example aspects portion of an item page that may be used to present extracted comments related to various aspects of an item to customers as reasons to buy the item, according to at least some embodiments.
Figure 9B:
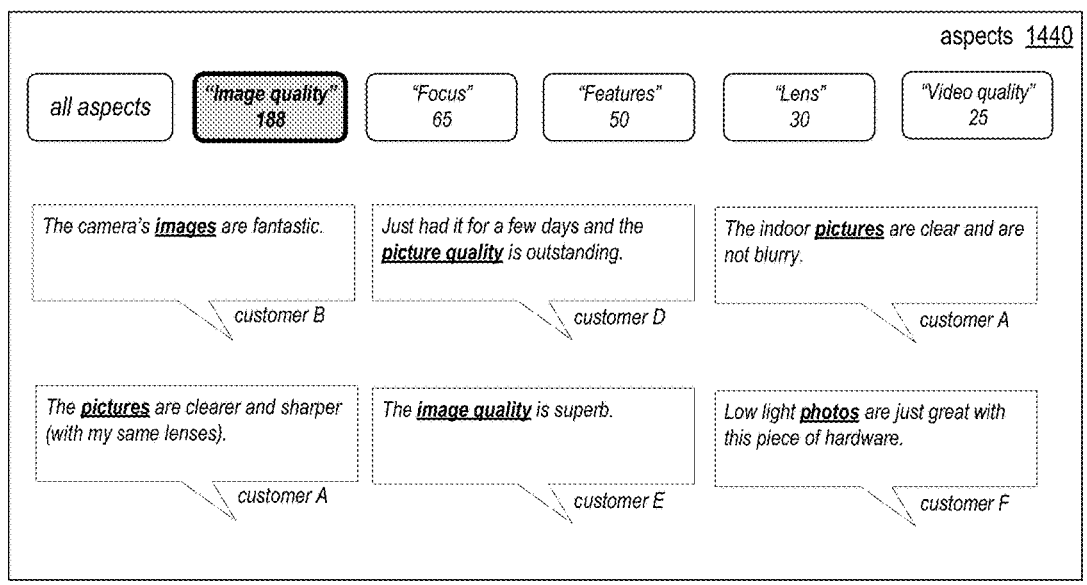
Figure 9C:
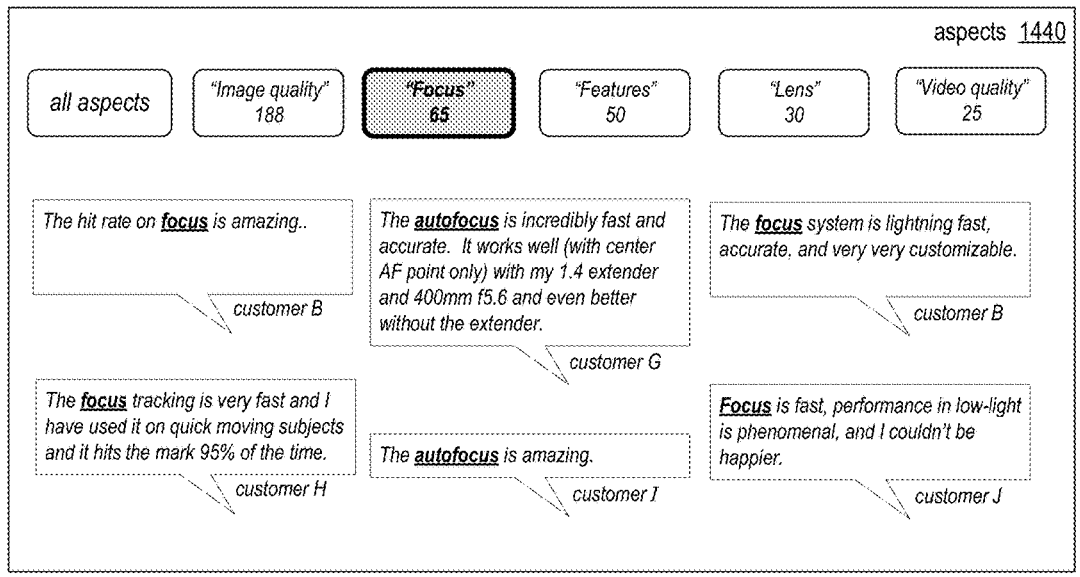
Figure 9D:
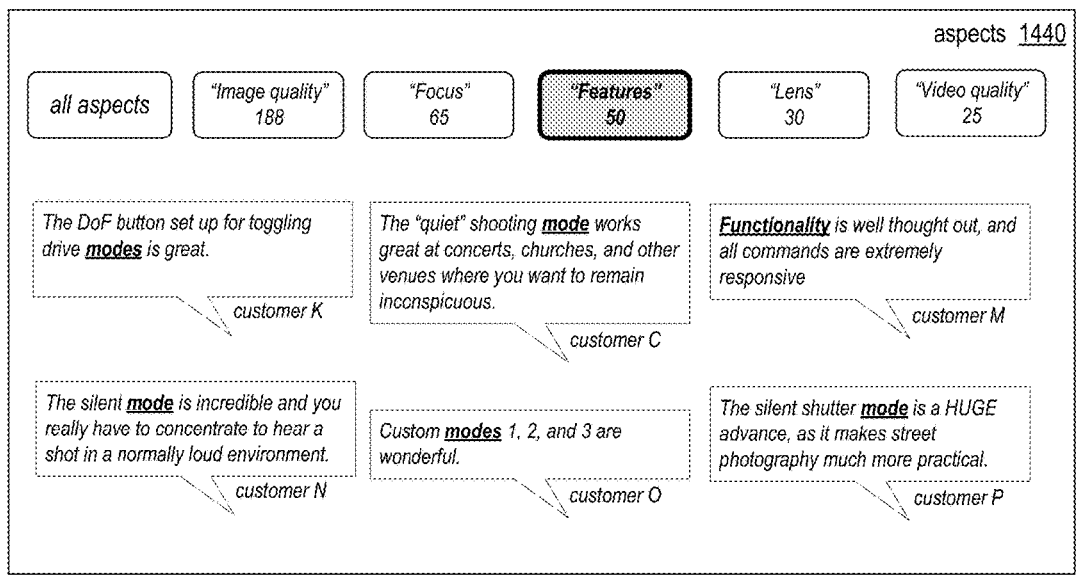
Figure 9E:
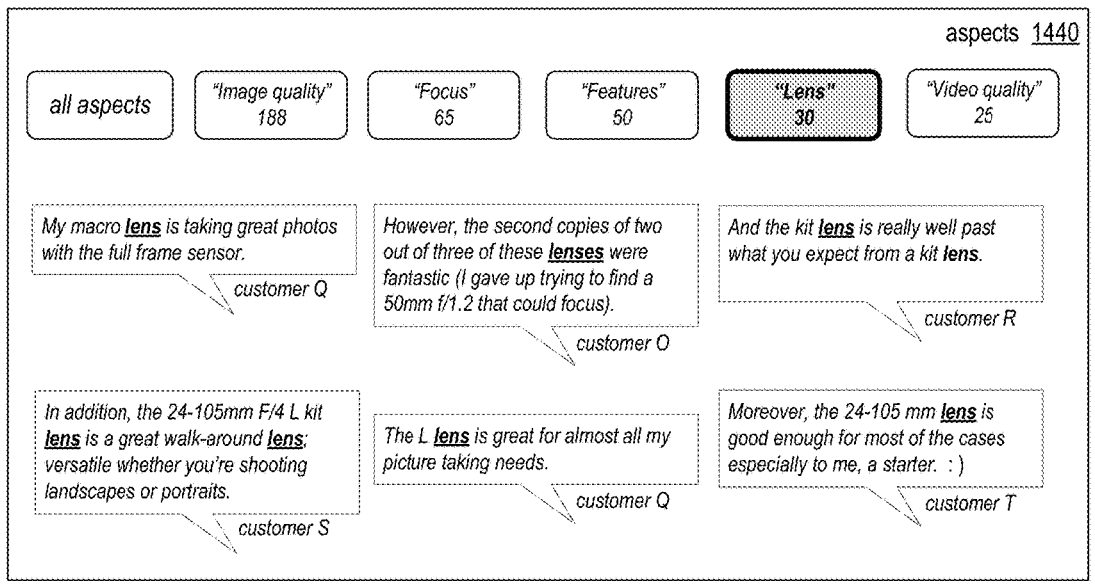
Figure 9F:
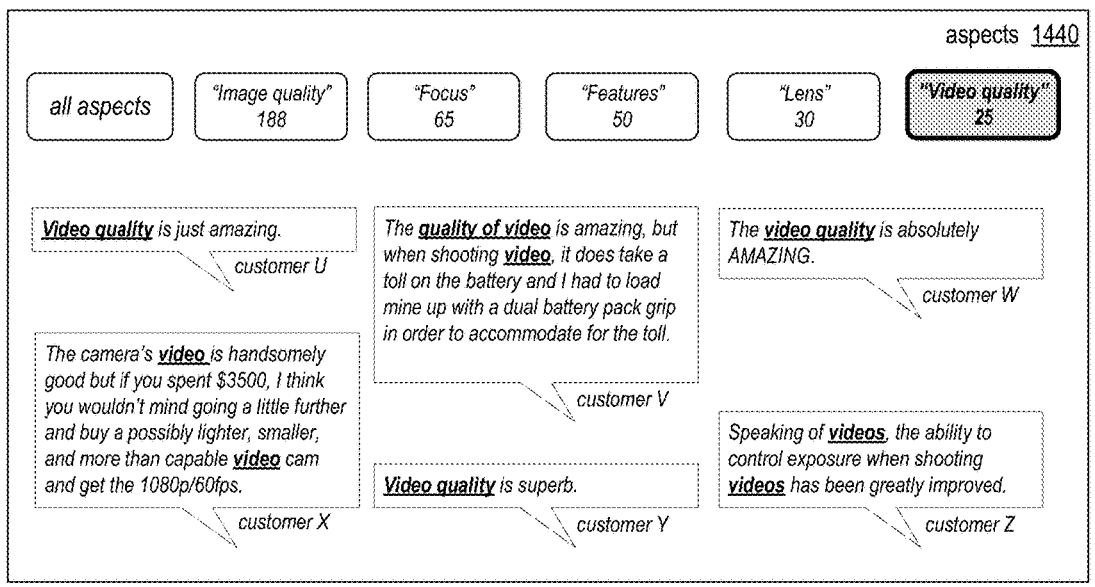

As shown in FIG. 8A, an item page 1400 may include an item information 1410 portion or section that may, for example, display vendor- or manufacturer-supplied descriptions, images, pricing information, availability information, product numbers, ordering information, and so on. FIG. 8C illustrates an example item information 1410 user interface portion that displays product information including a product name ("Camera A"), and several features of the product (shown as <feature 1>, <feature 2>, <feature 3> . . . ). One or more images of the product may also be displayed, as well as other product information (pricing, availability, shipping options, etc.). The product data may, for example, be provided by or uploaded from third parties such as product manufacturers, distributors, or suppliers, and may generally include objective data about the product, for example product descriptions, specifications, claimed features, components, and/or capabilities of the product. In some embodiments, instead of or in addition to displaying extracted comments and/or summary statistics for in aspects 1440 section, information about the product determined according to the "reasons to buy" methods as described herein may be displayed with the item information 1410. For example, as shown in FIG. 8C, an item page may be tagged or "badged" with information determined according to the reasons to buy methods, for example to indicate particular aspects that the product excels in according to an analysis of the product's community-sourced content (e.g., customer reviews) as described herein. In the example shown in FIG. 8C, badge 1412 indicates that "Camera A is rated #1 in <aspect B> when compared to similar cameras!" However, note that the example of badging given in FIG. 8C is not intended to be limiting. Providing such badging in a conspicuous location, for example at the top of an item page with the product information, may provide a more direct and obvious way to indicate significant "reasons to buy" aspects of the product to customers than the information displayed in the aspects 1440 user interface element as previously described.

In some embodiments, other user interface elements related to the "reasons to buy" method may be provided in the item information 1410 section. For example, as shown in FIG. 8C, in some embodiments a hot link ("see what other customers have said about this feature") may be provided for a particular feature or features (feature 3 in this example) via which the customer can navigate to a display of information about one or more aspects of the item related to that particular feature. For example, selecting the link may display aspect information related to the feature as illustrated in the aspects 1440 user interface element as shown in FIG. 8A (a selected set of extracted comments for one or more aspects related to the feature) or FIG. 8B (summary statistics for one or more aspects related to the feature).

FIGS. 9A through 9F illustrate an example "aspects" portion of an item page for a particular example camera in a camera category (e.g., a "DSLR camera" or "high-end camera" category), according to at least some embodiments. The aspects 1440 interface may present one or more aspects for the camera category that may provide reasons to buy (or not to buy) particular cameras, according to at least some embodiments. A different reason to buy aspect is selected in each of FIGS. 9A through 9F. In some embodiments, the aspects may be displayed as selectable user interface (UI) elements, for example as UI buttons or menu item choices. In some embodiments, for each aspect, when selected, one or more representative comments that are extracted from customer reviews for the particular camera may be displayed. In some embodiments, an "all aspects" element may be provided that, when selected, displays one or more of the most relevant overall comments for the item. In some embodiments, a <count> may be displayed for or with each aspect that indicates how many reviews of this particular item are "hits" for the particular aspect. For example, for "image quality", there are 188 customer reviews that include comments that relate to the aspect "image quality", while for "lens", there are 30 such reviews. In some embodiments, the count may be used as an indicator of relevance of the aspects in regard to this item, and may also be used in comparing this item with other items of the same type or category. For example, a first aspect with more hits (a higher count) for this item may be considered more relevant than a second aspect with fewer hits. In some embodiments, as shown in FIGS. 9A through 9F, the aspects may be displayed in order according to the number of hits. However, the aspects may be displayed in any order in various embodiments.

Comparing and Searching for Items According to Aspects

In at least some embodiments, one or more aspects may be common across a type or category of item, and thus the information extracted from the community-sourced content (e.g., customer reviews) about one or more aspects of a category of item may be used to compare items within the category. Note, however, that some aspects may also be common to two or more categories, and thus may be used to compare items across those categories. In addition to facilitating comparisons of items within or across categories, the aspects for categories of items may be used in searches for items, for example as search strings or as filters for searches. Summary statistics for aspects of items, as well as other information generated by the reasons to buy methods as described herein, may be made available to search engines or in search features of the online merchant's web site so that customers may search for products based at least in part upon the aspects or reasons to buy for the products. For example, one or more aspects of a category or type of item may be used as a filter in searching for items of that category or type, or for searching for items across categories.

In some embodiments, product comparisons and/or searches based on the aspects or other reasons to buy information may be personalized to particular customers according to customer information or input. Examples of customer information that may be used may include, but are not limited to, demographic information, search history, browsing history, purchasing history, and so on. As an example, if a particular customer has only browsed for or purchased inexpensive cameras or camera equipment in the past, then searches for cameras or camera equipment or accessories may be filtered for that customer to provide information for relatively inexpensive cameras. In addition, user input may be used to filter the reasons to buy information returned from searches or used in comparisons in some embodiments.

In addition, summary statistics for aspects of items or other information generated by the various reasons to buy methods may be made available to internal or external entities for use in marketing or advertising of products. For example, emails may be sent to particular customers that indicate particular products that have particularly high ratings for one or more aspects based on analysis of the community-sourced content for the products. The particular customers may be determined based on collected customer information such as demographic information, search history, browsing history, and purchasing history. As an example, if a particular customer has expressed interest in high-end, DSLR cameras with good autofocus and good video capture capabilities, then a high-end DSLR camera that scores well in both of those aspects when compared with other cameras in the category may be advertised to the customer.

Figure 7:
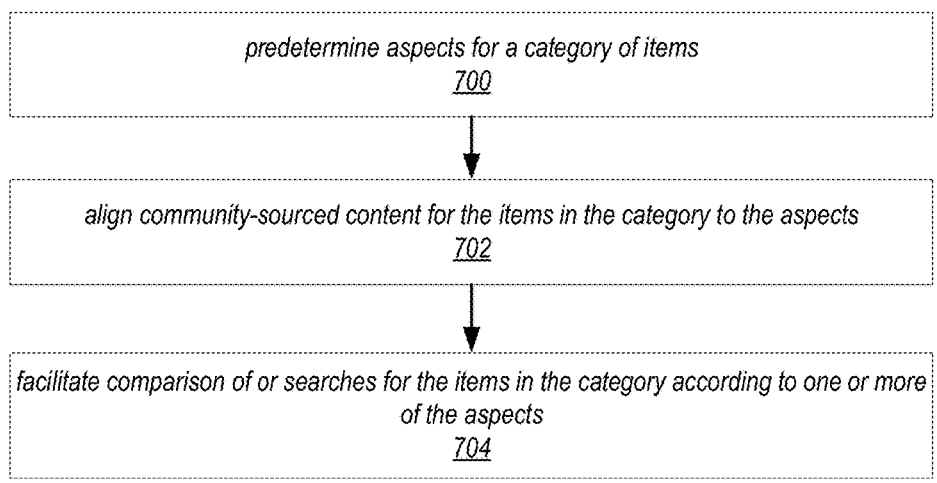
FIG. 7 is a high-level flowchart of a method for comparing and/or searching for items using predetermined aspects, according to at least some embodiments.

FIG. 7 is a high-level flowchart of a method for comparing and/or searching for items using predetermined aspects, according to at least some embodiments. As indicated at 700, aspects for a category of items may be predetermined, for example according to the methods of FIGS. 4 and 6. As indicated at 702, community-sourced content, for example customer reviews of items in the category, may be aligned to the predetermined aspects. For each aspect, one or more comments related to the aspect may be extracted from the aligned community-sourced content. In at least some embodiments, summary statistics may be computed for the aspects. For example, in some embodiments, a <count> may be determined for each aspect that indicates how many customer reviews of this item (or other units of community-sourced content) are "hits" for that particular aspect. As another example, in at least some embodiments, the extracted comments for an aspect may be analyzed, for example using a machine learning technique, to determine whether the comments express positive, negative, or neutral sentiment regarding the respective aspect. In these embodiments, summary statistics may, for example, include data indicating a ratio of positive to negative sentiment for the respective aspect as determined from an analysis of the comments. In some embodiments, one or more of the summary statistics, for example the count or sentiment statistics, may be used as indicators of relevance of the aspects in regard to this item, and may also be used in comparing this item with other items of the same type or category.

As indicated at 704, comparisons of items in the category may be facilitated according to one or more of the predetermined aspects. For example, two or more items within a category may be compared based upon relative counts for two or more of the common aspects, or based on one or more other summary statistics such as sentiment statistics. In at least some embodiments, in addition to facilitating comparisons of items within categories, the aspects may be used in searches for items, for example as search strings or as filters for searches.

Figure 10A:
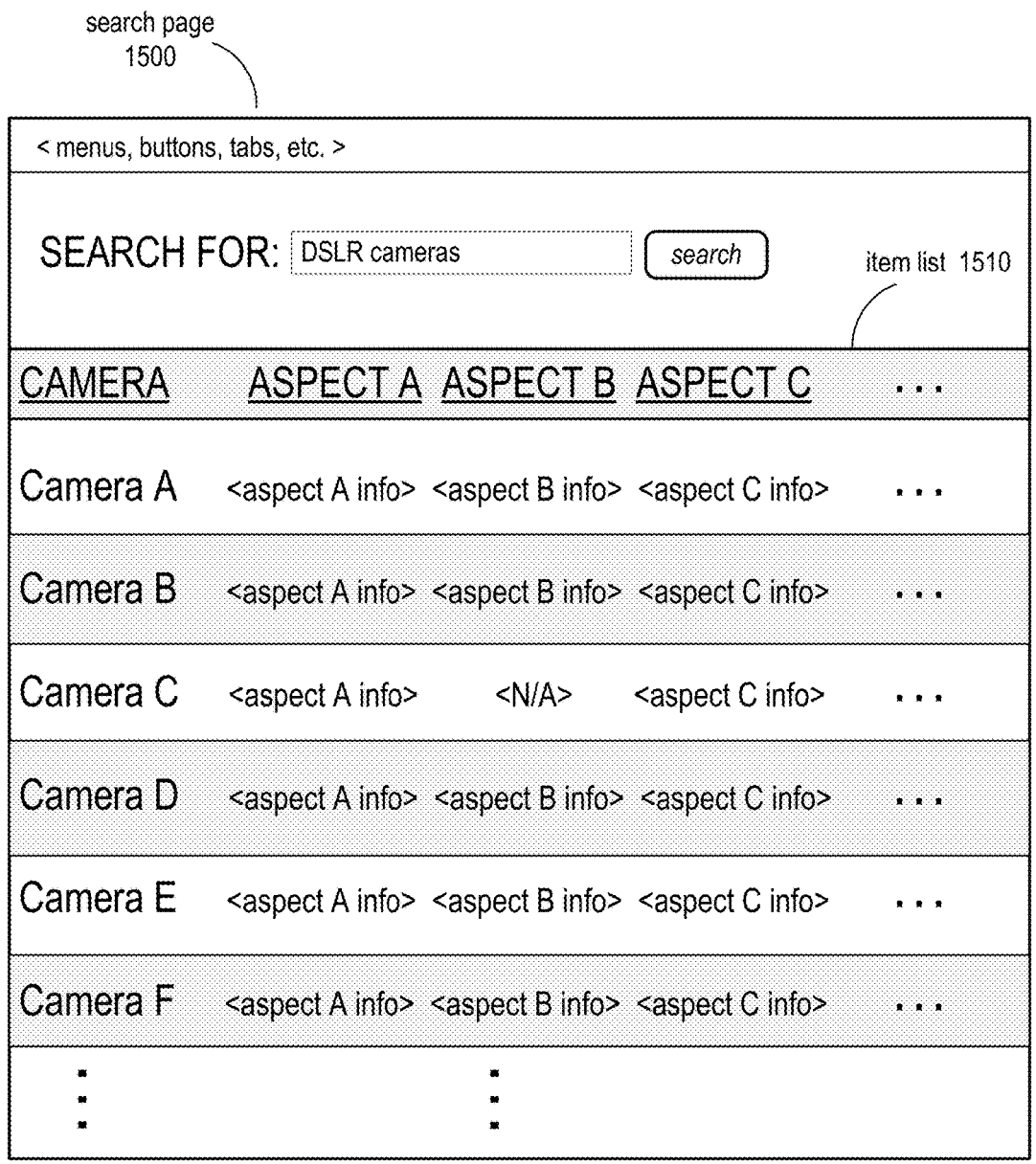
FIGS. 10A through 10C illustrate example methods for searching for and comparing items based upon the aspects, and for displaying search and comparison results, according to at least some embodiments.
Figure 10B:
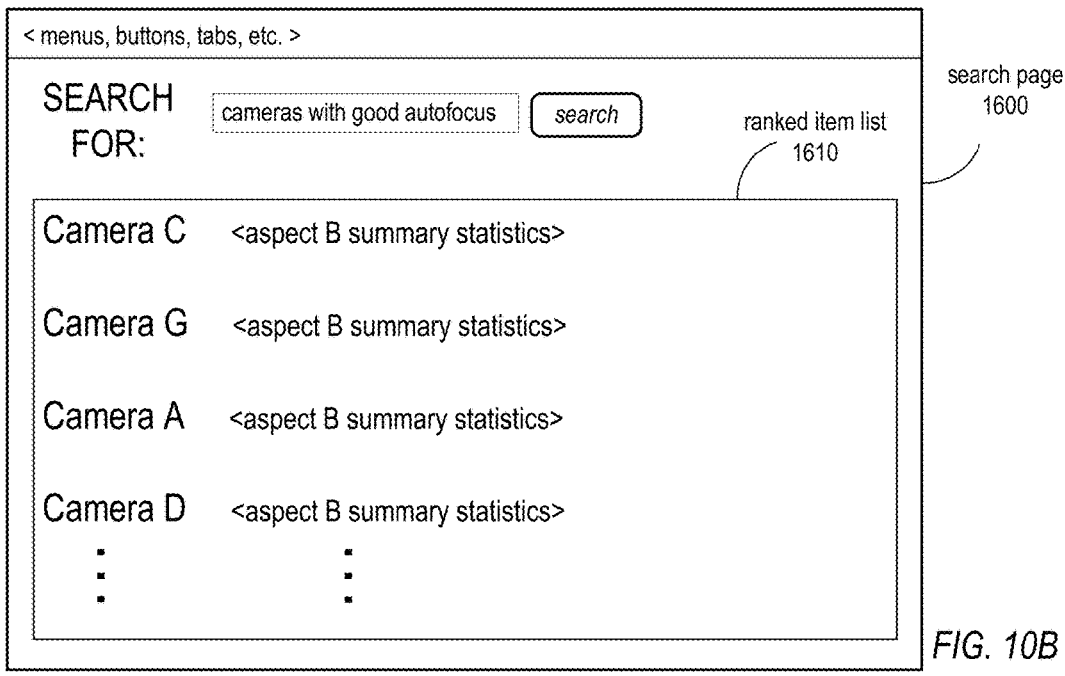
Figure 10C:
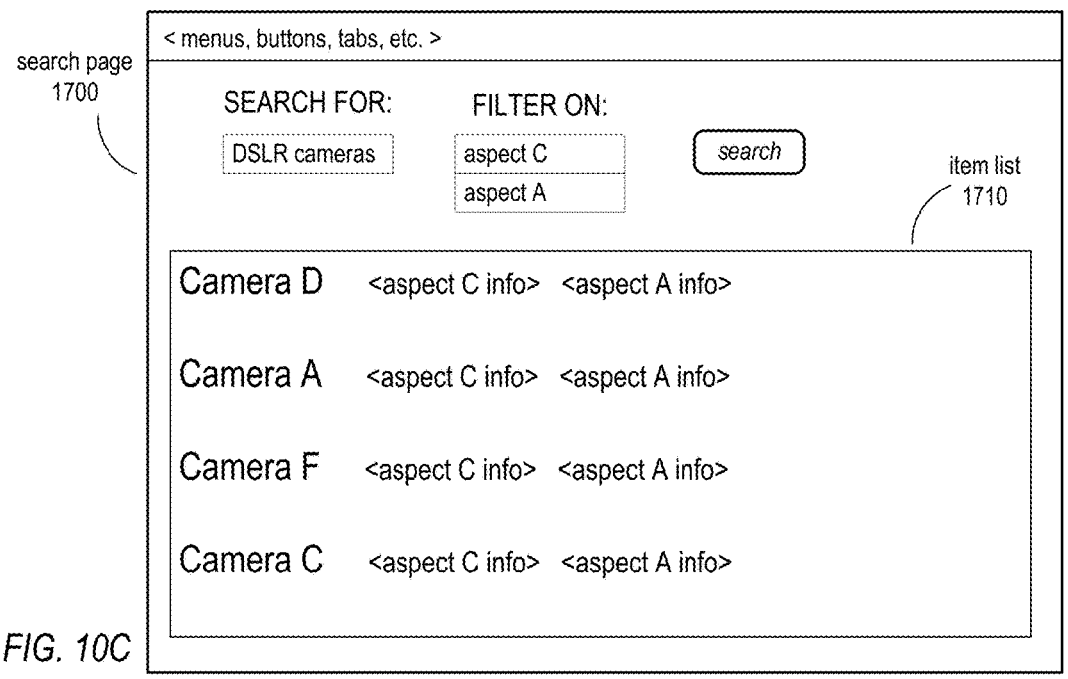
Figure 11A:
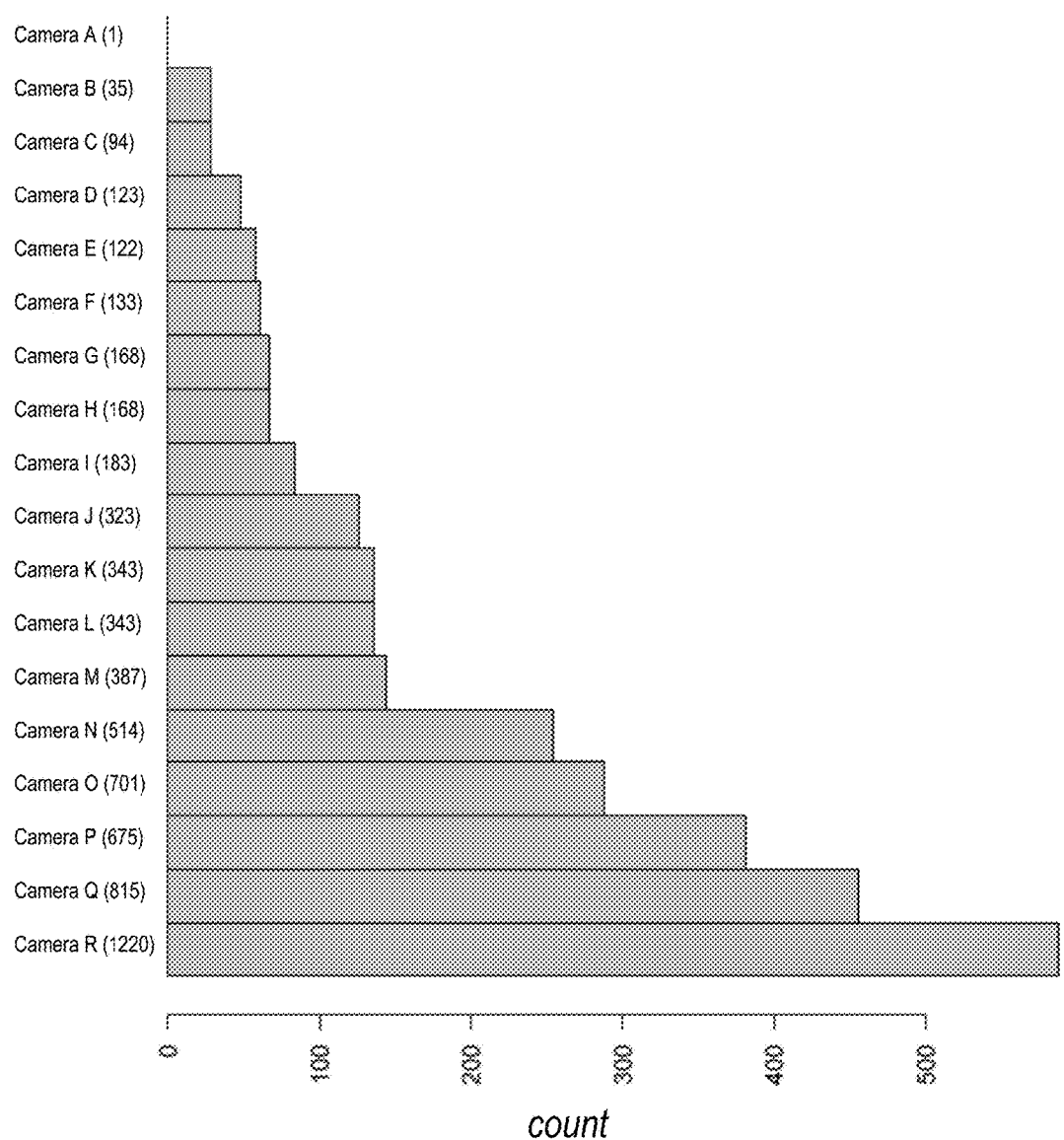
FIGS. 11A through 11L illustrate a comparison of how items in a category perform based on alignment of predetermined aspects for the category, according to at least some embodiments.
Figure 11B:
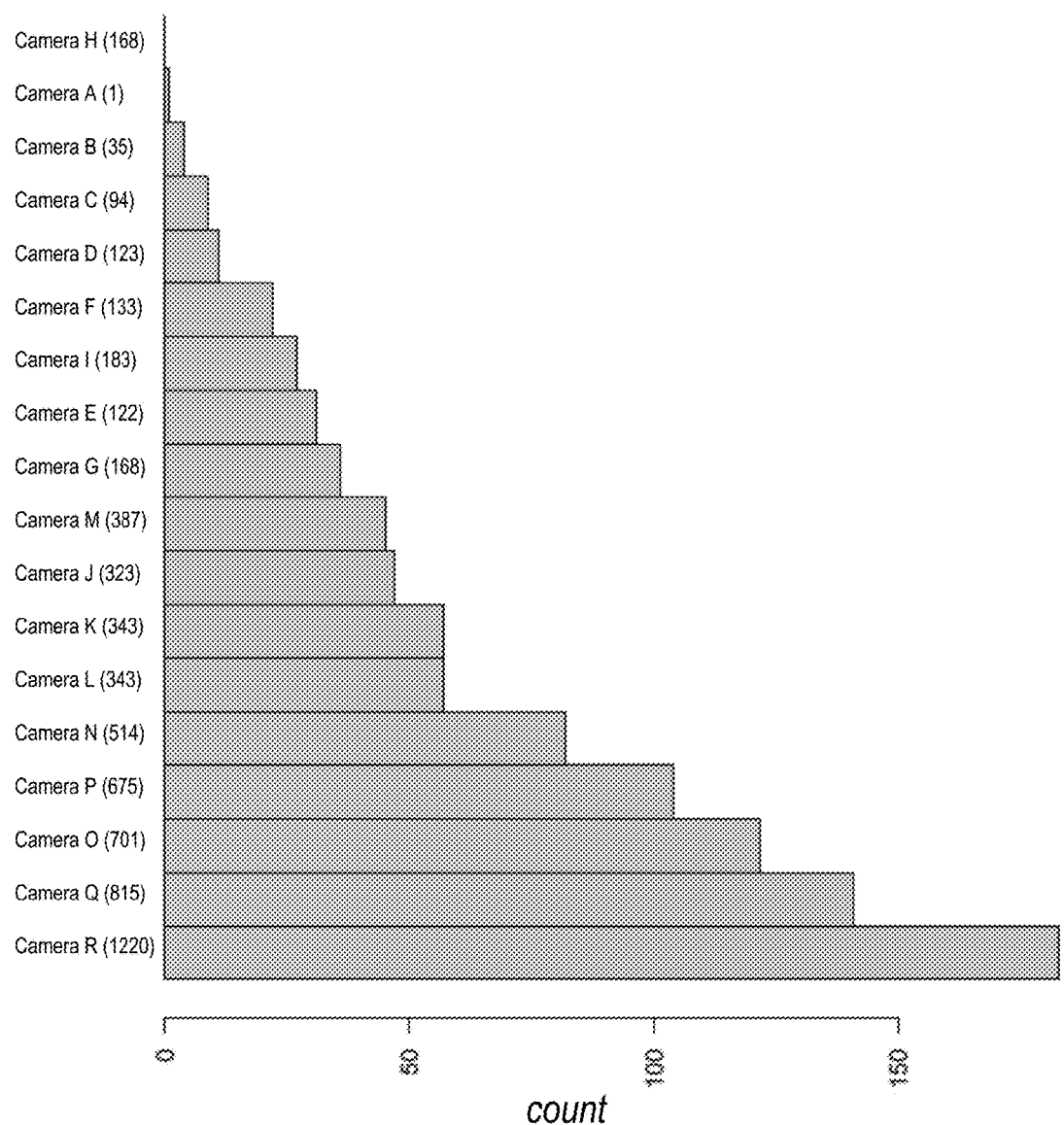
Figure 11C:
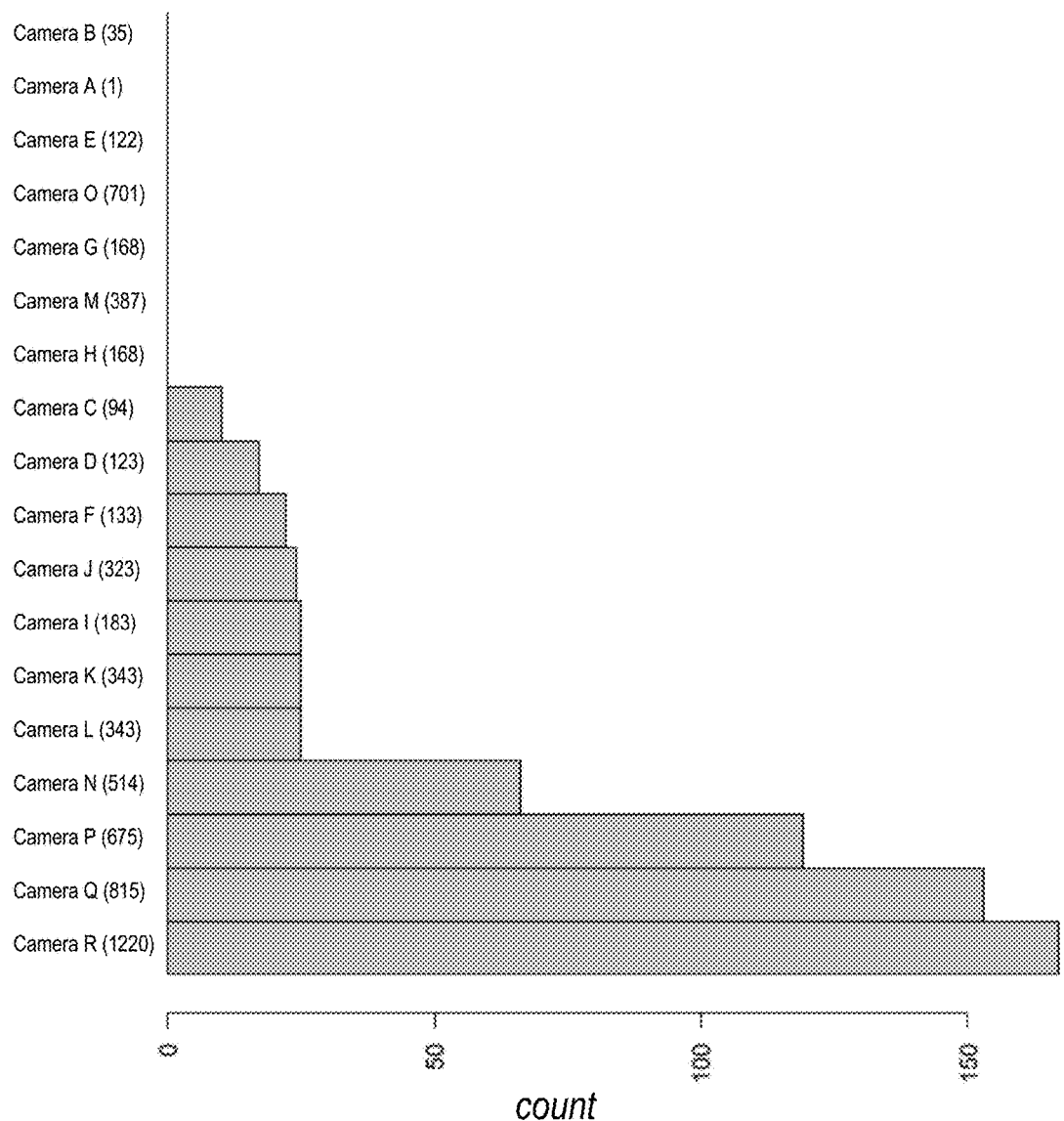
Figure 11D:
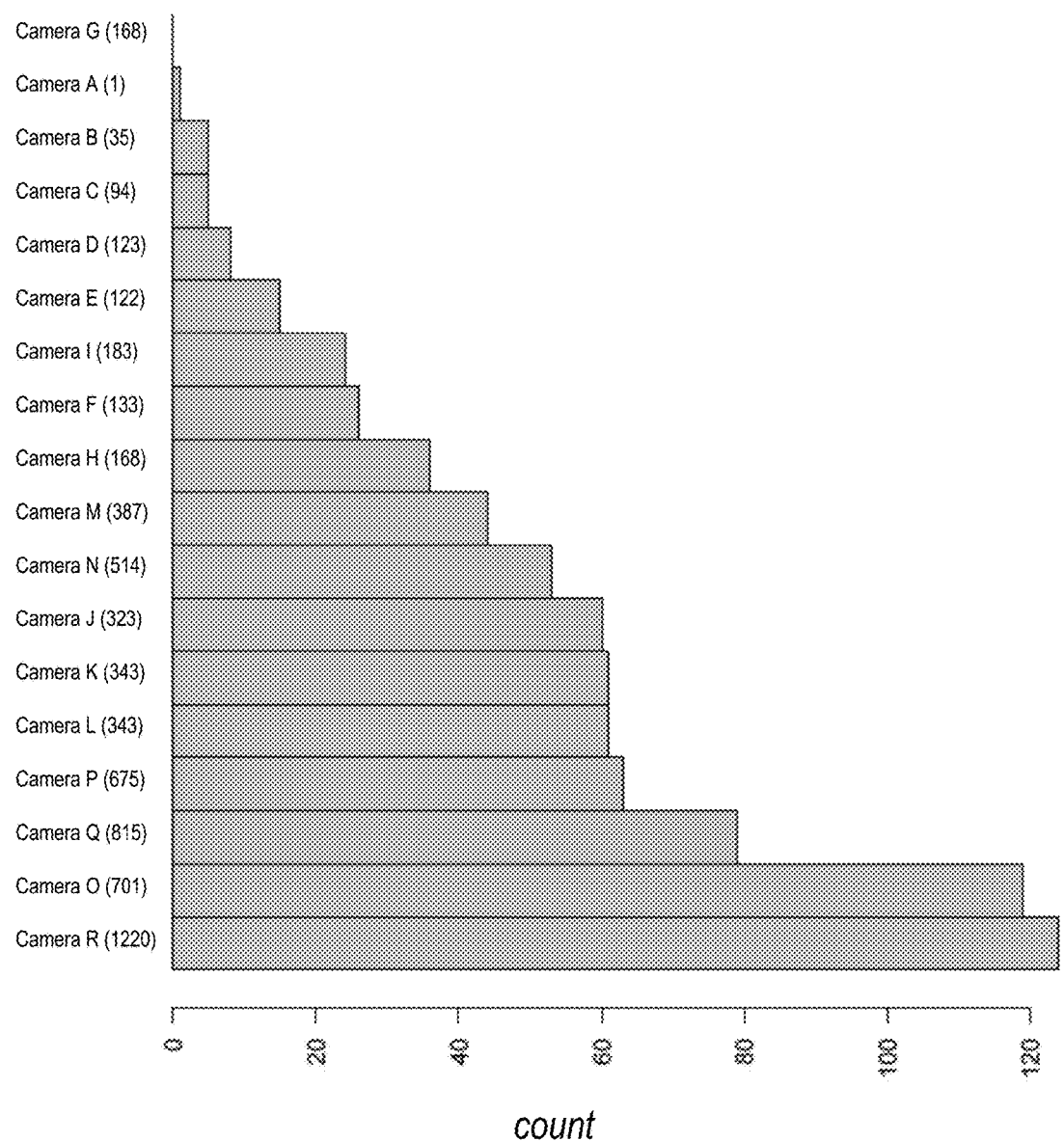
Figure 11E:
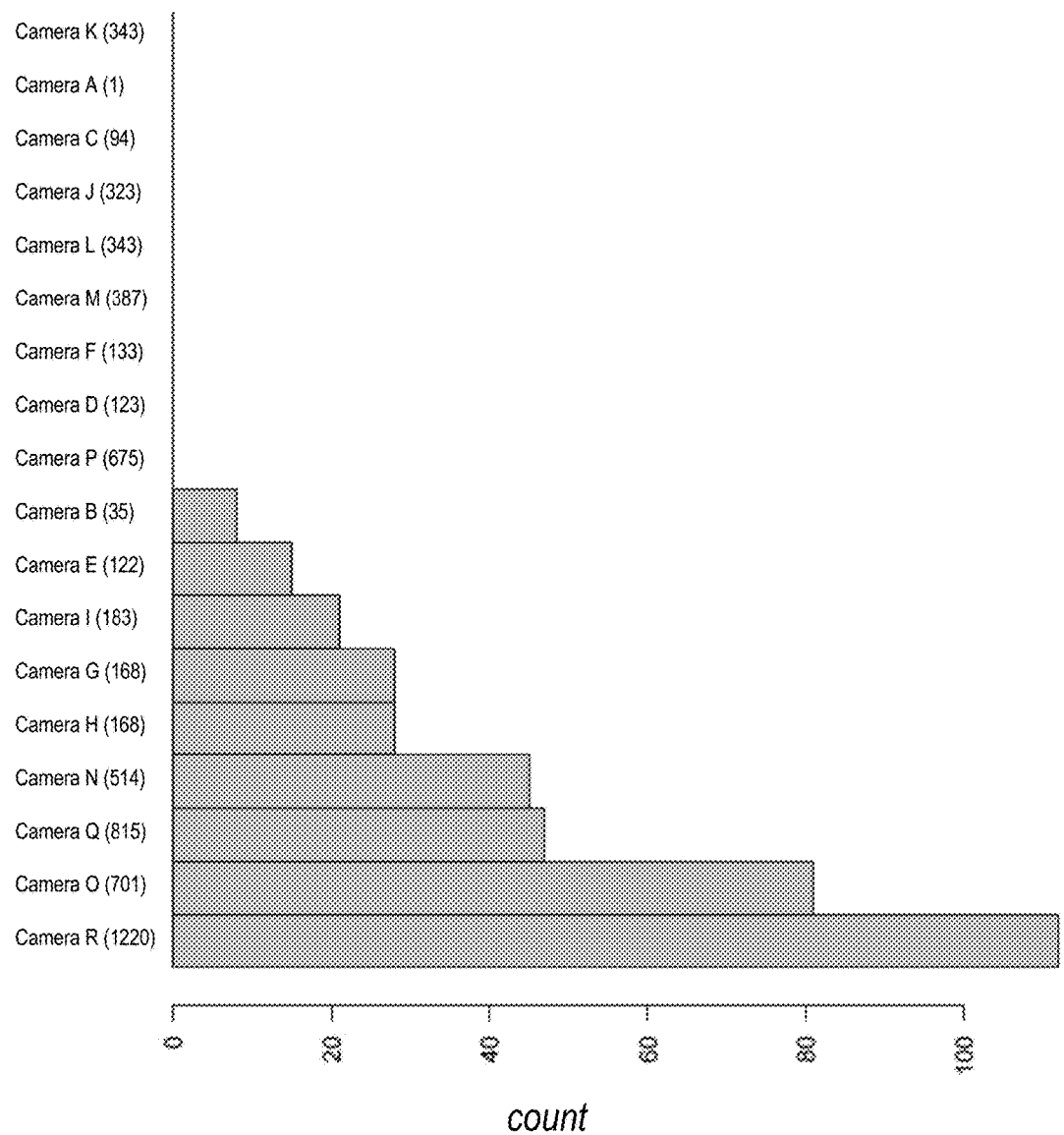
Figure 11F:
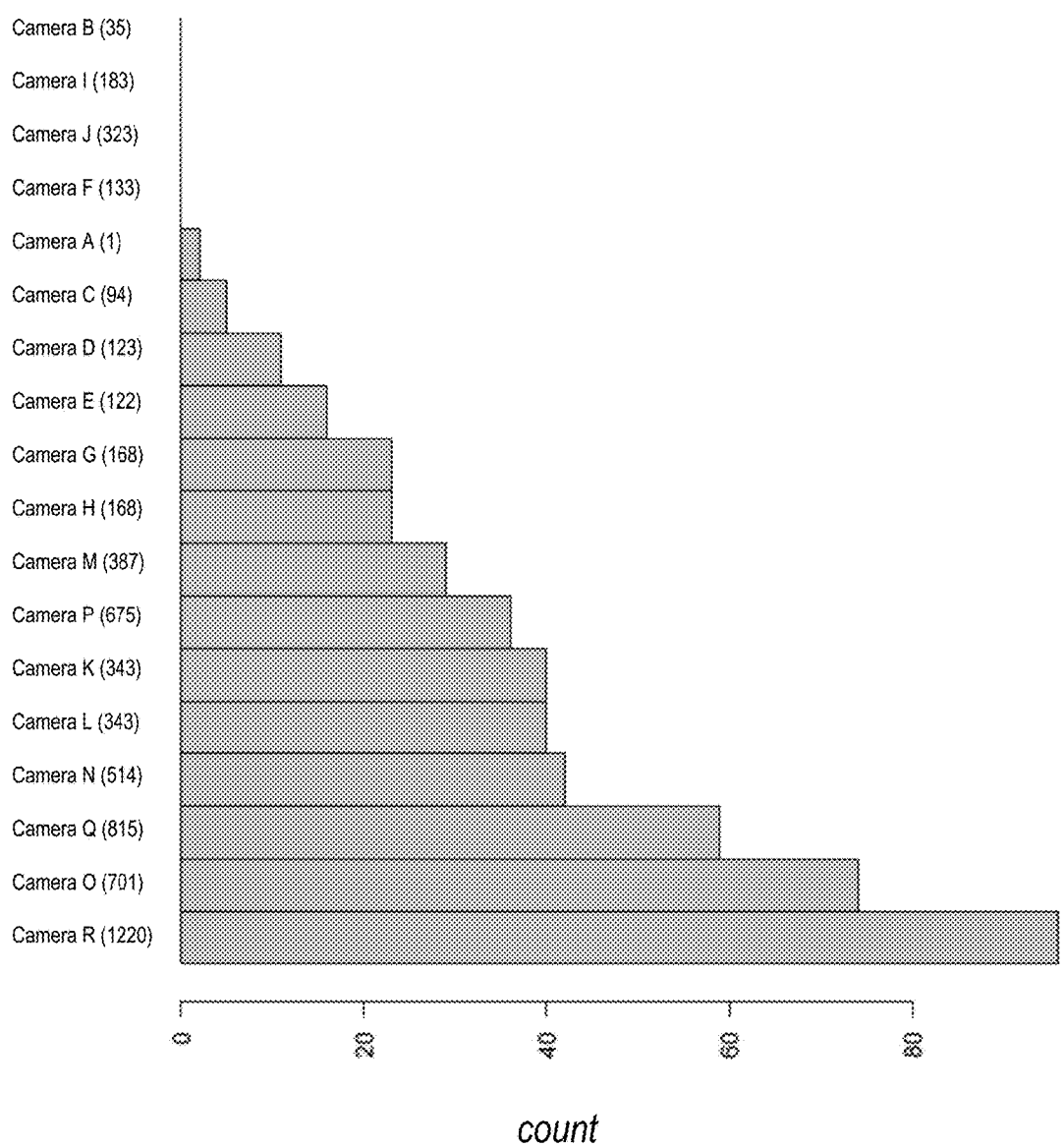
Figure 11G:
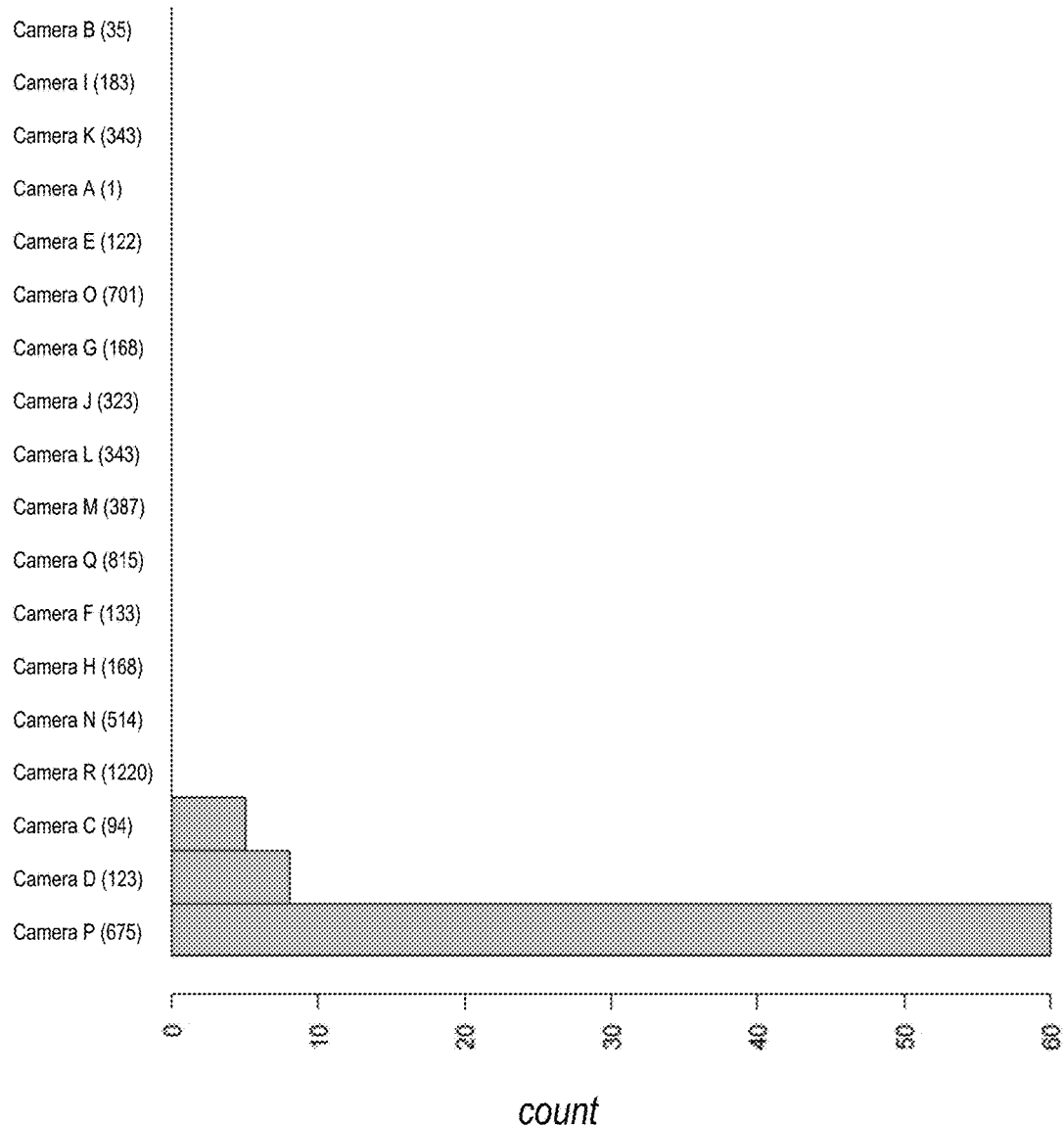
Figure 11H:
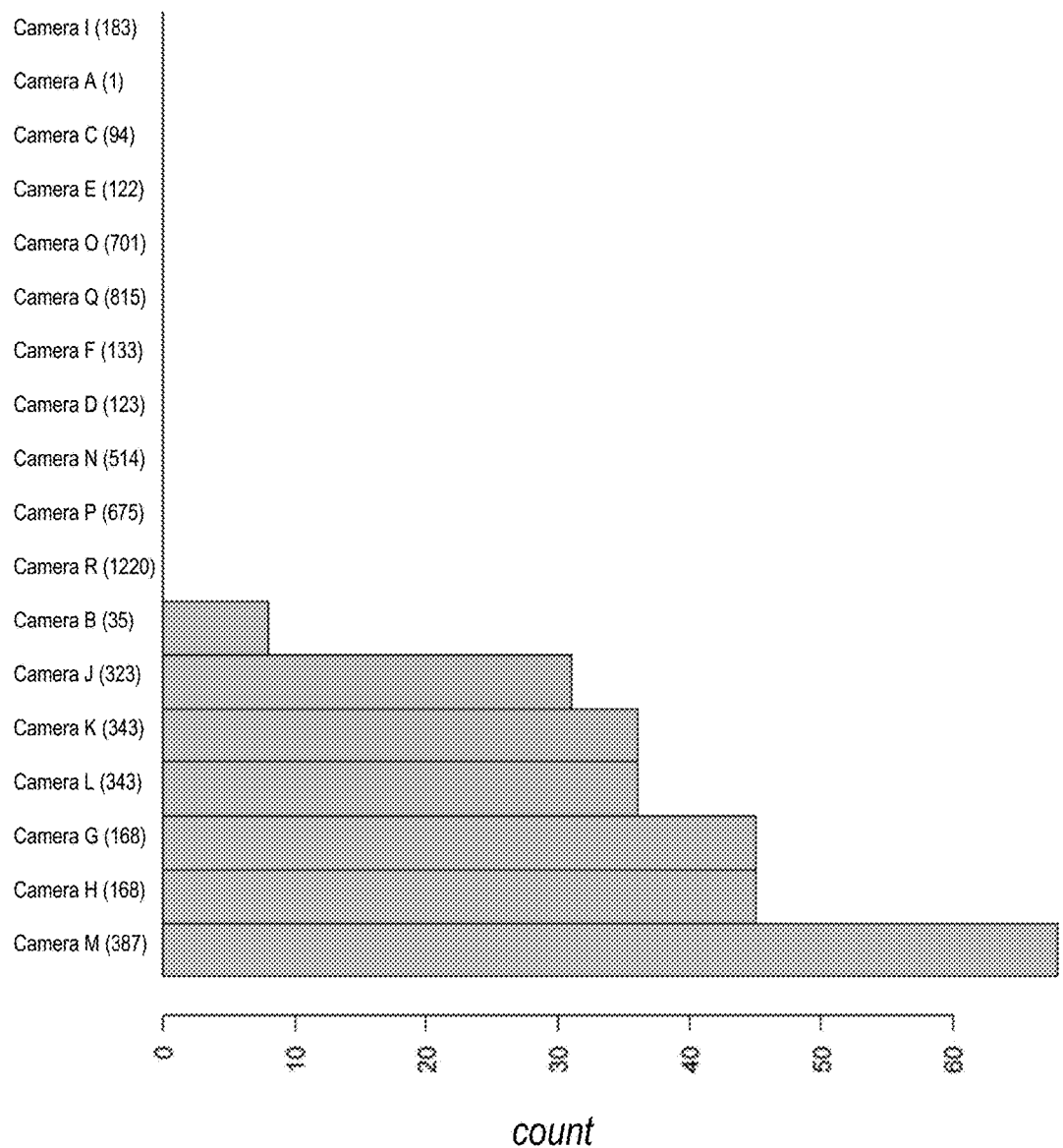
Figure 11I:
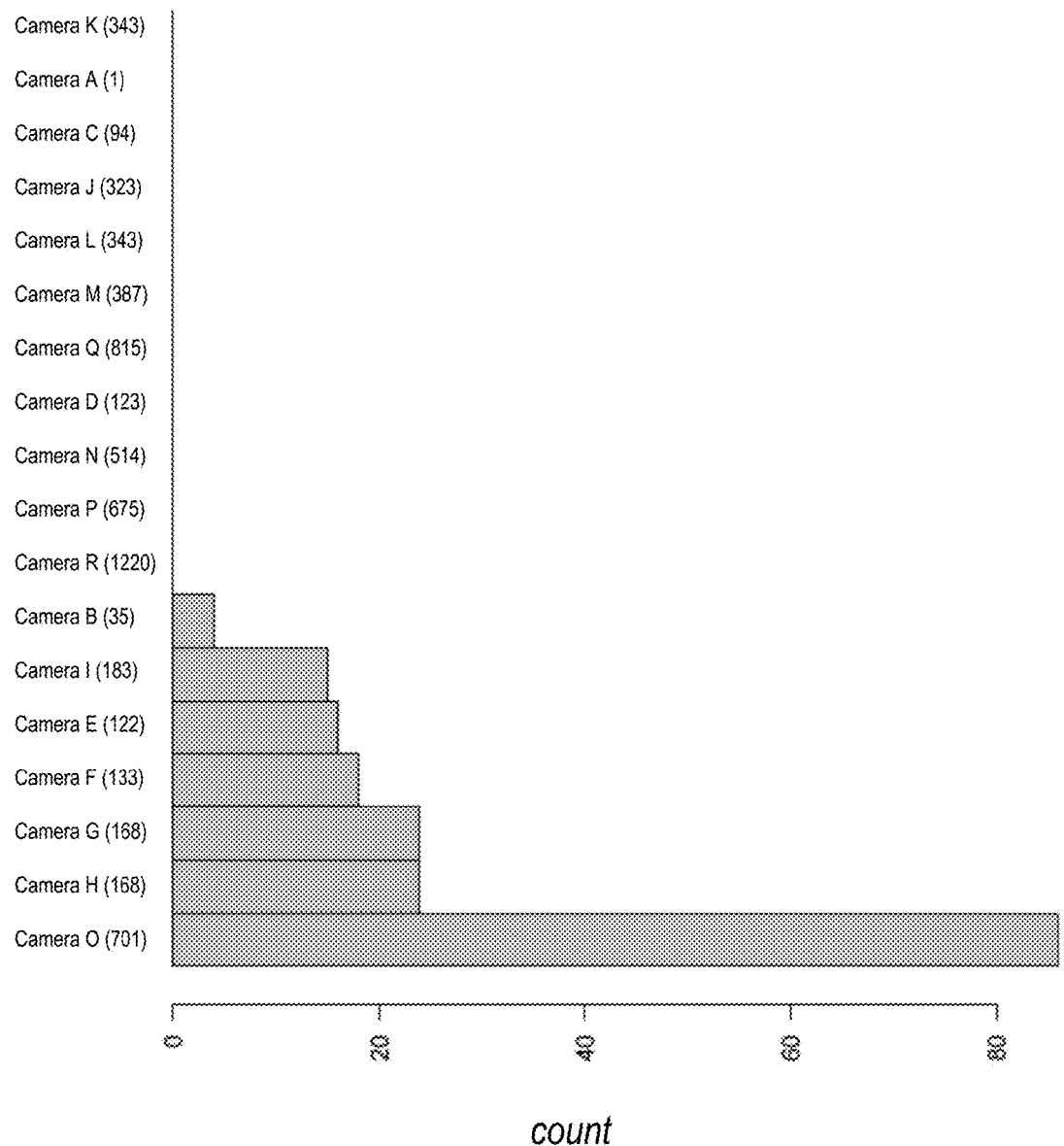
Figure 11J:
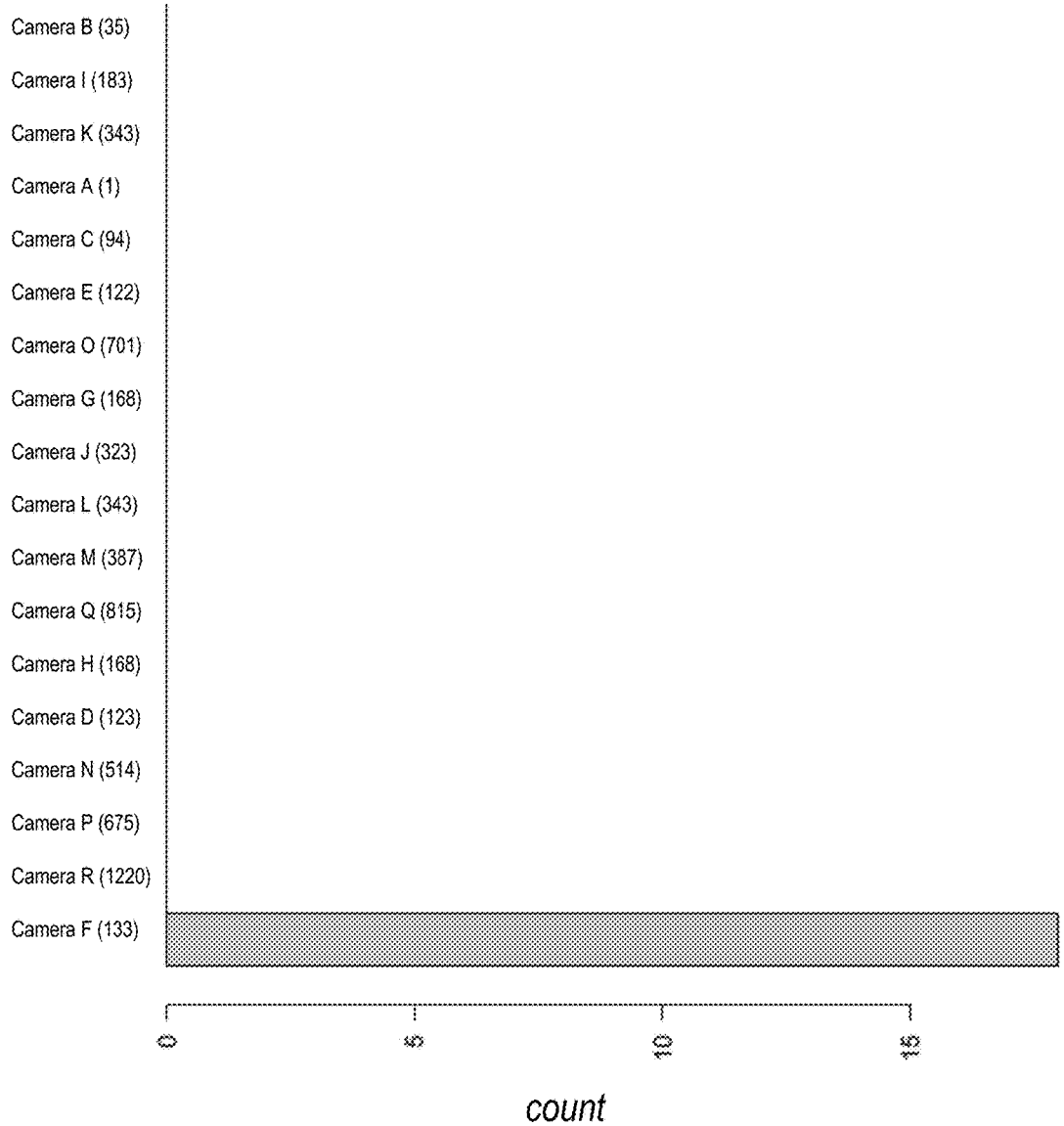
Figure 11K:
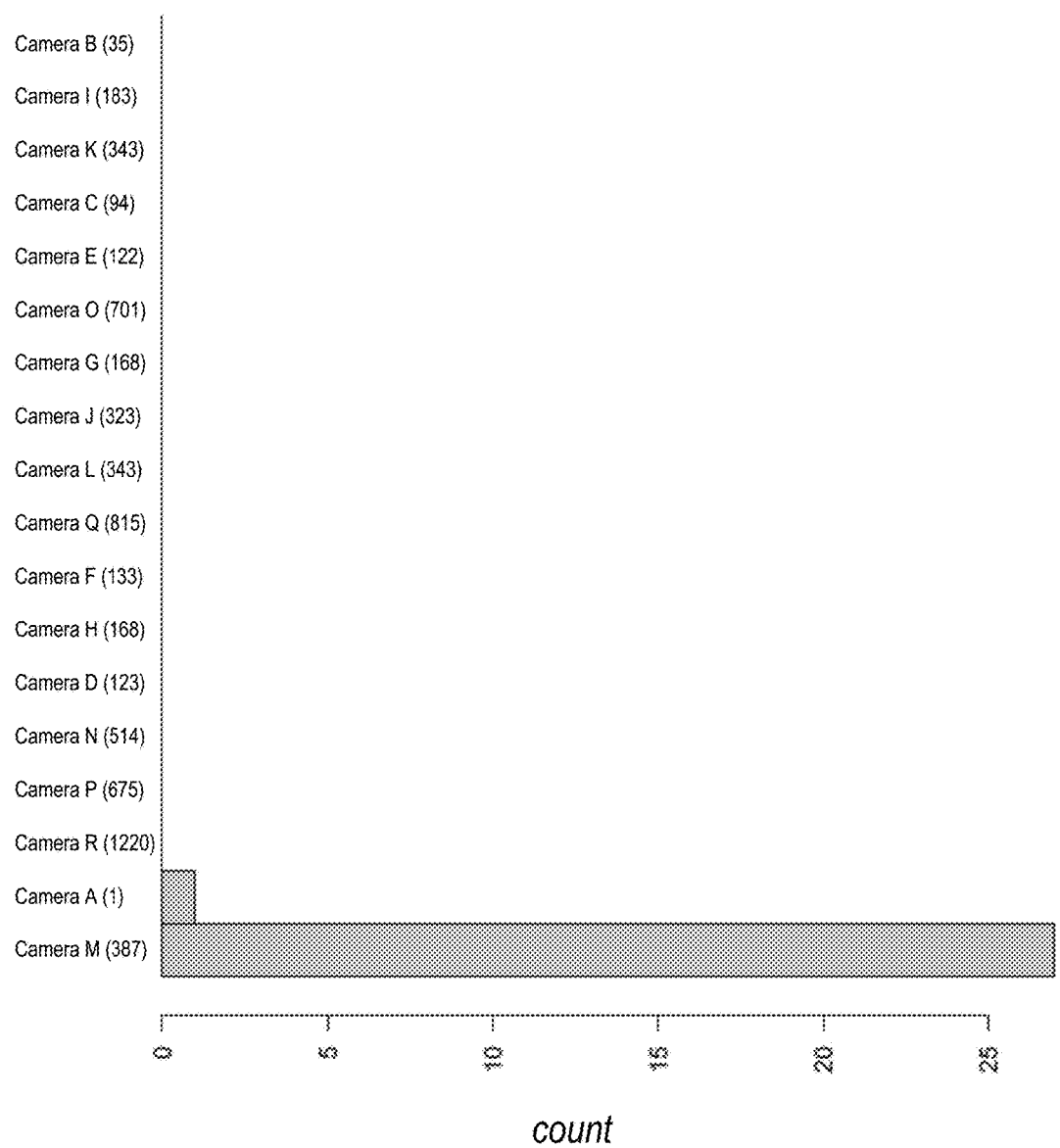
Figure 11L:
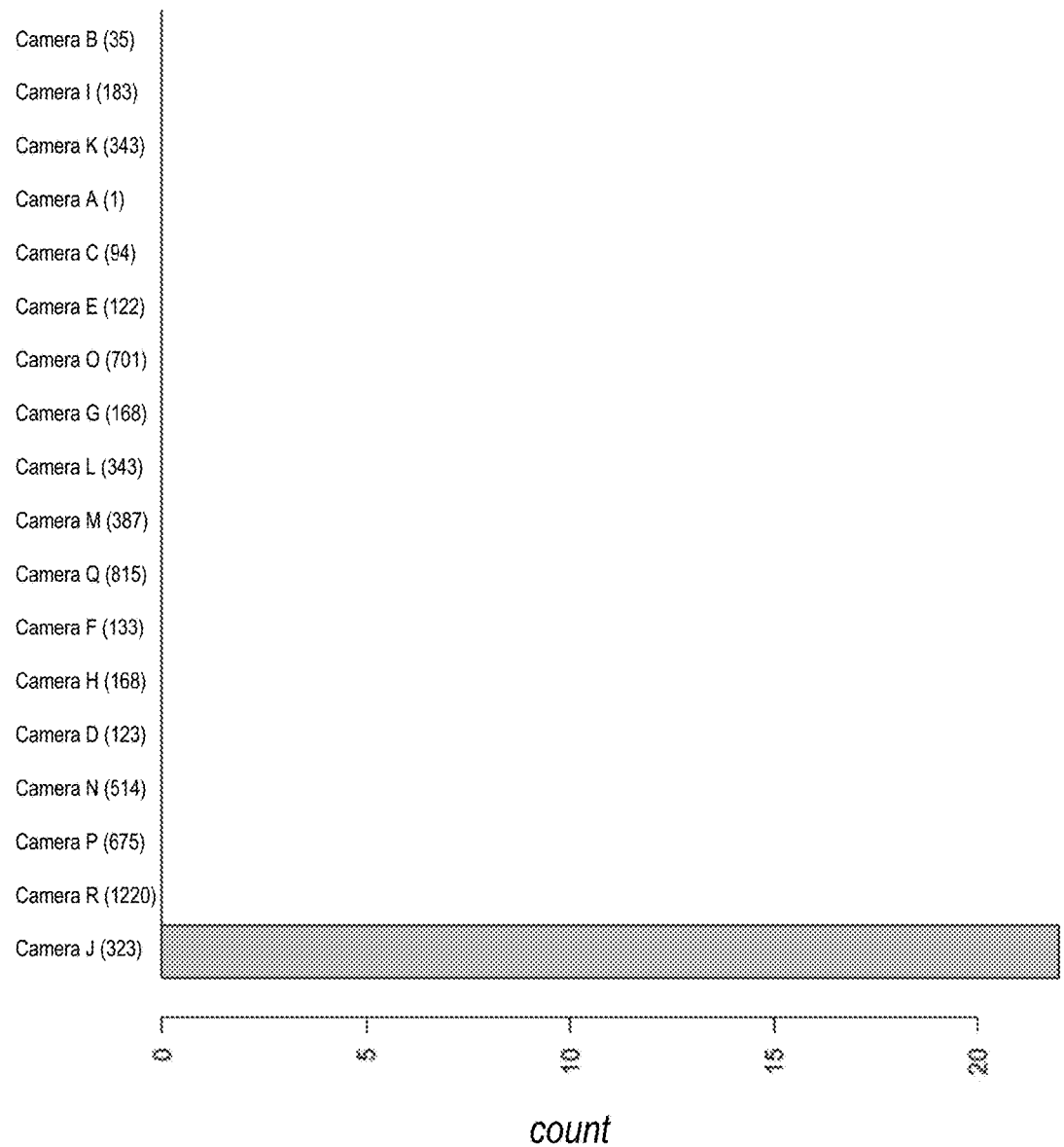

FIGS. 10A through 10C illustrate example methods for searching for and comparing items based upon the aspects, as well as example displays for the search/comparison results, according to at least some embodiments. Note that the displays and display elements shown in FIGS. 10A through 10C are intended as examples, and are not intended to be limiting.

FIG. 10A illustrates an example page such as a search page that displays reasons to buy information for multiple items within a category for comparison, according to at least some embodiments. In at least some embodiments, the page 1500 may include a an item list 1510 section in which multiple items (e.g., cameras A through F) are displayed along with summary information for one or more aspects shared among the listed items. In this example the listed items share at least aspects A, B, and C, and information (e.g., summary statistics) may be displayed for each aspect of each listed item. Note that more or fewer items may be included in the list 1510, and more or fewer aspects may be included for each item. In at least some embodiments, the list 1510 interface may be controlled via user input to show more or fewer items or aspects to the screen. In at least some embodiments, one or more of the items may not share all of the aspects, or may not have summary information for a given aspect, and so information for a particular aspect may not be shown for some items. For example, see Camera C in item list 1510, for which aspect B is shown to be not applicable (N/A).

In some embodiments, page 1500 may be a search page, and the list 1510 of items may be generated according to a search, for example a search for items in a particular category. In the example shown in FIG. 10A, the search is for "DSLR cameras", and the list of cameras A through F are all cameras in that category. However, the page 1500 or list 1510 may be shown in response to other user actions, for example via selection of a "compare with other cameras" user interface element on an item page for a particular one of the cameras. In some embodiments, the elements shown in list 1510 may be active or hot links to navigate to other pages or displays. For example, in some embodiments, selecting one of the items in the list (e.g., "Camera D") may take the customer to an item details page for the item (e.g., the item details page for Camera D). As another example, in some embodiments, selecting one of the aspects for one of the items in the list may take the customer to a page or display that provides more detail on what customers have said about that particular aspect for that particular item, for example similar to the aspect 1440 display as shown in FIGS. 9A through 9F. As another example, in some embodiments, selecting one of the aspect headings (e.g., "Aspect B") may sort the items in the list according to the selected aspect, or alternatively may take the customer to a display that shows a comparison of the items in the list according to the selected aspect in more detail.

The page 1500 may also include various other user interface elements such as menus, buttons, tabs, scroll bars, hot links, and so on, that may be used for navigation (e.g., go to another page), page control (e.g., scroll down), or various other purposes. The customer may interact with the user interface elements of the page 1500, for example using a cursor control device such as a mouse and a keyboard or, on a touch-enabled device, touch gestures input to a touch screen.

FIG. 10B illustrates an example page that displays summary information for a single aspect of a list of items within a category for comparison of the items according to the aspect. In some embodiments, page 1600 may be a search page, and the list 1610 of items may be generated according to a search for a particular aspect or search term or phrase that can be mapped to that aspect. In this example, the user has entered the search phrase "cameras with good autofocus", which may be parsed to search for all cameras with a "focus" or "autofocus" aspect that customers consider good or excellent according to the analysis of the community-sourced content for the cameras. Note that more complex search phrases may be used in searches in some embodiments, such as "cameras priced under $500 with good autofocus".

In at least some embodiments, the items in the list 1610 may be ranked according to one or more metrics of the aspect, for example statistics based on an analysis of the sentiment expressed in comments extracted from the community-sourced content for the items. In at least some embodiments, summary statistics, comments, or other information may be displayed for the aspect (aspect B, "zoom", in this example) for each item being compared (cameras A through D are shown in this example).

FIG. 10C illustrates an example page that displays summary information for two or more selected aspects of a list of items within a category for comparison of the items according to the aspects. In some embodiments, page 1700 may be a search page that allows the customer to search for items with filters based on particular aspects, and the list 1710 of items may be generated according to a search for a category of item with one or more filters based on particular aspects of the category. In this example, the customer has searched for "DSLR cameras" with aspect C and aspect A (e.g., "Image quality", "Video quality", "Price", "Lens", etc.) specified as filters via the interface. The list 1710 of items may show the DSLR cameras ranked according to one or more of the selected filters, for example according to how the cameras compare in regard to aspect C (e.g., image quality).

In some embodiments, the customer may be allowed to use logical or mathematical operations in a search or filter. For example, if "Price" is an aspect that the customer wants to filter on, then the customer may be allowed to filter the search using a "Price<$2000" filter to return a list of cameras that are priced at under $2000. As another example, in some embodiments, a search string such as "cameras costing less than $1000" may be interpreted to search the general category of cameras with a filter on a "Price" aspect to limit the results to cameras that are priced at under $1000. As another example, if "Price" and "Weight" are aspects of a category that the customer wants to filter on, then a filter or search string such as "price <$1000 AND weight <1.5 pounds" may be used to search for items that satisfy both conditions.

FIGS. 11A through 11L show example graphs that illustrate how each item in an example item category (in this example, eighteen DSLR cameras labeled as cameras A through R) performs based on the top six aspects for each camera out of twelve example aspects for a "DSLR camera" category. Note that each of the eighteen cameras A through R has positive (non-zero) entries in six of the graphs. The twelve example aspects are: picture, image quality, use (i.e., ease of use), features, video quality, lens, price, focus, screen, size, ISO, and color.

The results shown in FIGS. 11A through 11L are based on raw counts of references for the aspects in the customer reviews, and are given by way of example and are not intended to be limiting. Note that other more sophisticated methods than just comparisons of count may be used to generate comparison data for items in a group or category. For example, comparisons may be made based on other metrics than simple counts, for example according to statistics based on determined sentiment of the extracted comments for the aspects of the items (e.g., a ratio of positive to negative comments). Comparison results such as those shown in the graphs may be provided to customers, for example via an "item comparison" page or user interface element similar to the example displays shown in FIGS. 10A through 10C. Comparison results such as those shown in the graphs may be manually and/or automatically generated for multiple items within a category or group of items and used, for example, to make recommendations to customers, to search for items according to particular aspects, or to provide side-by-side comparisons of items to the customers as shown in FIGS. 10A through 10C.

Determining Aspects from Sources and Aligning Aspects to Reviews—Additional Details This section discusses additional details regarding methods and techniques including but not limited to machine learning techniques such as automated semantic analysis techniques that may be used in embodiments, for examine when determining aspects for categories of items from a corpus of text information, when building data sets, when aligning aspects to community-sourced content such as customer reviews, and so on.

In at least some embodiments, N-gram tokens (from 2-gram to 4-gram) may be considered. In some embodiments, noun phase detection by a grammatical parser may be considered, for example as described in: Ana-Maria Popescu and Oren Etzioni, "Extracting Product Features and Opinions from Reviews," *Proceedings of the conference on Human Language Technology and Empirical Methods in Natural Language Processing* (EMNLP) 2005, pages 339-346, which is hereby incorporated by reference in its entirety.

In at least some embodiments, MI/PMI (mutual information/pointwise mutual information) models may be used to distinguish categories or topics. If MI/PMI models are used to distinguish categories, lots of terms that relate to brand name or product name may show up. In at least some embodiments, these terms may be extracted as keywords and used to filter results. This may be referred to as Black listing/filtering.

In at least some embodiments, the following method or a variation thereof may be used to score phrases:
- Find word/phrase that have high MI/PMI with category label.
- Focus/filter on words whose application implies the category.
- Examine context of phrases.
    - prefixed by good/bad/ . . .
    - prefixed by general adjectives.
- Determine "adjective+phrase" induces positive or negative sentiment At least some embodiments may build a shared tree based on PMI scores in multiple categories.

In some embodiments, a HMM (Hidden Markov Model) may be used to learn sub-sequences of expressing opinions, like Part-of-Speech (POS) or Named Entity Recognition (NER), for example as described in Jin, Wei, Hung Hay Ho, and Rohini K. Srihari, "OpinionMiner: a novel machine learning system for web opinion mining and extraction," *Proceedings of the 15th ACM SIGKDD international conference on Knowledge discovery and data mining*, ACM, 2009, which is hereby incorporated by reference in its entirety.

In some embodiments, a unifying aspect-sentiment model, similar to supervised latent Dirichlet allocation (LDA), may be used, for example as described in Jo, Yohan, and Alice H. Oh, "Aspect and sentiment unification model for online review analysis," *Proceedings of the fourth ACM international conference on Web search and data mining*, ACM, 2011, which is hereby incorporated by reference in its entirety.

In some embodiments, an aspect-sentiment hierarchical model, similar to hierarchical topic models, may be used, for example as described in Kim, Suin, et al., "A Hierarchical Aspect-Sentiment Model for Online Reviews," *Proceedings of AAAI,* 2013, which is hereby incorporated by reference in its entirety.

In some embodiments, a method may be used that starts from a set of positive stem terms and grows the graph to discover features of positive aspects, for example as described in Dalvi, Nilesh, et al., "Matching reviews to objects using a language model," *Proceedings of the 2009 Conference on Empirical Methods in Natural Language Processing: Volume 2-Volume* 2, Association for Computational Linguistics, 2009, which is hereby incorporated by reference in its entirety.

In some embodiments of a reasons to buy system, a multidimensional topical analysis techniques may be used, for examine when determining aspects for categories of items from a corpus of text information. In many algorithms for learning topics (e.g., latent semantic analysis (LSA) or latent Dirichlet allocation (LDA) techniques), topics are generally learned along a single dimension (e.g., topics of zoom, focus, and image quality for a camera category). A multidimensional topical analysis technique allows a system to learn a matrix of topics—for example, topics and variations on those topics. As an example, using a multidimensional topical analysis technique, instead of just learning ten topics as individual/discrete topics, a system can learn twenty topics that are in a 4×5 matrix—for example, four topics and five variations on those topics. As an example, for cameras, instead of just learning zoom, focus, and image quality, the system can learn zoom, focus, and image quality topics for portrait, landscape, and sports photography topics (e.g., learn zoom for landscapes and image quality for sports).

Extracting Reasons to Buy from a Key Phrase Extraction System

In at least some embodiments, reasons to buy (aspects) may be extracted from data generated by a key phrase extraction system used by the online merchant. This data may be heavily focused on product description details. The key phrase extraction system may automatically identify product feature phrases by using a combination of merchant-provided item data and customer behavioral data, automatically group product features according to textual and semantic similarity, and assign semantic labels; and automatically assign item ID numbers to product features without requiring merchants to repeat specific structured data fields.

Associating Reasons to Buy to Products

The following briefly describes various example methods for building training datasets or seed training datasets that may be used in embodiments, for example in aligning product reviews to reasons to buy aspects. This section assumes that the customer reviews of products are used. However, other community-sourced content may instead or in addition be used.

The following method or a variation thereof may be used to provide a seed training dataset in some embodiments. This method may rely on human input or guidance in building the dataset. "Camera" is used as a category by way of example.

Randomly select reviews from 'camera gl' or 'a set of camera item ID numbers' which may be the initial focus. For example, about 1000 reviews may be used initially.

Hand select a set of reasons to buy that would be meaningful for these item ID numbers. For example, about 10-15 reasons may be enough for initial build up of the training set.

Use a script to randomly select a review and show it to human users of the script. Users can read the review and quickly 'tag' the review with the reasons from the above set that they think are appropriate.

The following describes a method that may be used by or in the training data building script UI, according to at least some embodiments.

Review snippets are generated by plucking sentences randomly from a set of reviews.

If there are reasons known about that sentence, then they are shown. They may be shown in the sorted order of frequency that they were accepted by other users.

If a classifier is available, then reasons generated by that classifier are shown. As initially there is no classifier, randomly selected reasons may be initially shown. A simple grep/regex strategy may fill the gap during the absence of a classifier. At absolute start when there are zero reasons in the system, none are shown. Also when the classifier/regex results in zero matches, it would be okay to show no reason and ask the user to submit one.

The above methods may result in two training datasets:

(Binary classification) Given a sentence does it have reason to buy (Y/N).

(Multi-class classification) Given a sentence, which reasons to buy does it possess.

In some embodiments, TF-IDF (term frequency-inverse document frequency), a numerical statistic that is intended to reflect how important a word is to a document in a collection or corpus, may be used in building a dataset. Other pattern recognition techniques may also or instead be used.

In at least some embodiments, a bag of words classifier may be used for multi-class classification.

In at least some embodiments, new data (e.g., new customer reviews) may be tagged using a seed classifier. For exploration beyond what the seed classifier knows, a random reason-to-buy may be added to the set of tags. This addition may be done with a low probability. A human step may be used to remove incorrect tags. This information may be used for each of the tags (both positive and negative samples), to do incremental training on the dataset. These examples may also be added to the seed dataset so that the original training dataset grows.

Extracting Quotes from Customer Reviews

The following is directed to technologies for extracting quotes from customer reviews. Utilizing the technologies described in this section, representative quotes may be extracted from customer reviews and displayed them to the customer in lieu of or in conjunction with the customer reviews along with other item information. At least some of the technologies and methods as described in the section may be leveraged by embodiments of the reasons to buy system and methods as described above to process a corpus of item information including but not limited to customer reviews in determining reasons to buy aspects for items or categories of items, and in extracting comments related to the reasons to buy aspects from the customer reviews for the items.

According to embodiments of the methods for extracting quotes from customer reviews as described in this section, individual sentences or phrases contained in customer reviews regarding an item or category of items are parsed into a collection of sentences. A list of topics is generated from the collection of sentences, and each sentence or phrase is assigned to a topic from the list of topics. The most relevant topics from the list of topics are identified for a particular item, and one or more sentences or phrases from customer reviews for the particular item are selected for each of the most relevant topics that best represent all the sentences associated with the item assigned to that topic, according to content and sentiment.

In contrast to the methods for extracting quotes from customer reviews as described in this section, the reasons to buy methods described in the previous sections use item information including but not limited to the customer reviews to determine one or more aspects for items or categories of items up front, and then analyze the customer reviews to align the information from the customer reviews (e.g., topics determined according to a semantic analysis technique) with the predetermined aspects. By determining aspects for categories of items up-front and then aligning the customer reviews with the aspects, embodiments of the reasons to buy methods are not item-centric, but are instead centered on categories of items. One or more of the determined aspects may be common across the category of items, and thus the information extracted from the customer reviews about the predetermined aspects of a category may be used to compare different items within the category.

The technologies described in this section may further provide a method of classifying sentences or phrases as expressing a positive, a negative, or a neutral sentiment based on machine learning from training data comprising sentences manually labeled as to sentiment. In some embodiments, a list of terms is generated from the manually labeled sentences and sentiment scores are determined for the terms in the list of terms based on the manually labeled sentences. A collection of sentences or phrases may then be classified as to sentiment utilizing one or more logistic regression classifiers trained on the sentiment scores determined for the terms in the list of terms. The classified collection of sentences may be further analyzed to determine an overall majority sentiment regarding a topic discussed in the sentences and/or to extract specific sentences or phrases expressing a particular sentiment for display to a customer, for example.

FIG. 12 and the following description are intended to provide a brief, general description of a suitable computing environment in which the embodiments described in this section may be implemented. In particular, FIG. 12 is a system and network diagram that shows an illustrative operating environment 2100 including several software components for extracting quotes from customer reviews. The environment 2100 includes a customer 2102 that uses a customer computer 2104 to access a merchant system 2120 across a network 2106. The customer 2102 may be an individual or entity that desires to browse, research, review, and/or purchase items offered for sale by the online merchant. Items may include physical goods, such as a blender, a camera, or a CD; digital media products, such as a downloadable MP3 audio track or a streaming movie; event tickets; media or service subscriptions; or any other goods or services which can be purchased by the customer 2102 and/or reviewed by customers or other users of the merchant system 2120.

The customer computer 2104 may be a personal computer ("PC"), a desktop workstation, a laptop, a notebook, a personal digital assistant ("PDA"), an electronic-book reader, a game console, a set-top box, a consumer electronics device, a server computer, a cellphone, a smartphone, a digital camera, a tablet or pad device, or any other computing device capable of connecting to the network 2106 and communicating with the merchant system 2120. The network 2106 may be a local-area network ("LAN"), a wide-area network ("WAN"), the Internet, or any other networking topology known in the art that connects the customer computer 2104 to the merchant system 2120.

The merchant system 2120 may include a number of application servers 2122 that provide various online shopping services to the customer computer 2104 over the network 2106. The customer 2102 may use a client application executing on the customer computer 2104 to access and utilize the online shopping services provided by the application servers 2122. According to one embodiment, the client application may be a web browser application, such as the MOZILLA® FIREFOX® web browser from Mozilla Foundation of Mountain View, Calif. The web browser application exchanges data with the application servers 2122 in the merchant system 2120 using the hypertext transfer protocol ("HTTP") over the network 2106. Alternatively, the client application may utilize any number of communication methods known in the art to communicate with the merchant system 2120 and/or the application servers 2122 across the network 2106, including remote procedure calls, SOAP-based web services, remote file access, proprietary client-server architectures, and the like.

The application servers 2122 may execute a number of modules in order to provide the online shopping services to the customer computer 2104. The modules may execute on a single application server 2122 or in parallel across multiple application servers in the merchant system 2120. In addition, each module may consist of a number of subcomponents executing on different application servers 2122 or other computing devices in the merchant system 2120. The modules may be implemented as software, hardware, or any combination of the two.

In at least some embodiments, an online shopping module 2124 executes on the application servers 2122. The online shopping module 2124 may retrieve information regarding a particular item offered for sale by the online merchant from item catalog data 2126, generate item details 2128 containing the item information, and transmit the item details 2128 over the network 2106 to the client application for presentation to the customer 2102. The item catalog data 2126 may be stored in a data store 2130, such as a database or other storage mechanism available to the application servers 2122 in the merchant system 2120. The item catalog data 2126 may contain information regarding each item offered for sale by the merchant. The item catalog data 2126 may further contain information utilized to organize the items and facilitate searching, browsing, and purchasing of the items by the customer 2102. For example, the item catalog data 2126 may include item type and category information that allows the items in the catalog to be grouped by type or other categories. According to one embodiment, the item catalog data 2126 defines category hierarchies that allow the grouping of the items in a hierarchical fashion.

The item details 2128 may be contained in a web page consisting of hypertext markup language ("HTML"), extensible markup language ("XML"), and/or JavaScript object notation ("JSON") that contains the item information along with instructions regarding how the item details 2128 are to be displayed on the customer computer 2104. It will be appreciated that any number of methods and technologies may be utilized that allow the online shopping module 2124 to encode the item information in the item details 2128 and send the item details to the customer computer 2104 for display to the customer 2102.

In at least some embodiments, the item details 2128 containing the item information include customer reviews. Customer reviews of individual items or collection of items from the item catalog data 2126 may be provided by customers 2102 utilizing a review function of the online shopping module 2124, for example. The customer reviews may include quantitative ratings for the item, text-based comments regarding the item, information regarding the reviewer, and the like, as will be described in more detail below in regard to FIG. 13. The customer reviews regarding the item may be stored in customer review data 2132 in the data store 2130 or other storage mechanism in the merchant system 2120. The online shopping module 2124 may retrieve the customer reviews from the customer review data 2132 to include in the item details 2128 for presentation to the customer 2102. It will be appreciated that the customer review data 2132 may include any free-from text comments in any format regarding items of any type, including physical products, digital media, services, and the like. In addition, the customer review data 2132 may further include feedback or discussions regarding the customer reviews, comments made regarding other subjects related to the item or collection of items, and/or the like.

In at least some embodiments, a quote extraction module 2134 executes on the application servers 2122. The quote extraction module 2134 may periodically scan customer reviews in the customer review data 2132 in order to extract representative comments or "quotes" for items that summarize the information contained in the customer reviews for the items, both as to content and sentiment, as will be described in more detail below in regard to FIG. 15. The extracted quotes may be stored as extracted quote data 2136 in the data store 2130 or other storage mechanism in the merchant system 2120. The online shopping module 2124 may retrieve the extracted quotes for a particular item from the extracted quote data 2136 and include the quotes in the item details 2128 presented them to the customer 2102 in lieu of or in conjunction with the customer reviews for the item.

The quote extraction module 2134 may also determine the sentiment expressed by the extracted quotes or other collection of sentences or phrases contained in text-based comments in the customer review data 2132. For examples, the quote extraction module 2134 may classify each sentence or phrase in the collection of sentences as expressing a positive sentiment, such as "I love this blender," a negative sentiment, such as "The blades do not have enough power to grind ice," a mixed sentiment, such as "While the blender was reliable, its feature set was too small for my needs," or neutral or no sentiment, such as "I received this blender in March for my birthday." According to one embodiment, the classification of sentiment in the extracted quotes or sentences may be performed using a machine learning technique trained on sentences manually labeled for sentiment, as will be described below in regard to FIG. 16. The manually labeled sentences may be contained in training data 2138 stored in the data store 2130 or other storage mechanism in the merchant system 2120. In addition, the quote extraction module 2134 may store other information required for the sentiment classification of the sentences in the training data 2138, as will be described below.

FIGS. 13 and 14 are data structure diagrams showing a number of data elements stored in data structures. It will be appreciated by one skilled in the art that the data structures may represent rows in a database table, instances of objects stored in a computer memory, programmatic structures, or any other data container commonly known in the art. Each data element included in the data structure may represent one or more fields or columns of a database table, one or more attributes of an object, one or more member variables of a programmatic structure, or any other unit of data of a data structure commonly known in the art. The implementation is a matter of choice, and may depend on the technology, performance, and other requirements of the computing system upon which the data structures are implemented.

FIG. 13 shows one example of data maintained in the customer review data 2132, according to embodiments. As described above, the customer review data 2132 may contain customer reviews 2202A-2202N (referred to generally as customer review 2202) regarding an individual item or group of items offered for sale by the online merchant. For example, the customer review data 2132 may contain multiple customer reviews 2202 regarding a particular blender, a particular camera, a particular MP3 audio track, a collection of movies or books, and the like, provided by customers 2102 of the merchant system 2120. Alternatively, the customer review data 2132 may contain customer reviews 2202 regarding any type of product or service, including a movie, a movie theater, a store, a website, a restaurant, and the like.

Each customer review 2202 contains a customer review ID 2204 that allows individual customer reviews to be uniquely identified and distinguished by the online shopping module 2124, the quote extraction module 2134, and other modules or applications in the merchant system 2120. Each customer review 2202 may also contain an identifier of the associated item to which the customer review applies, such as an item stock-keeping unit ("SKU") 2206 shown in FIG. 13. The item SKU 2206 may be utilized by the online shopping module 2124 to select the relevant customer reviews 2202 to include in the item details 2128 presented to the customer 2102 on the customer computer 2104 regarding a particular item from the item catalog data 2126.

Each customer review 2202 may further contain a customer ID 2208 that identifies the customer 2102 or other user that provided the customer review. The customer ID 2208 may consist of a user ID, a customer number, a customer name, a handle, an email address, or any combination of these and other information that may uniquely identify a particular customer 2102 or user of the merchant system 2120. A customer handle, location, and/or other information regarding the customer providing the review may be presented with each customer review 2202 shown by the online shopping module 2124, for example. Each customer review 2202 may also include a review date 2210 indicating when the customer review was created.

According to embodiments, each customer review 2202 further contains comments 2212. The comments 2212 may include free form text provided by the customer 2102 regarding the associated item. It will be appreciated that the comments 2212 may include one or more sentences or phrases regarding any information directly or indirectly related to the associated item. For example, in a customer review 2202 regarding a CD, the comments 2212 may contain sentences related to the type of music contained on the album, individual tracks on the album, the source of the album's tracks, other tracks or albums by the same artist, production quality of the recording, the artist's lifestyle or behaviors, and the like.

Each customer review 2202 may further contain a customer rating 2214 that provides a quantitative evaluation of the associated item. For example, the customer rating 2214 may be a number from one to five indicating overall satisfaction of the customer 2102 with the associated item. In another embodiment, each customer review 2202 also contains a helpfulness rating 2216. The helpfulness rating 2216 may indicate whether other customers 2102 or users of the merchant system 2120 find the comments 2212 in the customer review 2202 helpful or not, based on feedback supplied by the other customers. It will be appreciated that additional data elements may be maintained in the customer review data 2132 for each customer review 2202 beyond those described in this section, and that not every data element described will be available for every customer review 2202 in the customer review data 2132.

FIG. 14 shows one example of data maintained in the extracted quote data 2136, according to embodiments. As described above, the extracted quote data 2136 may contain extracted quotes 2302A-2302N (referred to generally as extracted quote 2302) extracted by the quote extraction module 2134 from the customer review data 2132. Each extracted quote 2302 contains an excerpt 2304 comprising a text-based comment from a customer review 2202. The excerpt 2304 may contain one or more representative sentences or phrases extracted from customer reviews 2202 for an item or group of items that summarizes the information contained in the customer reviews for the items, both as to content and sentiment, as will be described in more detail below in regard to FIG. 15. Each extracted quote 2302 may further contain an item SKU 2206 identifying the item to which the excerpt 2304 applies. The item SKU 2206 may be utilized by the online shopping module 2124 to select the relevant extracted quotes 2302 to include in the item details 2128 presented to the customer 2102 on the customer computer 2104 regarding a particular item.

According to embodiments, each extracted quote 2302 may also contain topic assignment(s) 2306 and a sentiment indicator 2308. As will be further described below in regard to FIG. 15, the topic assignment(s) 2306 may indicate one or more general topics regarding the item to which the sentence(s) in the excerpt 2304 are directed, while the sentiment indicator 2308 may provide an indication of the sentiment expressed by the excerpt. The topic assignment(s) 2306 and sentiment indicator 2308 for the extracted quote may be established by the quote extraction module 2134 in the quote extraction process, as described below. The online shopping module 2124 may further utilize the topic assignment(s) 2306 and/or the sentiment indicator 2308 to select the extracted quotes 2302 to present to the customer along with the item details 2128.

Each extracted quote 2302 may also contain the customer review ID 2204 identifying the original customer review 2202 from which the excerpt 2304 was extracted. The online shopping module 2124 may utilize the customer review ID 2204 to retrieve information from the original customer review 2202 that may be presented with the extracted quote 2302, such as an identity or handle of the posting customer, the date the customer review was posted, the overall customer rating 2214 from the review, the helpfulness rating 2216 given the review, and the like. It will be appreciated that additional data elements may be maintained in the extracted quote data 2136 for each extracted quote 2302 beyond those described in this section, and that not every data element described will be available for every extracted quote 2302 in the extracted quote data 2136.

Figure 15:
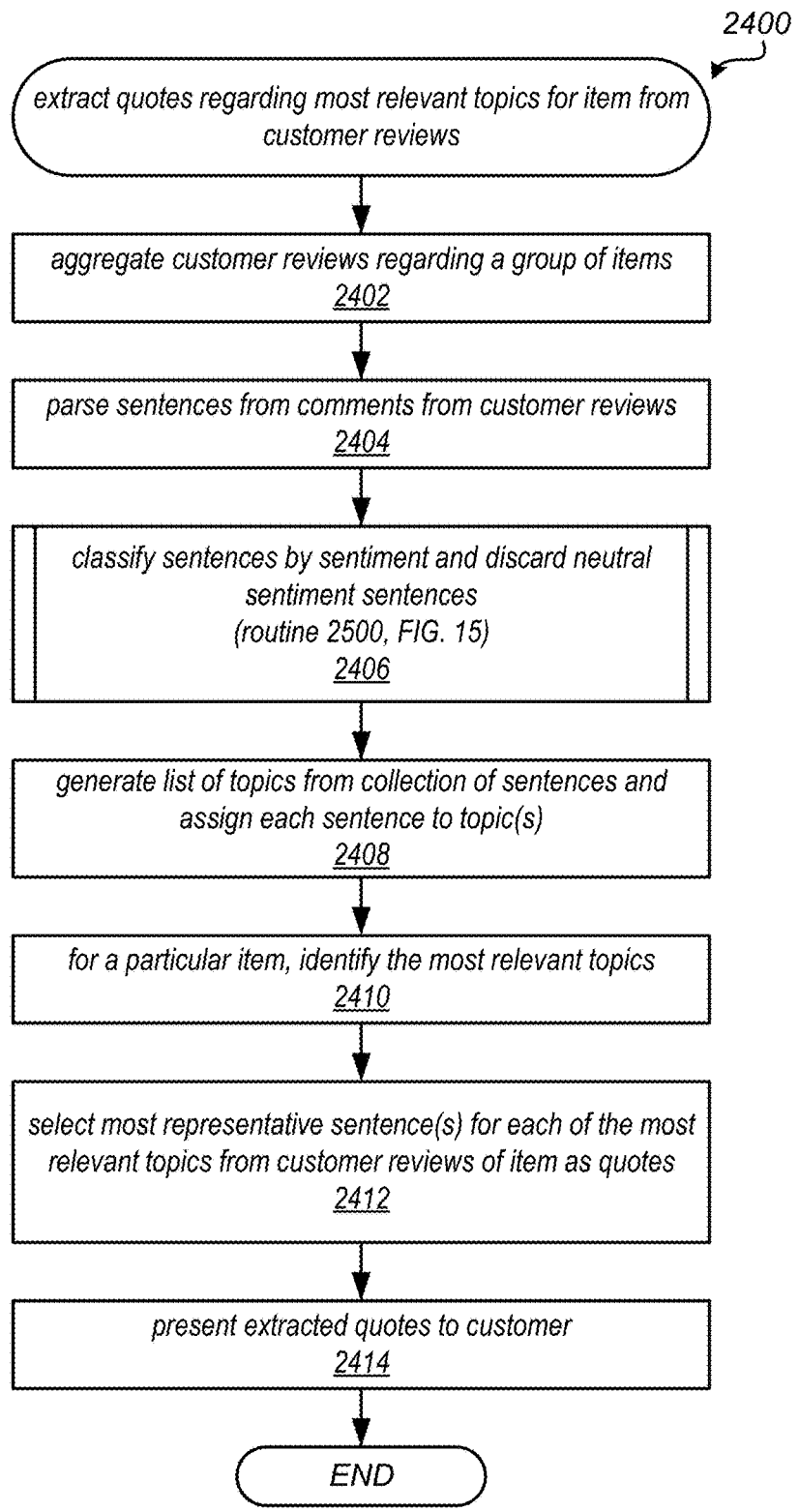
FIG. 15 is a flowchart for a method of extracting quotes for topics for an item from customer reviews of the item, according to at least some embodiments.

FIG. 15 illustrates a routine 2400 for extracting quotes regarding the most relevant topics discussed in customer reviews of an item, according to one embodiment. The routine 2400 may be performed by the quote extraction module 2134, as described above in regard to FIG. 12. It will be appreciated that the routine 2400 may also be performed by other modules or components executing on the application servers 2122 in the merchant system 2120, or by any other combination of modules and components. It will be further appreciated that, while the routine 2400 is described as a sequence of operations, groups of operations may be performed at different times, and some operations may be performed iteratively for different items using the outputs of previously performed operations, as indicated below.

The routine 2400 begins at operation 2402, where the quote extraction module 2134 aggregates customer reviews 2202 from the customer review data 2132 for a group of items in the item catalog data 2126. Because the types of topics discussed for different types of items may be different, the quote extraction process may produce more salient topics when executed across items of similar type. For example, the most relevant topics determined for a group of items consisting of small appliances may include reliability of the item, the quality of the construction of the item, the price or value of the item, and the like. However, the most relevant topics determined for a group of items consisting of blenders may include one or more these same topics, along with ice crushing ability, the number of speeds available, the life-expectancy of the blender, and the like.

In one embodiment, the quote extraction module 2134 utilizes the category hierarchies defined for items in the item catalog data 2126 to select a category of items, such as all blenders. The selection of the category of items may be narrow enough to generate the most salient topics for the items in the selected category but broad enough to contain sufficient customer reviews 2202 to produce accurate quote extraction. The quote extraction module 2134 then aggregates the customer reviews 2202 from the customer review data 2132 associated with those items in the item catalog data 2126 belonging to the selected category. It will be appreciated that the group of items selected for aggregation of the associated customer reviews 2202 may be as broad as all items in the item catalog and as narrow as a particular item. According to another embodiment, the quote extraction module 2134 further aggregates feedback or discussions regarding the customer reviews, comments made regarding other subjects related to the items or group of items, and/or the like from the customer review data 2132 along with the customer reviews 2202.

The routine 2400 proceeds from operation 2402 to operation 2404, where the quote extraction module 2134 parses individual sentences or phrases from the comments 2212 of the aggregated customer reviews 2202 to create a collection of sentences. It will be appreciated that individual sentences or phrases contained in the comments 2212 from a customer review 2202 may discuss a variety of topics directly or indirectly related to the associated items. In one embodiment, the quote extraction module 2134 parses individual sentences from the comments 2212 for the collection of sentences in order to determine the various topics discussed across the aggregated customer reviews 2202. The quote extraction module 2134 may further parse simple sentences, phrases, or other grammatical constructs (referred to generally as "sentences") from complex or compound sentences in the comments 2212 in order to better distill multiple topics discussed in the sentences. For example, the quote extraction module 2134 may break the compound sentences on commas, coordinating conjunctions, or other transition words or terms in order to parse the simple sentences and phrases for the collection of sentences from the comments 2212 of the aggregated customer reviews 2202. It will be further appreciated that the quote extraction module 2134 may utilize other methods of syntactic analysis to parse the sentences and/or phrases from the comments 2212 of the aggregated customer reviews 2202.

From operation 2404, the routine 2400 proceeds to operation 2406, where the quote extraction module 2134 classifies each of the individual sentences in the collection of sentences with a sentiment. In addition, once a sentiment for each sentence has been determined, the quote extraction module 2134 removes those sentences having neutral sentiment from the collection of sentences before proceeding to identify the topics contained in the collection of sentences. Since a neutral sentiment sentence does not express a like or dislike of an item or aspect of the item, these sentences would likely not serve as salient quotes regarding a topic for a particular item that would provide a potential purchaser with a sense of how other customers feel regarding the topic. According to one embodiment, the quote extraction module 2134 may uses the method described below in regard to FIG. 16 to classify the sentences or phrases for sentiment and to discard those sentences having neutral sentiment from the collection of sentences. Alternatively, the quote extraction module 2134 may utilize other methods known in the art for determining the sentiment for each sentence.

The routine 2400 proceeds from operation 2406 to operation 2408, where the quote extraction module 2134 analyzes the sentences in the collection of sentences to generate a list of topics discussed across the collection of sentences. Each sentence in the collection of sentences is further assigned to one or more of the topics from the list of topics based on the analysis. In one embodiment, the quote extraction module 2134 utilizes latent Dirichlet allocation ("LDA") to discover the abstract topics that occur in the collection of sentences. The LDA mechanism may provide better topic discovery results than other statistical analysis methods, such as clustering, because it better handles issues in text, such as a single word that has multiple meanings. LDA also produces probability distributions over topics for each sentence, which may be utilized to assign topics to each of the sentences.

The implementation of LDA utilized by the quote extraction module 2134 may utilize automated methods of model selection. For example, the quote extraction module 2134 may iteratively repeat the analysis while incrementing the number of topics until the perplexity improves by less than 2%. This may lead to repeatability of results for given a collection of sentences aggregated from one particular category of items, while allowing the parameters of the model to adjust for other categories of items. Alternatively, other methods of model selection may be utilized, such as using a metric similar to Akaike's information criterion ("AIC"). Other extensions to the LDA implementation that may be utilized by the quote extraction module 2134 include producing hierarchies of topics.

From operation 2408, the routine proceeds to operation 2410, where the quote extraction module 2134 selects the most relevant topics from the list of topics for a particular item. According to one embodiment, the most relevant topics for the particular item represent the topics most discussed in the customer reviews 2202 associated with that item. The quote extraction module 2134 selects the top-most N topics assigned to the most sentences parsed from the customer reviews 2202 associated with the particular item as the relevant topics. The number N of topics may vary depending on the information requirements for the extracted quotes 2302 to be presented to the customer 2102. For example, the quote extraction module 2134 may select three to five most relevant topics for each particular item.

The routine proceeds from operation 2410 to operation 2412, where the quote extraction module 2134 selects one or more representative sentences from among the sentences parsed from the customer reviews 2202 associated with the particular item for each of the identified most relevant topics. In one embodiment, the most representative sentence(s) for a topic are those sentences that are representative both in terms of sentiment and in terms of subject matter. In order to select the most representative sentence(s) for a topic, the quote extraction module 2134 first determines the majority sentiment (positive or negative) from the sentences assigned to that topic for the item. From among those sentences expressing the majority sentiment, the quote extraction module 2134 then selects the one or more sentences that are most relevant to the topic. According to one embodiment, the quote extraction module 2134 chooses the most the representative sentence using cosine similarity with term frequency-inverse document frequency ("TF-IDF") weighting. Alternatively, the quote extraction module may utilize a graph-based centrality algorithm, such as LexRank, with TF-IDF to determine the most relevant sentence to the topic.

The selected sentences may be further filtered in order to extract the most salient quotes for presentation to the customer 2102. For example, the quote extraction module 2134 may filter the selected sentences for a minimum specificity in order to remove sentences with broad language, such as "I love it," and favor more specific sentences such as "I love it because it has ample speed settings for different tasks." The quote extraction module may utilize TF-IDF scores of terms in the selected sentences as to the overall collection of sentences. The sentences with a high average of TF-IDF scores may be selected as more specific to the assigned topic. In addition, the extracted sentences may be filtered by a minimum readability level, based on number of words in the sentence, a minimum average word length, and/or other methods of approximating the readability of the sentence.

In further embodiments, the quote extraction module 2134 may utilize other means to improve the quality of the selected sentences, such as only selecting sentences from customer reviews 2202 having a minimum helpfulness rating 2216 and the like. Once the most representative sentence(s) for the most relevant topics for the item have been selected, the quote extraction module 2134 may store the selected sentences in the extracted quote data 2136 for later presentation to the customer 2102. For example, the quote extraction module 2134 may store each selected representative sentence as an excerpt 2304 in a new extracted quote 2302 related to the particular item through the item SKU 2206.

The topic assignment(s) 2306 for the sentence contained in the excerpt 2304 may also be stored in the extracted quote 2302. In one embodiment, the topic assignment(s) 2306 may be ordinal numbers that allows extracted quotes 2302 containing sentences assigned to the same identified most relevant topic to be grouped together. In another embodiment, the topic assignment(s) 2306 may comprise a topic label assigned to each topic that can be presented along with the extracted quotes 2302 to the customer 2102. The topic labels may be determined automatically by the quote extraction module 2134. For example, the quote extraction module 2134 may utilize word stemming and TF-IDF to select the most used and relevant term or sequence of terms from among the sentences assigned to the topic as the topic label. Alternatively, because the topics discussed in customer reviews 2202 for a particular category of items may tend to be consistent over time, the most prevalent topics in the list of topics generated for the category of items may be labeled manually by merchant system personnel or through crowd-sourcing and the labels retained with the list of topics in the data store 2130 or other storage mechanism. It will be appreciated that other methods of labeling the topics assigned to the selected representative sentences may be utilized by the quote extraction module 2134, and it is intended that all such methods of topic labeling be included.

The quote extraction module 2134 may further store a sentiment indicator 2308 for each selected sentence in the corresponding extracted quote 2302 indicating the sentiment classification determined for the sentence at operation 2406. The online shopping module 2124 and/or other modules of the merchant system 2120 may utilize the sentiment indicator 2308 to select extracted quotes 2302 related to an item expressing a desired sentiment for presentation to customers 2102 along with the item details 2128. In addition, the quote extraction module 2134 may store the customer review ID 2204 of the customer review 2202 from which the excerpt 2304 was extracted in the new extracted quote 2302. The customer review ID 2204 may be utilized to retrieve information from the original customer review 2202 that may be presented with the extracted quote 2302, such as an identity or handle of the posting customer, the date the customer review was posted, the overall customer rating 2214 from the review, the helpfulness rating 2216 given the review, and the like.

It will be appreciated that the operations 2410 and 2412 may be repeated iteratively for a number of items belonging to the group or category of items from which the customer reviews 2202 were aggregated and the list of topics generated. In addition, the collection of sentences along with the topic assignment and sentiment determined for each sentences at operation 2408 may be stored in the data store 2130 or other storage mechanism, and the quote extraction module 2134 may perform operations 2410 and 2412 for a requested item at a later time in order to extract one or more sentences for each of the most relevant topics and store them in extracted quotes 2302 in the extracted quote data 2136.

According to one embodiment, from operation 2412, the routine 2400 proceeds to operation 2414, where the extracted quotes 2302 are displayed to the customer 2102 or other user of the merchant system 2120. For example, the extracted quotes 2302 may be included in the item details 2128 sent to the customer computer 2104 by the online shopping module 2124 and presented to the customer 2102 in conjunction with the item information. In addition, the online shopping module 2124 may provide the customer 2102 with the ability to interact with the presented extracted quotes 2302, such as allowing the customer to see other extracted quotes regarding the same topic as a selected quote, allowing the customer to retrieve and view the customer review 2202 from which the quote was extracted, allowing the customer to search for other items having extracted quotes with a positive and/or negative sentiment regarding the topic addressed by a selected quote, and the like. It will be further appreciated that the online shopping module 2124 and/or other modules in the merchant system 2120 utilize the extracted quotes 2302 in the extracted quote data 2136 to provide other services to customers 2102 and other users of the system beyond those described in this section.

Figure 16:
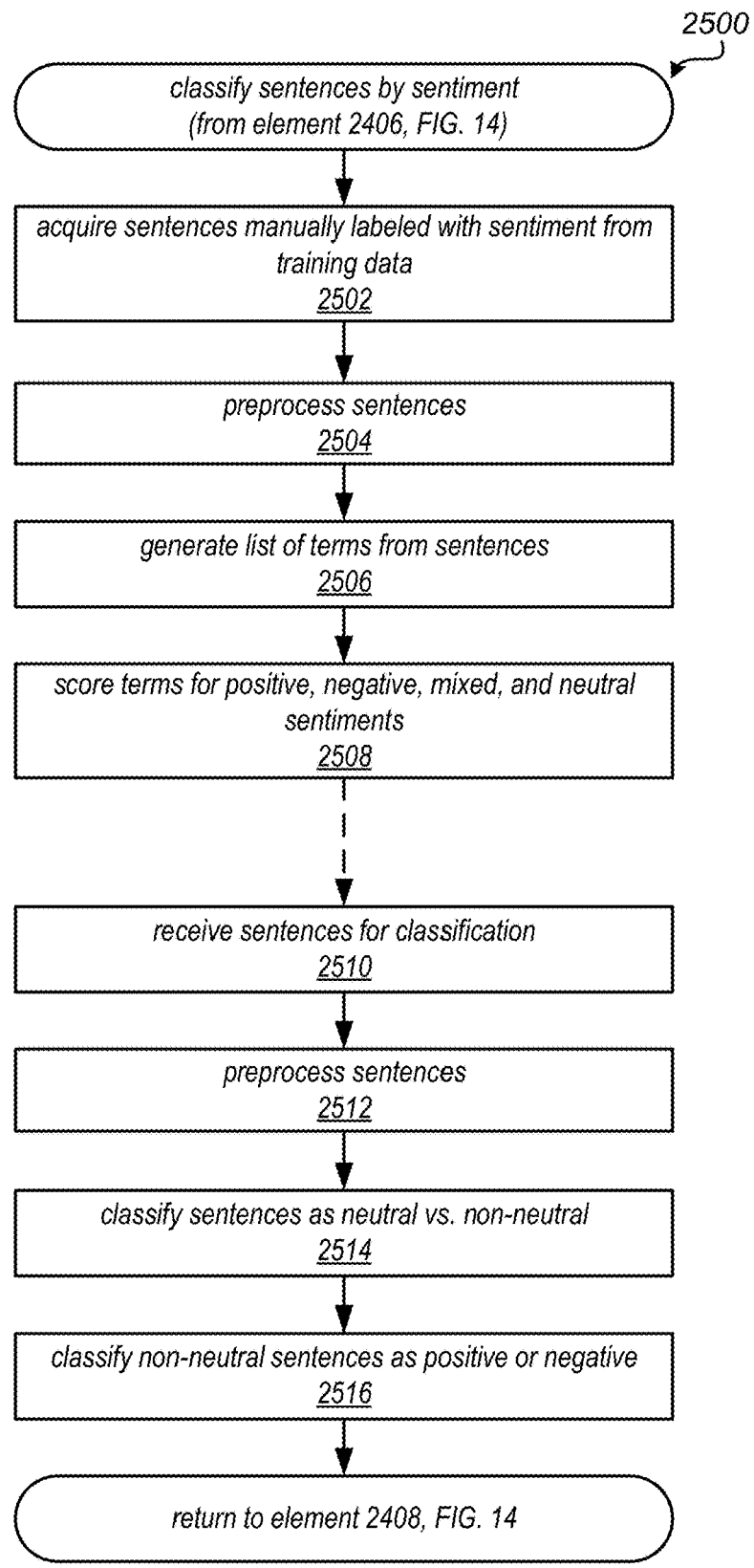
FIG. 16 is a flowchart for a method of classifying sentences as to sentiment utilizing machine learning techniques, according to at least some embodiments.

FIG. 16 illustrates a routine 2500 for classifying sentences or phrases parsed from the customer reviews 2202 for sentiment and to discard those sentences having neutral sentiment from the collection of sentences, according to one embodiment. The routine 2500 uses a machine learning technique that takes sentences manually labeled in terms of sentiment and learns which words and sequence of words make a sentence positive, negative, mixed, or neutral. The routine 2500 then utilizes logistic regression classifiers trained on the sentiment classifications of these words and sequences of words to determine a sentiment for each sentence or phrase in the collection of sentences. The routine 2500 may be performed by the quote extraction module 2134, as described above in regard to FIG. 12. It will be appreciated that the routine 2500 may also be performed by other modules or components executing on the application servers 2122 in the merchant system 2120, or by any other combination of modules and components. It will be further appreciated that, while the routine 2500 is described in this section as classifying sentences in the collection of sentences parsed from the aggregated customer reviews, the method described may be utilized to classify sentiment in sentences, phrases, or other documents from any other corpus based on machine learning acquired from manually labeled documents from the same or similar corpus.

The routine 2500 begins at operation 2502, where the quote extraction module 2134 acquires manually labeled sentences from the training data 2138. According to one embodiment, the training data 2138 comprises sentences parsed from the comments 2212 of customer reviews 2202 from the customer review data 2132 in the merchant system 2120. Because the terminology used to discuss and express sentiment regarding different types of items may be different, the sentences in the training data 2138 may be extracted from customer reviews 2202 regarding the same group or category of items as the collection of sentences to be classified. Alternatively, the sentences comprising the training data 2138 may include selected sentences from recent customer reviews 2202 across broader classifications of items. For example, the manually labeled sentences in the training data 2138 may be divided into media-type items and non-media type items. The quote extraction module 2134 may perform the sentiment analysis using training data 2138 from the most appropriate classification of items for the collection of sentences to be classified.

The sentences comprising the training data 2138 are further labeled with a sentiment indicating that the sentence expresses a positive sentiment, a negative sentiment, a mixed sentiment, or neutral or no sentiment. The sentences comprising the training data 2138 may be labeled with sentiment by merchant system personnel or through crowd-sourcing. It will be appreciated that the labeled sentences comprising the training data 2138 may be gathered from other sources, as well.

The routine 2500 proceeds from operation 2502 to operation 2504, where the quote extraction module 2134 preprocesses the sentences comprising the training data 2138 to increase the accuracy of the classification process and account for the nuances of the applied machine learning techniques. For example, the quote extraction module 2134 may convert the sentences comprising the training data 2138 to lowercase and remove punctuation, stopwords, and any formatting characters, such as HTML or special characters. The quote extraction module 2134 may also expand contractions, changing "don't" to "do not," for example.

According to one embodiment, the quote extraction module 2134 performs further pre-processing to handle negation words. For example, the quote extraction module 2134 may concatenate negation words or terms, such as "no," "not," and "none" with the next word or sequence of words in order to create tokens that more appropriately reflect the sentiment of the words. Accordingly, "no problem" may become "noproblem" in order to preserve the meaning of the word combination. Similarly, interceding adverbs may be included in the concatenation, such that "not very good" may become "notverygood" and the like. Alternatively or additionally, the quote extraction module 2134 may utilize a parsing algorithm to determine the sentence structure and decide the words of the sentence to which the negation applies. The quote extraction module 2134 may also be able to detect the use of sarcasm and substitute the appropriate words for negation. Other N-gram modeling may be applied to the sentences to compose the words into unigrams, bigrams, and trigrams, as is common in natural language processing.

From operation 2504 the routine proceeds to operation 2506, where the quote extraction module 2134 parses individual words, sequence of words, and tokens from the pre-processed sentences to generate a list of terms. Next, at operation 2508, the quote extraction module 2134 applies machine learning techniques to score each word or term in the list of terms as to positive, negative, mixed, and neutral sentiment based on the labeled sentences in the training data 2138 in which the words and terms occur. For example, the quote extraction module 2134 may apply a logistic regression classifier or maximum entropy classifier to determine the sentiment scores for each term in the list of terms. According to embodiments, the sentiment scores for the words and terms in the list of terms are used as coefficients in logistic regression classifiers used to classify the sentences in the collection of sentences, as will be described below.

In one embodiment, the list of terms may be reduced in order to retain terms that represent the best indicators of sentiment, thus improving accuracy in the classification process and avoiding negatives-labeled-as-positives and positives-labeled-as-negative errors. For example, the number of terms in the list of terms may be reduced by applying thresholds for the scores for positive, negative, mixed, and/or neutral sentiments for which terms are retained. The number of terms may be further reduced using other feature selection techniques, such as minimum feature occurrence or minimum chi-square value. The list of terms and their corresponding sentiment scores may be stored for future sentiment classification processing, as is described below. According to one embodiment, the list of terms and their corresponding sentiment scores are stored in the training data 2138.

The routine 2500 proceeds from operation 2508 to operation 2510, where the quote extraction module 2134 receives a collection of sentences of phrases for classification as to sentiment. For example, the quote extraction module 2134 may receive the collection of sentences parsed from the aggregated customer reviews, as described above in regard to operation 2406. From operation 2510, the routine 2500 proceeds to operation 2512, where the quote extraction module 2134 pre-processes the sentences in the collection sentences using the same techniques utilized for the sentences comprising the training data 2138 described above in regard to operation 2504. In one embodiment, the quote extraction module 2134 also adds a token each sentence to represent the customer rating 2214 from the customer review 2202 from which the sentence was extracted. For example, for a sentence parsed from a customer review 2202 containing a customer rating 2214 with a value of five, the quote extraction module may add the token "5 STAR RATING" to the sentence during pre-processing. The customer rating tokens added to the sentences may be utilized as a coefficient in the logistic regression classifiers in order to improve the accuracy of the classification process, as described below.

From operation 2512, the routine 2500 proceeds to operation 2514, where the quote extraction module 2134 distinguishes the sentences in the collection of sentences having a neutral sentiment from those sentences having a non-neutral sentiment. In one embodiment, the quote extraction module 2134 utilizes a single logistic regression classifier trained on the positive, negative, and mixed scores of terms as positive coefficients and the neutral sentiment scores of terms as negative coefficients to score the sentences as to non-neutral sentiment. Those sentences determined to express a neutral sentiment, i.e. those sentences with a non-neutral sentiment score below a particular threshold, may then be discarded from the collection of sentences. Utilizing a first logistic regression classifier to remove those sentences from the collection of sentences that express weak or no sentiment before further processing the sentences to classify them as to positive or negative sentiment greatly improves the accuracy of the sentiment classification process.

The routine 2500 then proceeds from operation 2514 to operation 2516, where the quote extraction module 2134 classifies each of the remaining sentences in the collection of sentences as having a positive sentiment or negative sentiment. According to one embodiment, the quote extraction module 2134 may utilize two, separate logistic regression classifiers. The first logistic regression classifier is trained on the positive and mixed sentiment scores of terms as positive coefficients and the negative and neutral scores of terms as negative coefficients to score the sentence as to positive sentiment, and the second logistic regression classifier is trained on the negative and mixed sentiment scores of terms as positive coefficients and the positive and neutral scores of terms as negative coefficients to score the sentence as to negative sentiment. The positive sentiment score and the negative sentiment score for each sentence may be combined through a simple summation or by a machine learning algorithm, such as the Perceptron learning algorithm, a neural network, or the like, in order to classify the sentence as expressing a positive sentiment or a negative sentiment.

It will be appreciated that the coefficients and other parameters for the logistic regression classifiers may be adjusted to favor high levels of precision in the classifiers in order to reduce misclassifications, particularly negative-classified-as-positives and positive-classified-as-negative errors. These errors may cause the excerpts 2304 extracted from the customer reviews 2202 to misrepresent the customers' true sentiment expressed for an item or a particular topic regarding the item. In further embodiments, the quote extraction module 2134 may apply further coefficients or additional levels of logistic regression classifiers to improve the accuracy of the classification process and reduce errors. For example, the quote extraction may apply a meta-classifier including the positive and negative sentiment scores from the first and second classifiers, the customer rating token, and/or the classifications from the previous and next sentences from the original comments 2212 of the customer review 2202. Further linguistic analysis, such as identification of sub-clauses, may further be utilized to enhance the classification process. From operation 2516, the routine 2500 ends.

Illustrative System

Figure 17:
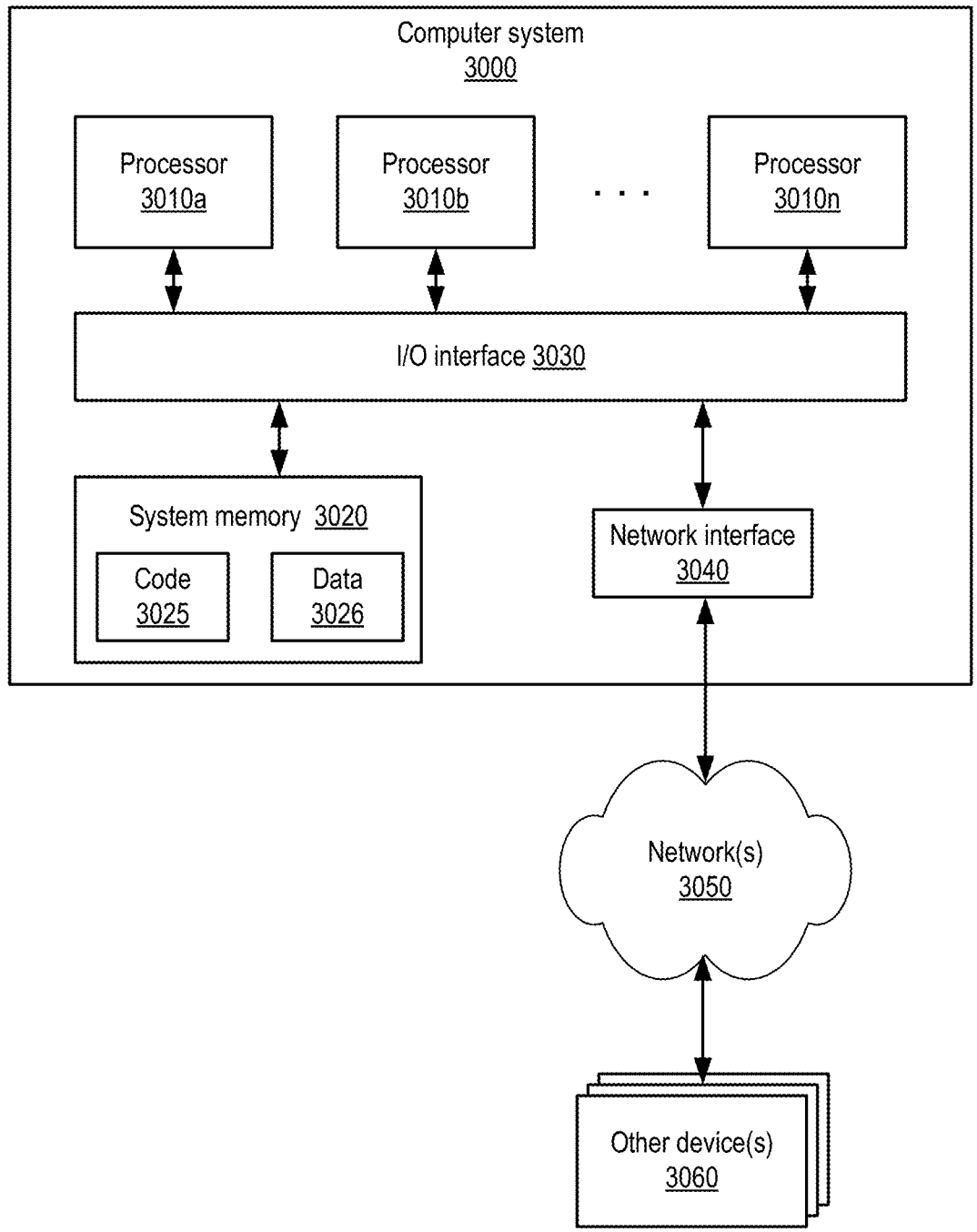
FIG. 17 is a block diagram illustrating an example computer system that may be used in some embodiments.

In at least some embodiments, a computing device that implements a portion or all of the technologies as described herein may include a general-purpose computer system that includes or is configured to access one or more computer-accessible media, such as computer system 3000 illustrated in FIG. 17. In the illustrated embodiment, computer system 3000 includes one or more processors 3010 coupled to a system memory 3020 via an input/output (I/O) interface 3030. Computer system 3000 further includes a network interface 3040 coupled to I/O interface 3030.

In various embodiments, computer system 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computer system 3000 and other devices 3060 attached to a network or networks 3050, such as other computer systems or devices, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more servers comprising one or more hardware processors and memory and configured to:
   store textual entries as part of individual textual entries in community-sourced content, wherein individual textual entries in the community-sourced content pertain to respective items in an item catalog;
   train, according to a machine learning technique, a topic model using a corpus of training textual entries about a category of the items, wherein the corpus of training textual entries is different from the community-sourced content and is obtained from one or more sources including at least one source distinct from the community-sourced content, wherein the machine learning technique updates the topic model to indicate a set of machine-learned topics for the category discovered in the corpus, and wherein individual ones of the machine-learned topics correspond to respective latent features in the training textual entries;

determine a mapping that maps one or more aspects of the category of items to the set of machine-learned topics for the category of items, wherein individual ones of the aspects are assigned respective aspect names;

for a particular item in the category, automatically align the individual textual entries in the community-sourced content for the item to the one or more aspects of the category of items, wherein the alignment comprises performing, for one or more of the individual textual entries:

determining, according to the topic model, one or more of the machine-learned topics that are associated with the individual textual entry;

determining, according to the mapping, one or more of the aspects that are associated with the individual textual entry; and tagging the individual textual entry with respective one or more tags indicating the one or more aspects determined for the individual textual entry;

generate a first user interface for a client device that includes information about the particular item and one or more respective user interface elements that allow for selection of the one or more aspects pertaining to the particular item, wherein the first user interface indicates respective counts of textual entries in the community-sourced content that are tagged with the individual aspects pertaining to the particular item;

receive, from the client device and via the first user interface, an input selecting a first aspect pertaining to the particular item;

extract one or more textual entries tagged with the first aspect pertaining to the particular item from the aligned community-sourced content;

generate summary statistics for the first aspect pertaining to the particular item from the one or more textual entries; and generate a second user interface for the client device that includes at least portions of the one or more textual entries and the summary statistics for the first aspect pertaining to the particular item.

2. The system as recited in claim 1, wherein the system is an online merchant system that offers items for sale to customers over a network, wherein the community-sourced content includes customer reviews of the items offered for sale by the online merchant system, and wherein the corpus of training textual entries include at least one source of item information that is external to the online merchant system.

3. The system as recited in claim 1, wherein to apply the machine learning technique, the one or more servers is configured to categorize the training textual entries in the corpus into two or more categories including the category being analyzed and apply a topic modeling technique to generate the set of machine-learned topics for the category.

4. The system as recited in claim 1, wherein, to determine the mapping, the one or more servers is configured to apply names to the aspects that reflect features or capabilities of the category of items and to consolidate the machine-learned topics under respective ones of the named aspects.

5. The system as recited in claim 1, wherein, to align the individual textual entries in the community-sourced content for the item to the one or more aspects of the category of items, the one or more servers is configured to perform the alignment for a plurality of items in the category.

6. The system as recited in claim 1, wherein to generate the first user interface, the one or more servers is configured to indicate the one or more aspects pertaining to the item in a sorted order according to their respective counts of textual entries in the community-sourced content.

7. The system as recited in claim 1, wherein apply the machine learning technique, the one or more servers is configured to apply a multidimensional topical analysis technique, and wherein the set of machine-learned topics is a multidimensional set of topics.

8. A method, comprising:

performing, by one or more computing devices:

storing textual entries as part of a community-sourced content, wherein individual textual entries in the community-sourced content pertain to respective items in an item catalog;

training, according to a machine learning technique, a topic model using a corpus of training textual entries about a category of the items, wherein the corpus of training textual entries is different from the community-sourced content and is obtained from one or more sources including at least one source distinct from the community-sourced content, wherein the machine learning technique updates the topic model to indicate a set of machine-learned topics for the category discovered in the corpus, and wherein individual ones of the machine-learned topics correspond to respective latent features in the training textual entries;

determining a mapping that maps one or more aspects of the category of the items to the set of machine-learned topics for the category of items, wherein individual ones of the aspects are assigned respective aspect names;

aligning one or more of the individual textual entries in the community-sourced content in the category to the one or more aspects of the category, wherein the aligning is performed based at least in part on the topic model and the mapping, and comprises tagging at least some of the individual textual entries with respective tags indicating the one or more aspects;

generating a first user interface for a client device, wherein the first user interface includes information about a particular item and one or more respective user interface elements that allow for selection of the one or more aspects pertaining to the particular item, and wherein the first user interface indicates respective counts of textual entries in the community-sourced content that are tagged with individual aspects pertaining to the particular item;

receiving, from the client device and via the first user interface, an input selecting a first aspect pertaining to the particular item;

responsive to the input, extracting one or more of the textual entries tagged with the first aspect pertaining to the particular item from the aligned community-sourced content for the particular item; and generating a second user interface for the client device that includes at least portions of the one or more textual entries.

9. The method as recited in claim 8, wherein generating the first user interface comprises generating, for the particular item, summary statistics for at least one of the one or more aspects from the respective textual entries.

10. The method as recited in claim 9, wherein the summary statistics include statistics based on an analysis of sentiment expressed in the respective textual entries.

11. The method as recited in claim 9, wherein generating the first user interface comprises indicating the one or more aspects pertaining to the particular item in a sorted order according to their respective counts of textual entries in the community-sourced content.

12. The method as recited in claim 8, further comprising providing comparison information for at least two items in the category to the client device for display, wherein the comparison information includes at least summary statistics for one or more of the aspects of the category for each of the at least two items.

13. The method as recited in claim 8, further comprising:
receiving a search request for items in the category, wherein the search request includes search instructions directed to one or more of the aspects of the category; and
performing a search for items according to the search request and the aligned community-sourced content to generate search results for the category filtered according to the search instructions.

14. The method as recited in claim 8, wherein the community-sourced content includes customer reviews of items offered for sale via an online merchant system.

15. The method as recited in claim 14, wherein the one or more sources include at least one source of item information that is external to the online merchant system.

16. The method as recited in claim 8, wherein performing the machine learning technique comprises applying a probabilistic topic modeling technique to produce probability distributions over the set of machine-learned topics for individual training textual entries.

17. The method as recited in claim 8, wherein performing the machine learning technique comprises categorizing the training textual entries in the corpus into two or more categories including the category being analyzed and applying one or more semantic analysis techniques to the two or more categories to generate the set of machine-learned topics for the category.

18. The method as recited in claim 8, wherein said determining the mapping comprises applying names to the aspects that reflect features or capabilities of the category of items and consolidating the machine-learned topics under respective ones of the named aspects.

19. The method as recited in claim 8, wherein performing the machine learning technique comprises:
generating a multidimensional set of topics for the category from the corpus of training textual entries according to a multidimensional topical analysis technique; and
determining the mapping for the one or more aspects for the category from the multidimensional set of topics.

20. The method as recited in claim 8, wherein said aligning the individual textual entries in community-sourced content for individual items in the category to the one or more aspects of the category comprises:
determining, according to the topic model, one or more of the machine-learned topics that are associated with the individual textual entry; and
determining, according to the mapping, one or more of the aspects that are associated with the individual textual entry.

21. The method as recited in claim 8, further comprising:
storing additional textual entries as part of the community-sourced content, wherein the additional textual entries are for an item in the category; and
automatically aligning the additional textual entries in the community-sourced content based at least in part on the topic model and the mapping.

22. A non-transitory computer-accessible storage medium storing program instructions computer-executable that when executed on one or more processors, cause the one or more processors to:
store textual entries as part of a community-sourced content, wherein individual textual entries in the community-sourced content pertain to respective items in an item catalog;
train, according to a machine learning technique, a topic model using a corpus of training textual entries about a category of the items, wherein the corpus of training textual entries is different from the community-sourced content and is obtained from one or more sources including at least one source distinct from the community-sourced content, wherein the machine learning technique updates the topic model to indicate a set of machine-learned topics for the category discovered in the corpus, and wherein individual ones of the machine-learned topics correspond to respective latent features in the training textual entries;
determine a mapping that maps one or more aspects of the category of the items to the set of machine-learned topics for the category of items, wherein individual ones of the aspects are assigned respective aspect names;
align one or more of the individual textual entries in the community-sourced content in the category to the one or more aspects of the category, wherein the aligning is performed based at least in part on the topic model and the mapping, and comprises tagging at least some of the individual textual entries with respective tags indicating the one or more aspects;
generate a first user interface for a client device, wherein the first user interface includes information about a particular item and one or more respective user interface elements that allow for selection of the one or more aspects pertaining to the particular item, and wherein the first user interface indicates respective counts of textual entries in the community-sourced content that are tagged with individual aspects pertaining to the particular item;
receive, from the client device and via the first user interface, an input selecting a first aspect pertaining to the particular item;
responsive to the input, extract one or more textual entries tagged with the first aspect pertaining to the particular item from the aligned community-sourced content; and
generate a second user interface for the client device that includes at least portions of the one or more textual entries and summary statistics for the first aspect of the category according to an analysis of the extracted textual entries.

23. The non-transitory computer-accessible storage medium as recited in claim 22, wherein to perform the machine learning technique, the program instructions computer-executable when executed on the one or more processors cause the one or more processors to applying a probabilistic topic modeling technique to produce probability distributions over the set of machine-learned topics for individual training textual entries.

24. The non-transitory computer-accessible storage medium as recited in claim 22, wherein, to determine the mapping, the program instructions computer-executable when executed on the one or more processors cause the one or more processors to apply one or more semantic analysis techniques to the training textual entries to determine the set of machine-learned topics for the category.

25. The non-transitory computer-accessible storage medium as recited in claim 22, wherein, to determine the mapping, the program instructions computer-executable when executed on the one or more processors cause the one or more processors to label the aspects with names that reflect features or capabilities of the category of items.

26. The non-transitory computer-accessible storage medium as recited in claim 22, wherein the community-sourced content includes customer reviews of items offered for sale via an online merchant system, and wherein, to align the individual textual entries in community-sourced content in the category to the one or more aspects of the category, the program instructions computer-executable when executed on the one or more processors cause the one or more processors to:
- determine, according to the topic model, one or more of the machine-learned topics that are associated with the individual textual entry; and
- determine, according to the mapping, one or more of the aspects that are associated with the individual textual entry.

* * * * *